United States Patent
Kim et al.

(10) Patent No.: US 12,536,442 B2
(45) Date of Patent: Jan. 27, 2026

(54) METHOD FOR CONVERTING NEURAL NETWORK

(71) Applicant: DEEPX CO., LTD., Seongnam-si (KR)

(72) Inventors: Lok Won Kim, Yongin-si (KR); Jang Min Son, Suwon-si (KR); You Jun Kim, Suwon-si (KR); Bum Jun Jung, Suwon-si (KR)

(73) Assignee: DEEPX CO., LTD., Seongnam-si (KR)

( * ) Notice: Subject to any disclaimer, the term of this patent is extended or adjusted under 35 U.S.C. 154(b) by 0 days.

(21) Appl. No.: 19/035,231

(22) Filed: Jan. 23, 2025

(65) Prior Publication Data
US 2025/0252308 A1     Aug. 7, 2025

Related U.S. Application Data

(63) Continuation-in-part of application No. 18/603,346, filed on Mar. 13, 2024.

(30) Foreign Application Priority Data

| | | |
|---|---|---|
| Feb. 2, 2024 | (KR) | 10-2024-0016687 |
| Apr. 11, 2024 | (KR) | 10-2024-0048548 |
| Jul. 31, 2024 | (KR) | 10-2024-0102154 |
| Sep. 23, 2024 | (KR) | 10-2024-0128002 |

(51) Int. Cl.
*G06N 3/082* (2023.01)
*G06N 3/048* (2023.01)

(52) U.S. Cl.
CPC ............ *G06N 3/082* (2013.01); *G06N 3/048* (2023.01)

(58) Field of Classification Search
CPC ............................. G06N 3/082; G06N 3/048
See application file for complete search history.

(56) References Cited

U.S. PATENT DOCUMENTS

2024/0104356 A1* 3/2024 Sudarsanan ............ G06N 3/048

OTHER PUBLICATIONS

Bansal et al. "Function Call Graph Context Encoding for Neural Source Code Summarization", IEEE Transactions on Software Engineering, 2023, pp. 14.*
Thost et al. "Directed Acyclic Graph Neural Networks", arXiv:2101.07965v3 [ cs. LG] 2, Feb. 2021. pp. 16.*
Krishnamoorthi "Quantizing deep convolutional networks for efficient inference: A whitepaper", arXiv:1806.08342v1 [cs.LG] Jun. 21, 2018, pp. 36.*

* cited by examiner

*Primary Examiner* — Li Wu Chang

(57) ABSTRACT

A method may comprise receiving a first neural network (NN) model including one or more functions; generating a second NN model in a form of directed acyclic graph (DAG) including one or more graph modules by converting the one or more functions; calculating one or more scale values by obtaining maximum and minimum values of parameters input to the one or more graph modules; updating the parameters based on the one or more scale values; and generating a third NN model, in a form of machine code executable on a particular neural processing unit, including the updated parameters.

19 Claims, 38 Drawing Sheets

FIG. 12C

METHOD FOR CONVERTING NEURAL NETWORK

CROSS-REFERENCE TO RELATED APPLICATIONS

This is a continuation in part application of U.S. patent application Ser. No. 18/603,346, filed on Mar. 13, 2024, and also claims priority under 35 U.S.C. § 119 (a) to Republic of Korea Patent Applications No. 10-2024-0016687, filed on Feb. 2, 2024, No. 10-2024-0048548, filed on Apr. 11, 2024, No. 10-2024-0102154, filed on Jul. 31, 2024, and No. 10-2024-0128002, filed on Sep. 23, 2024, which are incorporated herein by reference herein in their entirety.

BACKGROUND OF THE DISCLOSURE

Technical Field

The present disclosure relates to techniques for improving neural network models operating on low-power neural processing units at the edge devices.

Background Art

The human brain is made up of tons of nerve cells called neurons. Each neuron is connected to hundreds to thousands of other neurons through connections called synapses. To mimic human intelligence, modeling the behavior of biological neurons and the connections between them is called a neural network (NN) model. In other words, a neural network is a system of nodes that mimic neurons, connected in a layer structure.

These neural network models are categorized into "single-layer neural networks" and "multi-layer neural networks" based on the number of layers.

A typical multilayer neural network consists of an input layer, a hidden layer, and an output layer. The input layer is the layer that receives external data, and the number of neurons in the input layer can correspond to the number of input variables. At least one hidden layer is located between the input and output layers and receives signals from the input layer, extracts characteristics and passes them to the output layer. The output layer receives signals from the at least one hidden layer and outputs them to the outside world. The input signals between neurons are multiplied by their respective connection strengths, which have a value between 0 and 1, and then summed up, and if the sum is greater than the neuron's threshold, the neuron is activated and output as an output value through the activation function.

On the other hand, in order to realize higher artificial intelligence, the number of hidden layers of neural networks is increased, and it is called a deep neural network (DNN).

There are many types of DNNs, but convolutional neural network (CNN) is known to be easy to extract features of input data and identify patterns of features.

A convolutional neural network (CNN) is a neural network that functions similarly to how the visual cortex of the human brain processes images. Convolutional neural networks are known to be well suited for image processing.

A convolutional neural network may include a loop of convolutional and pooling channels. In a convolutional neural network, most of the computation time is taken up by the convolutional operation. Convolutional neural networks recognize objects by extracting the features of each channel's image by a matrix-like kernel and providing homeostasis such as translation and distortion by pooling. In each channel, a feature map is obtained by convolution of the input data and the kernel, and an activation function such as rectified linear unit (ReLU) is applied to generate an activation map for that channel and pooling can then be applied thereafter. The neural network that actually classifies the pattern is located at the end of the feature extraction neural network and is called the fully connected layer. In the computational processing of a convolutional neural network, most of the computation is done through convolutional or matrix operations.

With the development of AI inference capabilities, various electronic devices such as AI speakers, smartphones, smart refrigerators, VR devices, AR devices, AI CCTV, AI robot vacuum cleaners, tablets, laptops, self-driving cars, bipedal robots, quadrupedal robots, industrial robots, and the like are providing various inference services such as sound recognition, speech recognition, image recognition, object detection, driver drowsiness detection, danger moment detection, and gesture detection using AI.

With the recent development of deep learning technology, the performance of neural network inference services is improving through big data-based learning. These neural network inference services repeatedly train a large amount of training data on a neural network, and infer various complex data through the trained neural network model. Therefore, various services are being provided to the above-mentioned electronic devices by utilizing neural network technology.

In addition, in recent years, neural processing units (NPUs) have been developed to accelerate the computation speed for artificial intelligence (AI).

However, as the capabilities and accuracy required for inference services utilizing neural networks are increasing, the data size, computational power, and training data of neural network models are increasing exponentially. As a result, the performance requirements of processors and memory to handle the inference operations of these neural network models are becoming increasingly demanding.

SUMMARY OF THE DISCLOSURE

Embodiments relate to updating a neural network (NN) model for execution by a neural processing circuit. A first NN model includes one or more functions. A second NN model is in a form of directed acyclic graph (DAG) and includes one or more graph modules that are converted from the one or more functions. One or more scale values are obtained by obtaining maximum and minimum values of parameters received at the one or more graph modules. Each of the one or more scale values represents a resolution for quantization of each of the parameters. The parameters are updated based on the one or more scale values. A third NN model in the form of machine code executable on a neural processing unit is generated. The third NN model includes the updated parameters.

In one or more embodiment, the third NN model is generated based on hardware information of the neural processing unit.

In one or more embodiments, the updating the parameters is performed in response to one or more selected compilation options.

In one or more embodiments, the updating of the parameters is performed by selecting one or more compilation options including a quantization option, an outlier alleviation option, a parameter refinement option, a layer-wise training option, a quantization aware retraining (QAT) option, a quantization aware self-distillation (QASD) option, and a pruning option.

In one or more embodiments, the updating of the parameters is performed by using one or more of a quantization algorithm, an outlier alleviation algorithm, a parameter refinement algorithm, a layer-wise training algorithm, a quantization aware retraining (QAT) algorithm, a quantization-aware self-distillation (QASD) algorithm, and a pruning algorithm.

In one or more embodiments, the third NN model is compiled to execute a multiply-and-accumulation operation associated with the third NN model by a processing element in the neural processing unit.

In one or more embodiments, the third NN model includes a multiply-and-accumulation operation, and the multiply-and-accumulation operation includes at least one of a convolution operation, a general matrix multiply operation, and a matrix multiplication operation.

In the one or more embodiments, the third NN model is compiled to represent weight parameters input to a processing element of the neural processing unit as integers.

In one or more embodiments, the third NN model is compiled to represent an input parameter received at a processing element of the neural processing unit as an integer.

In one or more embodiments, the third NN model is compiled to execute an activation function operation included in the third NN model by an activation function circuit of the neural processing unit.

In one or more embodiments, the third NN model is compiled to represent an output parameter from a processing element of the neural processing unit as an integer, and the output parameter is to be dequantized by a dequantization circuit of the neural processing unit.

In one or more embodiments, the third NN model is compiled to represent an output parameter from an activation function circuit of the neural processing unit as a floating-point number, and the output parameter is to be quantized by a quantization circuit of the neural processing unit.

In one or more embodiments, the updated parameters of the third NN model includes weight parameters.

In one or more embodiments, the third NN model includes the one or more scale values for dequantization operation to be processed by a dequantization circuit of the neural processing unit.

BRIEF DESCRIPTION OF THE DRAWINGS

FIG. 12C is a conceptual diagram illustrating the operation of the pruning unit shown in FIG. 11.

DETAILED DESCRIPTION OF THE EMBODIMENT

Figure 1:
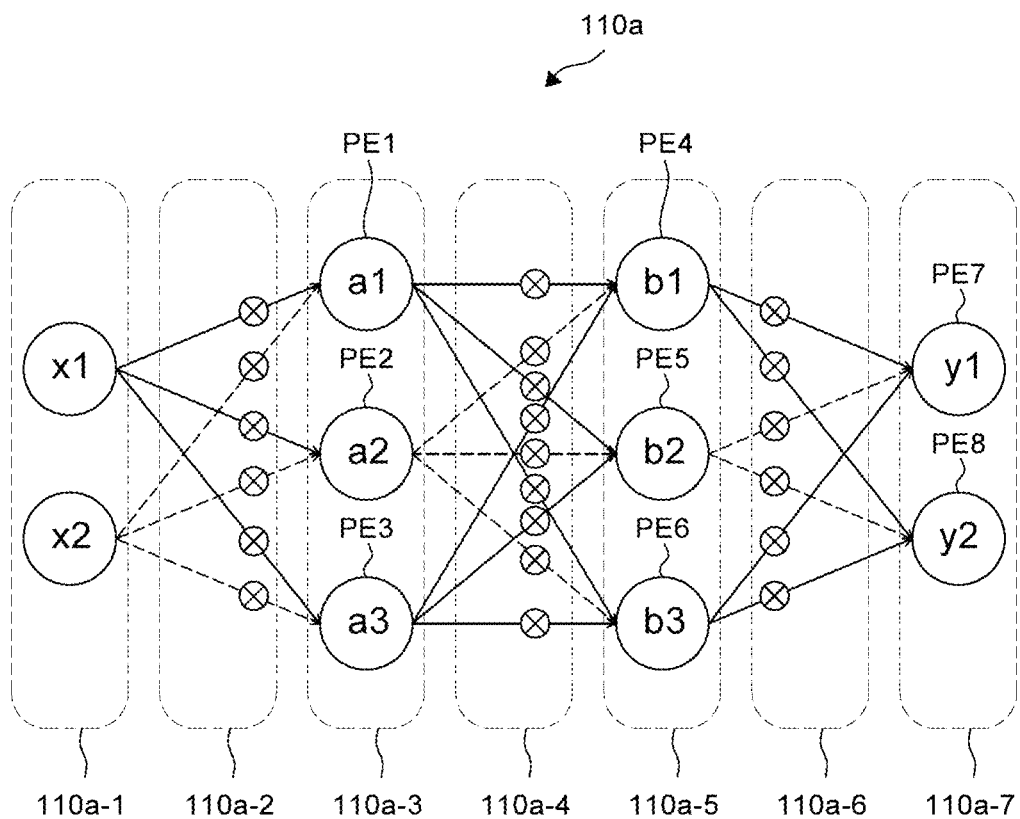
FIG. 1 is a schematic diagram illustrating an example neural network model.

Certain structural or step-by-step descriptions of the examples of the present disclosure are intended only to illustrate examples according to the concepts of the present disclosure. Accordingly, the examples according to the concepts of the present disclosure may be practiced in various forms. Examples according to the concepts of the present disclosure may be implemented in various forms. The present disclosure should not be construed as limiting to the examples of this disclosure.

Various modifications can be made to the examples according to the concepts of the present disclosure and can take many different forms. Accordingly, certain examples have been illustrated in the drawings and described in detail in the present disclosure or application. However, this is not intended to limit the examples according to the present disclosure to any particular disclosure form. The present disclosure according to the concepts of the present disclosure should be understood to include all modifications, equivalents, or substitutions that fall within the scope of the ideas and techniques of the present disclosure.

Terms such as first and/or second may be used to describe various elements, but the elements are not to be limited by the terms. the terms may be used only to distinguish one element from another. Without departing from the scope of the rights under the concepts of the present disclosure, a first elements may be named as a second elements, and similarly, a second elements may be named as a first elements.

When an elements is referred to as being "connected" or "plugged in" to another element, it may be directly connected or connected to the other element. However, it should be understood that other elements may exist in the middle of the plurality of elements. On the other hand, when an elements is the to be "directly connected" or "directly connected" to another element, it should be understood that there are no other elements in between. Other expressions describing relationships between elements, such as "between" and "directly between" or "adjacent to" and "directly adjacent to" should be interpreted similarly.

The terminology used in this disclosure is intended only to describe specific examples and is not intended to limit the present disclosure. Expressions in the singular include the plural unless the context clearly indicates otherwise. In the present disclosure, terms such as "includes" or "has" are intended to designate the presence of a described feature, number, step, action, element, part, or combination thereof, and should be understood as not precluding the possibility of the presence or addition of one or more other features, numbers, steps, actions, elements, parts, or combinations thereof.

Unless otherwise defined, all terms used herein, including technical or scientific terms, have the same meaning as commonly understood by one of ordinary skill in the art to which this disclosure belongs. Terms such as those defined in commonly used dictionaries shall be construed to have meanings consistent with their meaning in the context of the relevant art. Terms such as those defined in commonly used dictionaries are not to be construed in an idealized or overly formal sense unless expressly defined in this disclosure.

In describing the examples, technical details that are well known to those skilled in the art and not directly related to the present disclosure are omitted. This is done so that the main points of the present disclosure are more clearly conveyed without obscuring them by omitting unnecessary explanations.

Definitions of Terms

The following is a brief summary of the terms used in this disclosure to facilitate understanding of the disclosures presented in this disclosure.

NPU: An abbreviation for neural processing unit, which may refer to a dedicated processor specialized for computing neural network models apart from a CPU (central processing unit) or GPU.

NN: Abbreviation for neural network, which can refer to a network of nodes connected in a layer structure that mimics the way neurons in the human brain connect through synapses to mimic human intelligence.

DNN: Abbreviation for deep neural network, which can refer to an increase in the number of hidden layers in a neural network to achieve higher artificial intelligence.

CNN: Abbreviation for convolutional neural network, a neural network that functions similarly to how the human brain processes images in the visual cortex. Convolutional neural networks are known for their ability to extract features from input data and identify patterns in the features.

Transformer: The transformer neural network is one of the most popular neural network architectures for natural language processing tasks. A transformer contains parameters such as input, query (Q), key (K), and value (V). The input to a transformer model consists of a sequence of tokens. Tokens can be words, sub-words, or characters. Each token in the input sequence is embedded into a high-dimensional vector. This embedding allows the model to represent the input tokens in a continuous vector space. Since the transformer does not intrinsically understand the order of the input tokens, a positional encoding is added to the embedding. This gives the model information about the position of the tokens in the sequence. At the core of the transformer model is a self-attention mechanism. This mechanism allows the model to decide how much attention to pay to different parts of the sequence when processing a particular token when making an inference. The attendance mechanism includes a set of three vectors: query (Q), key (K), and value (V). For each input token, the transformer computes the three vectors: query (Q), key (K), and value (V). These vectors are used to compute an attention score, which determines how much emphasis should be placed on different parts of the sequence when processing a particular token when making an inference. The attention score is calculated by taking the inner product of the query (Q) and the key (K) and dividing by the square root of the dimensionality of the key (K) vector. This result is passed through a softmax function to obtain an attentional weight (i.e., scaled dot-product attentions), which is used to compute a weighted sum of the value (V) vectors to produce the final output at each position. To capture different relationships between words, the self-attention mechanism is usually performed multiple times in parallel. This is done using different sets of query (Q), key (K), and value (V) parameters, and the outputs of these different attentional heads (i.e., multi-head attentions) are concatenated and linearly transformed. The self-attention layer is typically followed by a position-wise feedforward network. This is a fully connected layer that is applied independently to the sequence of each position. Layer regularization and residual concatenation are applied around each sub-layer to help with the stability of the training and facilitate the flow of the gradient. Transformers are commonly used as an encoder-decoder architecture for tasks such as machine translation. An encoder processes an input sequence, and a decoder produces an output sequence. In summary, the transformer model adopts a self-attention mechanism using query (Q), key (K), and value (V) vectors to capture the contextual information of the input sequence, and uses a multi-head attention mechanism and feedforward network to learn complex relationships in the data.

Visual Transformer (ViT) is an extension of the original transformer model for computer vision tasks. While transformers were primarily developed for natural language processing, ViT recognizes that the transformer architecture can be applied to a variety of tasks. Like transformers, the input to ViT is a sequence of tokens. In computer vision, the input tokens represent patches of an image. Instead of processing the entire image as a single input, ViT divides the image into non-overlapping patches of fixed size (i.e., image patch embedding). Each patch is linearly embedded and made into a vector to produce a sequence of embeddings. Since the order of the patches is not inherently understood by the ViT model, a positional encoding is added to the patch embedding to provide information about their spatial arrangement (i.e., positional encoding). Here, the patch embedding is linearly projected into a higher dimensional space to capture the relationships between complex patches. The patch embeddings are used as input to a transformer encoder. Each patch embedding is treated as a token in the sequence. Similar to the transformer, ViT utilizes a self-attention mechanism using Query (Q), Key (K), and Value (V) vectors. These vectors are computed for each patch embedding to compute an attachment score and capture dependencies between different parts of the image. Multiple attentional heads are used to capture the relationships between different patches (i.e., multi-head attentions). The outputs of these heads are concatenated and linearly transformed. After self-attention, a position-wise feedforward network is commonly used, which is applied to each patch embedding independently. This allows the model to learn local features. Similar to transformers, ViT uses layer regularization and residual concatenation to enhance training stability and facilitate gradient flow. The ViT encoder stack processes the patch embedding sequence through multiple layers. Each layer may include self-attention, feedforward, regularization, and residual concatenation. Unlike transformers, ViT does not use the entire sequence output for inference. Instead, it applies a global average pooling layer to obtain a fixed-size representation for classification.

The present disclosure will now be described in detail with reference to the accompanying drawings, which illustrate preferred embodiments of the present disclosure. Hereinafter, examples of the present disclosure will be described in detail with reference to the attached drawings.

<Artificial Intelligence>

Humans have the intelligence to recognize, classify, infer, predict, and control/decision making. Artificial intelligence (AI) refers to the artificial imitation of human intelligence.

The human brain is composed of a large number of nerve cells called neurons. Each neuron is connected to hundreds to thousands of other neurons through connections called synapses. To mimic human intelligence, the behavior of biological neurons and the connections between neurons are modeled in a neural network model. In other words, a neural network is a system of nodes connected in a layer structure that mimics neurons.

These neural network models are categorized into 'single-layer neural networks' and 'multi-layer neural networks' depending on the number of layers. A typical multilayer neural network consists of an input layer, a hidden layer, and an output layer. The input layer is a layer that receives external data, and the number of neurons in the input layer is the same as the number of input variables. The hidden layer is located between the input layer and the output layer and receives signals from the input layer, extracts characteristics, and passes them to the output layer. The output layer receives signals from the hidden layer and outputs the result. The input signals between neurons are multiplied by their respective connection strengths, which have a value between 0 and 1, and then summed. If this sum is greater than the neuron's threshold, the neuron is activated and implemented as an output value through the activation function.

On the other hand, in order to realize higher artificial intelligence, the number of hidden layers of a neural network is increased, which is called a deep neural network (DNN).

DNNs are being developed in a variety of structures. For example, convolutional neural network (CNN), which is an example of DNN, is known to be easy to extract features of input data (video or image) and identify patterns in the extracted output data. A CNN can be composed of convolutional operations, activation function operations, and pooling operations processed in a specific order.

For example, in each layer of a DNN, the parameters (i.e., input values, output values, weights, or kernels) may be a matrix of a plurality of channels. The parameters may be processed on a neural processing unit (NPU) by convolution or matrix multiplication. At each layer, an output value is generated after the operations are processed.

For example, a visual transformer or transformer is a DNN based on attention techniques. Transformers utilize many matrix multiplication operations. A transformer can use input values and parameters such as query (Q), key (K), and value (V) to obtain an output value, an attentions (Q,K,V). The transformer can perform various inference operations based on the output values (i.e., the attributes (Q,K,V)). Transformers tend to have better inference performance than CNNs.

The computation of conventional neural network models may involve issues such as high-power consumption, heat generation, bottlenecks in processor operations due to relatively low memory bandwidth, and latency in memory. To alleviate touch issues, embodiments relate to improving neural network models to relieve these issues. Specifically, when the data size of a neural network model is large, delays can occur frequently due to the inability to prepare the necessary data in advance. In such cases, the processor is starved or idle, unable to perform actual computations because it is not supplied with data to process, resulting in reduced computational performance. This problem can be exacerbated by the wide variety of electronic devices utilized in edge computing. The edge computing refers to the edge, or periphery, where computing takes place, and may include a variety of electronic devices that are located in close proximity to the devices that directly produce data. In addition, in a cloud computing system, a computing system that is located at the end of the cloud computing system, away from the servers in the data center, and communicates with the servers in the data center can be defined as an edge device. Edge devices may be utilized to perform tasks that require immediate and reliable performance, such as autonomous robots or self-driving cars that need to process vast amounts of data in less than ⅟₁₀₀₀th of a second. Accordingly, the number of applications for edge devices is rapidly increasing.

Embodiments relate to lightweighting neural network models that fit into standalone, low-power, low-cost neural processing units. In other words, embodiments relate to reducing the parameters of neural network models in order to allow them to be embedded in each electronic device and operate independently.

On the other hand, there are various problems that need to be resolved in order to commercialize the neural processing unit (NPU) that drives the neural network model. First, there is a lack of information for selecting a neural processing unit to drive a user-developed neural network model. Second, NPUs are just beginning to be commercialized, and to know whether a GPU-based neural network model will work on a specific NPU, users need to review various questionnaires, data sheets, and technical support from engineers. In particular, the number of layers, the size of parameters, and special functions can be changed according to the user's needs, making it difficult to generalize the neural network model. Third, it is difficult to know in advance whether the neural network model developed by the user will run on a specific NPU, which means that after purchasing an NPU, it may not be possible to run it because it does not support certain operations or calculations. Fourth, it is difficult to know in advance how a user-developed neural network model will perform when running on a specific NPU, i.e., whether it will meet the desired power consumption and desired frame per seconds (FPS). In particular, it is difficult to know the desired performance in advance because the size of the weight of the neural network model, the size of the feature map, the number of channels, the number of layers, and the characteristics of the activation function are different for each neural network model.

Embodiments also relate to enabling faster determination of the preferred NPU product selection and model update conditions on the selected NPU by providing a solution or service that provides the best convenience and value to the user by performing a series of tasks performed by the user online in batches when the AI code (e.g., TensorFlow™, PyTorch™, ONNX™ model file, and the like) is dropped (uploaded) to a specific online simulation service.

Embodiments relate to lightening the neural network model so that it can infer certain functions with a predetermined accuracy, while using a reduced amount of power and memory.

Embodiments also relate to improving a neural network model running on a neural processing unit by simulating various options for the neural network model. The parameters of each layer of a neural network model may be updated in order to efficiently quantize a graph-based neural network model.

The present disclosure will now be described in detail with reference to the accompanying drawings, which illustrate preferred embodiments of the present disclosure. Hereinafter, examples of the present disclosure will be described in detail with reference to the attached drawings.

FIG. 1 is a schematic diagram illustrating an example neural network model. Operations of a neural network model 110a that can be operated in the neural processing unit 100 will be described as an example. The neural network model 110a of FIG. 1 as an example may be a neural network trained to perform various inference functions such as object recognition and speech recognition. The neural network model 110a may be a deep neural network (DNN). However, the neural network model 110a according to examples of the present disclosure is not limited to a deep neural network. For example, the neural network model 110a may be Siamese Network, Triplet Network, Contrastive Loss, FaceNet, DeepID, SphereFace, ArcFace, Florence-2, DaViT, Mobile ViT, ViT, Swin-Transformer, Transformer, YOLO, CNN, PIDNet, BiseNet, RCNN, VGG, VGG16, DenseNet, SegNet, DeconvNet, DeepLAB V3+, U-net, SqueezeNet, Alexnet, ResNet18, MobileNet-v2, GoogLeNet, Resnet-v2, Resnet50, Resnet101, Inception-v3, and other models. The present disclosure is not limited to the models described above. The neural network model 110a may also be an ensemble model based on at least two different models.

In the following, an inference process performed by the neural network model 110a will be described as an example. The neural network model 110a is a deep neural network model including an input layer 110a-1, a first connection network 110a-2, a first hidden layer 110a-3, a second connection network 110a-4, a second hidden layer 110a-5, a third connection network 110a-6, and an output layer 110a-7 as an example. However, the present disclosure is not limited to the neural network model shown in FIG. 1. The first hidden layer 110a-3 and the second hidden layer 110a-5 may also be referred to as a plurality of hidden layers.

The input layer 110a-1 may include, for example, x1 and x2 input nodes, i.e., the input layer 110a-1 may include information about two input values. The first connection network 110a-2 may, for example, include information about six weight values for connecting each node of the input layer 110a-1 to each node of the first hidden layer 110a-3. Each weight value is multiplied with the input node value, and an accumulated value of the multiplied values is stored in the first hidden layer 110a-3. The weight values and input node values may be referred to as parameters of the neural network model. The first hidden layer 110a-3 may for example, include a1, a2, and a3 nodes, i.e., the first hidden layer 110a-3 may include information about three node values. The first processing element PE1 of FIG. 1 may process operations on the a1 node. The second processing element PE2 of FIG. 1 may process the operations of the a2 node. The third processing element PE3 of FIG. 1 may process the operations of the a3 node. The second connection network 110a-4 may include, for example, information about nine weight values for connecting each node of the first hidden layer 110a-3 to each node of the second hidden layer 110a-5. The weight values of the second connection network 110a-4 are each multiplied with the node values input from the first covert layer 110a-3, and the accumulated value of the multiplied values is stored in the second covert layer 110a-5.

The second hidden layer 110a-5 may exemplarily include nodes b1, b2, and b3, i.e., the second hidden layer 110a-5 may include information about three node values. The fourth processing element PE4 of FIG. 1 may process operations on the b1 node. The fifth processing element PE5 of FIG. 1 may process the operations of the b2 node. The sixth processing element PE6 of FIG. 1 may process the operations of node b3. The third connection network 110*a*-6 may include information about six weight values that connect each node of the second hidden layer 110*a*-5 with each node of the output layer 110*a*-7, for example. The weight values of the third connection network 110*a*-6 are each multiplied with the node values input from the second hidden layer 110*a*-5, and the accumulated value of the multiplied values is stored in the output layer 110*a*-7. The output layer 110*a*-7 may exemplarily include nodes y1, and y2, i.e., the output layer 110*a*-7 may include information about two node values. The seventh processing element PE7 of FIG. 1 may process operations on the y1 node. The eighth processing element PE8 of FIG. 1 may process the operation of the y2 node.

Each node may correspond to a feature value, and the feature value may correspond to a feature map.

Figure 2A:
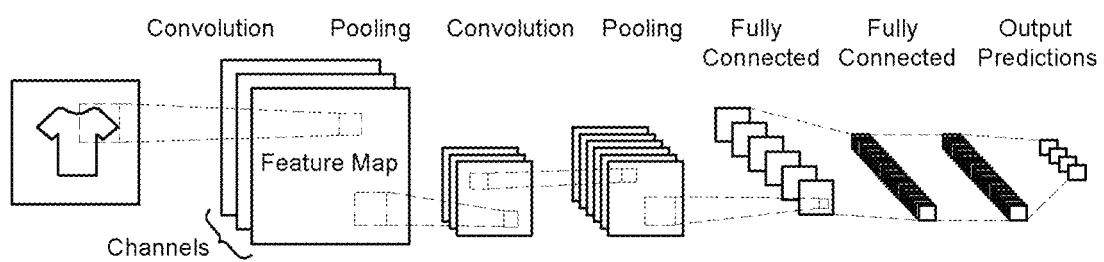
FIG. 2A is a drawing to illustrate the basic structure of a convolutional neural network.

FIG. 2A is a diagram to illustrate the basic structure of a convolutional neural network (CNN). Referring to FIG. 2A, an input image may be represented as a two-dimensional matrix comprising rows of a particular size and columns of a particular size. The input image may have a plurality of channels, where the channels may represent the number of color components of the input data image. The process of convolution involves a kernel traversing the input image at specified intervals.

A convolutional neural network can have a structure that passes the output value (convolution or matrix multiplication) of the current layer as the input value of the next layer. For example, a convolutional or matrix multiplication is defined by two main parameters: the input feature map and the kernel. Parameters can include input feature map, output feature map, activation map, weights, kernel, and attributes (Q, K, V). The convolution slides a kernel window over the input feature map. The size of the step by which the kernel slides over the input feature map is called the stride. After convolution, pooling may be applied. In addition, a fully-connected (FC) layer may be placed at the end of the convolutional neural network.

For the sake of simplicity, convolutional operations will be discussed below, but other operations such as matrix multiplication can be included in specific layers of a neural network model.

Figure 2B:
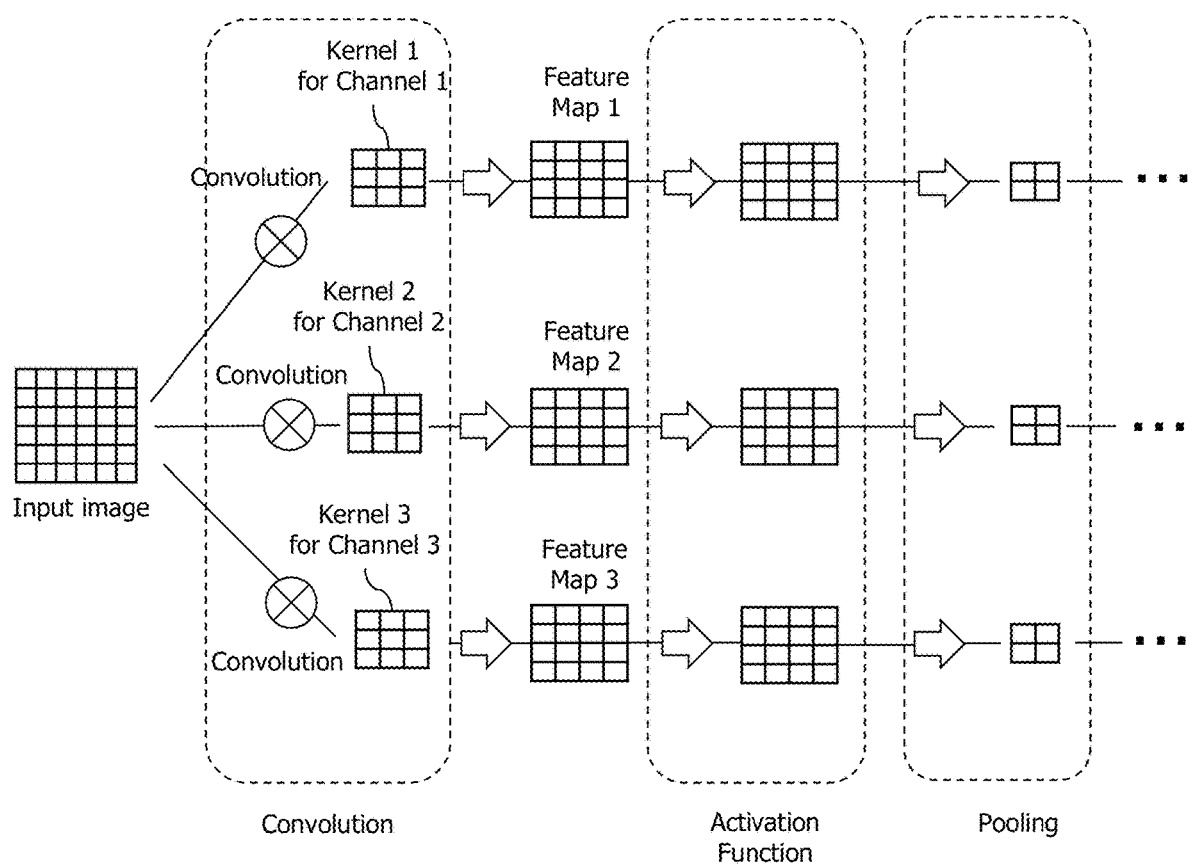
FIG. 2B is a schematic diagram to illustrate the behavior of a convolutional neural network.

FIG. 2B is a diagram illustrating the operation of a convolutional neural network. Referring to FIG. 2B, it is shown that an input image is a two-dimensional matrix with a size of 6×6 as an example. Also, in FIG. 2B, three nodes are used, namely channel 1, channel 2, and channel 3 as an example. The input image (exemplarily shown as 6×6 in FIG. 2B) is convolved with kernel 1 (exemplarily shown as 3×3 in FIG. 2B) for channel 1 at the first node, and feature map 1 (exemplarily shown as 4×4 in FIG. 2B) is output as a result. Further, the input image (exemplarily represented in FIG. 2B as 6×6 in size) is convolved with a kernel 2 (exemplarily represented in FIG. 2B as 3×3 in size) for channel 2 at a second node, and feature map 2 (exemplarily represented in FIG. 2B as 4×4 in size) is output as a result. Further, the input image is convolved with a kernel 3 (exemplarily represented in FIG. 2B as being 3×3 in size) for channel 3 at the third node, and a feature map 3 (exemplarily represented in FIG. 2B as being 4×4 in size) is output as a result. To process each convolution, the processing elements PE1 to PE12 of the neural processing unit 100 are configured to perform MAC operations.

The activation function may be applied to the feature map 1, feature map 2, and feature map 3 (each of which is shown in FIG. 2B as having a size of 4×4 as an example) output from the convolutional operation. The output after the activation function is applied may be a size of 4×4 as an example.

Feature map 1, feature map 2, and feature map 3 (each of which is 4×4 in the example of FIG. 2B), which are output from the above activation function, are input to three nodes. By taking the feature maps output from the activation function as input, pooling can be performed. The pooling can be done to reduce the size or to emphasize certain values in the matrix. Pooling methods include maximum value pooling, average pooling, and minimum value pooling. Maximum pooling is used to collect the maximum number of values within a certain region of the matrix, while average pooling can be used to average the values within a certain region.

In the example of FIG. 2B, a feature map of size 4×4 is shown to be reduced to a size of 2×2 by pooling. Specifically, the first node takes as input the feature map 1 for channel 1, performs pooling and outputs, for example, a 2×2 matrix. The second node takes as input the feature map 2 for channel 2, performs the pooling, and outputs, for example, a 2×2 matrix. The third node takes as input the feature map 3 for channel 3, performs pooling and outputs, for example, a 2×2 matrix.

The aforementioned convolution, activation function, and pooling are repeated, and finally, the output can be fully connected as shown in FIG. 2A.

Among the various deep neural network (DNN) methods, CNN is widely used in the field of computer vision. In particular, CNN has shown remarkable performance in various research areas performing various tasks such as image classification and object detection.

<Hardware Resources Required for Computation of the NN>.

Figure 3:
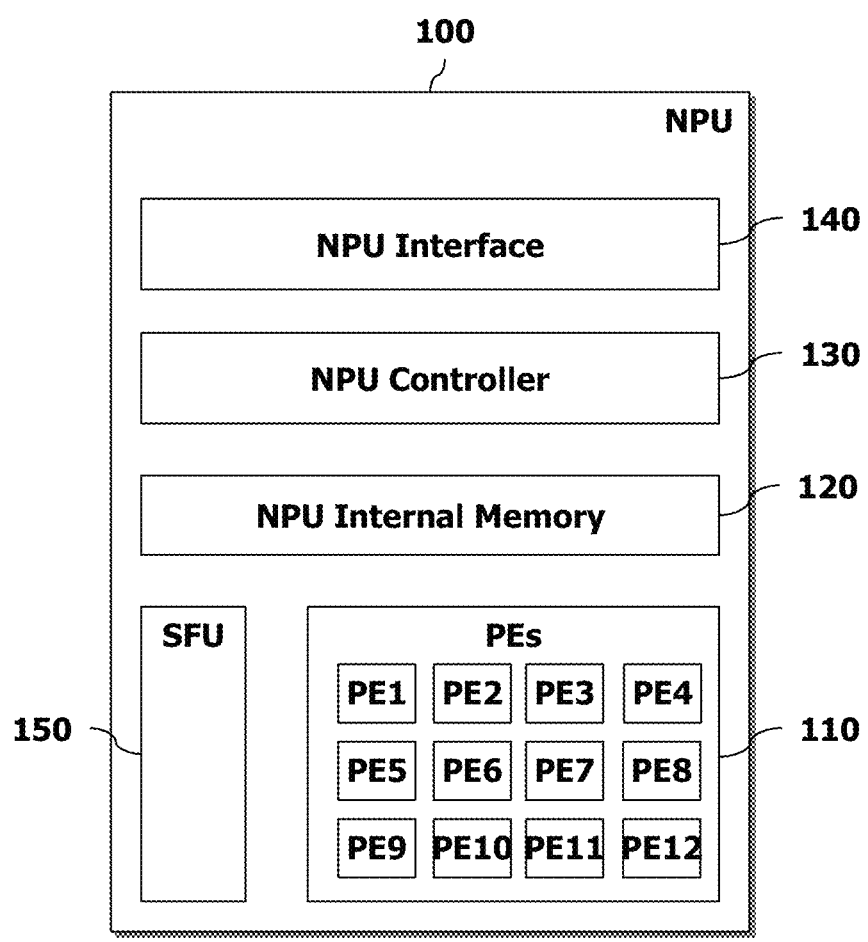
FIG. 3 is a schematic diagram illustrating a neural processing unit (NPU) according to an example of the present disclosure.

FIG. 3 is a schematic diagram illustrating a neural processing unit, according to an example of the present disclosure. The neural processing unit (NPU) 100 illustrated in FIG. 3 is a processor specialized to perform operations for a neural network.

A neural network refers to a network of artificial neurons that receives multiple inputs or stimuli, adds them together by multiplying their weights, and then transforms and delivers the sum of the deviations through an activation function. The trained neural network can then be used to output inference results from the input data. The neural processing unit 100 may be a semiconductor implemented as an electrical/electronic circuit. An electrical/electronic circuit may include a number of electronic elements, e.g., transistors, capacitors.

In the case of a neural network model based on a ViT, transformer, and/or CNN, the neural processing unit 100 may perform matrix multiplication operations, convolutional operations, and the like, depending on the graph structure of the neural network. For example, in each layer of a convolutional neural network (CNN), the input feature map corresponding to the input data and the kernel corresponding to the weights may be a tensor or matrix comprising a plurality of channels. A convolutional operation is performed on the input feature map and the kernel, and a convolutional operation and pooled output feature map are generated on each channel. An activation function is applied to the output feature map to generate an activation map for that channel. Pooling can then be applied to the activation map. The activation map may be collectively referred to herein as the output feature map. For convenience in the following description, the activation map will be referred to as the output feature map. Examples of the present disclosure are not limited thereto, and the output feature map may be subjected to a matrix multiplication operation or a convolution operation.

Furthermore, the output feature map according to the examples of the present disclosure should be interpreted as non-limiting. For example, the output feature map may be the result of a matrix multiplication operation or a convolution operation. Accordingly, the plurality of processing elements 110 may be modified to further include processing circuitry for additional algorithms, such that some circuit units of the special function unit (SFU) 150, which will be described later, may be included in the plurality of processing elements 110.

The neural processing unit 100 may include a plurality of processing elements 110 for processing convolutional and matrix multiplications required for the neural network operations described above. The neural processing unit 100 may include a respective processing circuit specialized for matrix multiplication operations, convolutional operations, activation function operations, pooling operations, stride operations, batch normalization operations, skip connection operations, concatenation operations, quantization operations, clipping operations, and padding operations required for the above-described neural network operations. For example, the neural processing unit 100 may be configured to include an SFU 150 for processing at least one of the above algorithms: activation function operation, pooling operation, stride operation, batch normalization operation, skip connection operation, concatenation operation, quantization operation, clipping operation, and padding operation. Specifically, the neural processing unit 100 may include a plurality of processing elements (PEs) 110, SFU 150, NPU internal memory 120, NPU controller 130, and NPU interface 140. Each of the plurality of processing elements 110, SFU 150, NPU internal memory 120, NPU controller 130, and NPU interface 140 may be a semiconductor circuit with numerous transistors connected thereto. As such, some of them may be difficult to identify and distinguish with the naked eye, and may be identified only by their behavior. For example, any of the circuits may operate as a plurality of processing elements 110, or may operate as an NPU controller 130. The NPU controller 130 may be configured to perform the functions of a control unit configured to control the neural network inference operations of the neural processing unit 100.

The neural processing unit 100 may include an NPU internal memory 120 for storing parameters of a neural network model that may be inferred by the plurality of processing elements 110 and the SFU 150, and an NPU controller 130 configured to control a computation schedule of the plurality of processing elements 110, the SFU 150, and the NPU internal memory 120.

The neural processing unit 100 may process feature maps in response to encoding and decoding schemes using scalable video coding (SVC) or scalable feature-map coding (SFC). The above methods are techniques for varying the amount of data transmission based on the effective bandwidth and signal to noise ratio (SNR) of the communication channel or communication bus. That is, the neural processing unit 100 may further include an encoder and a decoder.

The plurality of processing elements 110 may perform some of the operations for the neural network. The SFU 150 may perform other portions of the operations for the neural network. The neural processing unit 100 may perform hardware accelerate computation of the neural network model using the plurality of processing elements 110 and the SFU 150.

The NPU interface 140 may communicate with various elements connected to the neural processing unit 100, such as memory, via a system bus.

The NPU controller 130 may control the order of operations of the plurality of processing elements 110, operations of the SFU 150, and reads and writes to the NPU internal memory 120 for inference operations of the neural processing unit 100. The NPU controller 130 may control the plurality of processing elements 110, the SFU 150, and the NPU internal memory 120 based on control information included in a compiled neural network model.

The NPU controller 130 may analyze the structure of the neural network model to be operated on the plurality of processing elements 110 and SFU 150, or may be provided with information that has already been analyzed. The analyzed information may be information generated by the compiler. For example, the data of the neural network that the neural network model may include may include at least some of the following: node data of each layer (i.e., feature map), batch data of the layers, locality information or information about the structure, and weight data (i.e., weight kernel) of each of the connection networks connecting the nodes of each layer. The data of the neural network may be stored in memory provided within the NPU controller 130 or in the NPU internal memory 120. However, without limitation, the data of the neural network may be stored in a separate cache memory or register file provided in the NPU or an SoC including the NPU.

The NPU controller 130 may obtain scheduling information that schedules the order of operations of the neural network model to be performed by the neural processing unit 100 based on a directed acyclic graph (DAG) of the neural network model compiled by the compiler. The NPU controller 130 may be provided with scheduling information of a sequence of operations of the neural network model to be performed by the neural processing unit 100 based on information about data locality or structure of the compiled neural network model. For example, the scheduling information may be information generated by a compiler. The scheduling information generated by the compiler may be referred to as machine code, binary code, or the like.

The NPU controller 130 may obtain scheduling information that schedules the order of operations of the neural network model to be performed by the neural processing unit 100 based on the directed acyclic graph (DAG) of the neural network model compiled by the compiler. Here, the compiler may determine a computation schedule that can accelerate the computation of the neural network model based on the number of processing elements 110 of the neural processing unit 100, the size of the NPU internal memory 120, the size of the parameters of each layer of the neural network model, and the like. Based on the computation schedule, the NPU controller 130 may control the required number of processing elements 110 for each computation step and to control the read and write operations of the parameters required in the NPU internal memory 120 for each computation step.

In other words, the scheduling information utilized by the NPU controller 130 may be information generated by the compiler based on the data locality information or structure of the neural network model. The compiler may efficiently perform scheduling for the neural processing unit 100 based on how well it understands and reconstructs the neural network data locality, which is a unique property of the neural network model. Additionally, the compiler can efficiently schedule the NPU based on how well it understands the hardware architecture and performance of the neural processing unit 100. Additionally, when the neural network model is compiled by the compiler to be executed on the neural processing unit 100, the neural network data locality may be reconstructed. The neural network data locality may be reconfigured based on the algorithms applied to the neural network model and the operational characteristics of the processor.

The scheduling information may be reconstructed based on how the neural processing unit 100 processes the neural network model, e.g., feature map tiling technique, stationary type (e.g., weight stationary, input stationary, or output stationary) for processing of processing elements, and the like. Additionally, the scheduling information may be reconfigured based on the number of processing elements in the neural processing unit 100, the capacity of the internal memory, and the like. Furthermore, the scheduling information may be reconfigured based on the bandwidth of the memory communicating with the neural processing unit 100. This is because each of the factors described above may cause the neural processing unit 100 to determine a different order of data required for each clock of a clock signal, even when computing the same neural network model.

The compiler may determine the order of data to be computed by the neural network model based on the order of operation of the layers, unit convolutions, and/or matrix multiplications of the neural network to determine data locality and generate the compiled machine code.

The NPU controller 130 may utilize the scheduling information contained in the machine code. Based on the scheduling information, the NPU controller 130 may obtain a memory address value where the feature map and weight data of the layers of the neural network model are stored. For example, the NPU controller 130 may obtain the memory address value where the feature maps and weight data of the layers of the neural network model stored in the memory. Thus, the NPU controller 130 may fetch the feature maps and weight data of the layers of the neural network model to be executed from the main memory and store them in the NPU internal memory 120. For example, based on the data locality information of the neural network model, the neural processing unit 100 may set a memory map of the main memory for efficient read/write operations of the parameters (e.g., weights and feature maps) of the neural network model to reduce the latency of data transmission between the main memory and the NPU internal memory 120.

Each layer's feature map can have a corresponding memory address value. Each weight data may have a corresponding respective memory address value.

The NPU controller 130 may be provided with scheduling information about the order of operations of the plurality of processing elements 110 based on information about data locality or structure of the neural network model, such as batch data of layers of the neural network of the neural network model, locality information, or information about structure. The scheduling information may be generated in a compilation step.

Because the NPU controller 130 operates based on scheduling information generated from information about data locality or structure of the neural network model, it may operate differently from the scheduling concepts of a typical CPU. The scheduling of a conventional CPU operates to achieve the best efficiency by considering fairness, efficiency, stability, and response time, e.g., it schedules the most processing to be performed in the same amount of time by considering priority, computation time, and the like.

Conventional CPUs use algorithms to schedule tasks by considering data such as the priority of each task and the processing time of the task. In contrast, the NPU controller 130 can control the neural processing unit 100 in a processing order of the neural processing unit 100 determined based on information about data locality or structure of the neural network model. Further, the NPU controller 130 may drive the neural processing unit 100 in a processing order determined based on the information about the data locality information or structure of the neural network model and/or the information about the data locality information or structure of the neural processing unit 100 to be used. In other words, caching strategies (e.g., LRU, FIFO, LFU) used in von Neumann structures are inefficient for controlling the NPU internal memory 120 of the neural processing unit 100. Since the neural network model has a directed acyclic graph (DAG) algorithmic structure rather than a simple chain-structured algorithm, the operation of the neural processing unit 100 is efficient with a caching strategy that recognizes the data locality of the neural network model. However, the present disclosure is not limited to information about data locality or structure of the neural processing unit 100.

The NPU controller 130 may be configured to store information about the data locality information or structure of the neural network. In other words, the NPU controller 130 can determine the processing order by utilizing at least the information about the data locality information or structure of the neural network of the neural network model. Further, the NPU controller 130 may determine the processing order of the neural processing unit 100 by considering information about the data locality information or structure of the neural network model and information about the data locality information or hardware structure of the neural processing unit 100. Furthermore, it is possible to improve the processing of the neural processing unit 100 in the determined processing order. That is, the NPU controller 130 may operate based on machine code compiled from a compiler, but in another example, the NPU controller 130 may include an embedded compiler. According to the configurations described above, the neural processing unit 100 may be configured to generate machine code by receiving input files in the form of frameworks of various AI software. For example, AI software frameworks include TensorFlow, PyTorch, Keras, XGBoost, mxnet, DARKNET, ONNX, and the like.

The plurality of processing elements 110 refer to a configuration of a plurality of processing elements (PE1 to PE12) configured to compute the feature map and weight data of the neural network. Each processing element may include a multiply and accumulate (MAC) operator and/or an arithmetic logic unit (ALU) operator. However, examples according to the present disclosure are not limited thereto. Each processing element may be configured to optionally further include additional special function unit circuitry to handle additional specialized functions. For example, the processing element PE may be modified to further include a batch-regularization unit, an activation function unit, an interpolation unit, and the like.

The SFU 150 may include a functional unit for skip-connection operations, a functional unit for activation function operations, a functional unit for pooling operations, a functional unit for dequantization operations, a functional unit for quantization operations, and a functional unit for non-maximum suppression (NMS) operations, a functional unit for a batch-normalization operation, a functional unit for an interpolation operation, a functional unit for a concatenation operation, and a functional unit for a bias operation, may be selected according to the graph module of the neural network model and may include circuitry configured to process them. In other words, the SFU 150 may include a plurality of specialized functional computation processing circuit units. The SFU 150 may include circuitry to process various operations that are difficult to process in a processing element.

According to examples of the present disclosure, a floating-point number format may be implemented in a variety of formats and may be configured to have a mantissa of a particular bit width and an exponent of a particular bit width. The examples of the present disclosure are not limited to the bit width of the mantissa and/or the bit width of the exponent of the parameters to be processed on a particular neural processing unit. In some examples, the floating-point number may be substituted with a brain-floating number.

The plurality of processing elements is shown in FIG. 3 may include a plurality of operators implemented as a plurality of multipliers and adder trees in parallel, replacing the MAC circuit included a single processing element. In such cases, the plurality of processing elements 110 may be referred to as at least one processing element comprising a plurality of operators.

The plurality of processing elements 110 include a plurality of processing elements PE1 to PE12. The plurality of processing elements PE1 to PE12 shown in FIG. 3 are illustrative only, and the number of the plurality of processing elements PE1 to PE12 is not limited. The number of the plurality of processing elements PE1 to PE12 may determine the size or number of the plurality of processing elements 110. The size of the plurality of processing elements 110 may be implemented in the form of an N×M matrix. Where N and M are integers greater than zero. The plurality of processing elements 110 may include N×M processing elements, i.e., there may be more than one processing element.

The size of the plurality of processing elements 110 can be designed taking into account the characteristics of the neural network model in which the neural processing unit 100 operates.

The plurality of processing elements 110 are configured to perform functions such as addition, multiplication, accumulation, and the like that are necessary for computing the neural network. In other words, the plurality of processing elements 110 may be configured to perform multiplication and accumulation (MAC) operations.

Hereinafter, a first processing element PE1 of the plurality of processing elements 110 will be described by way of example.

Figure 4A:
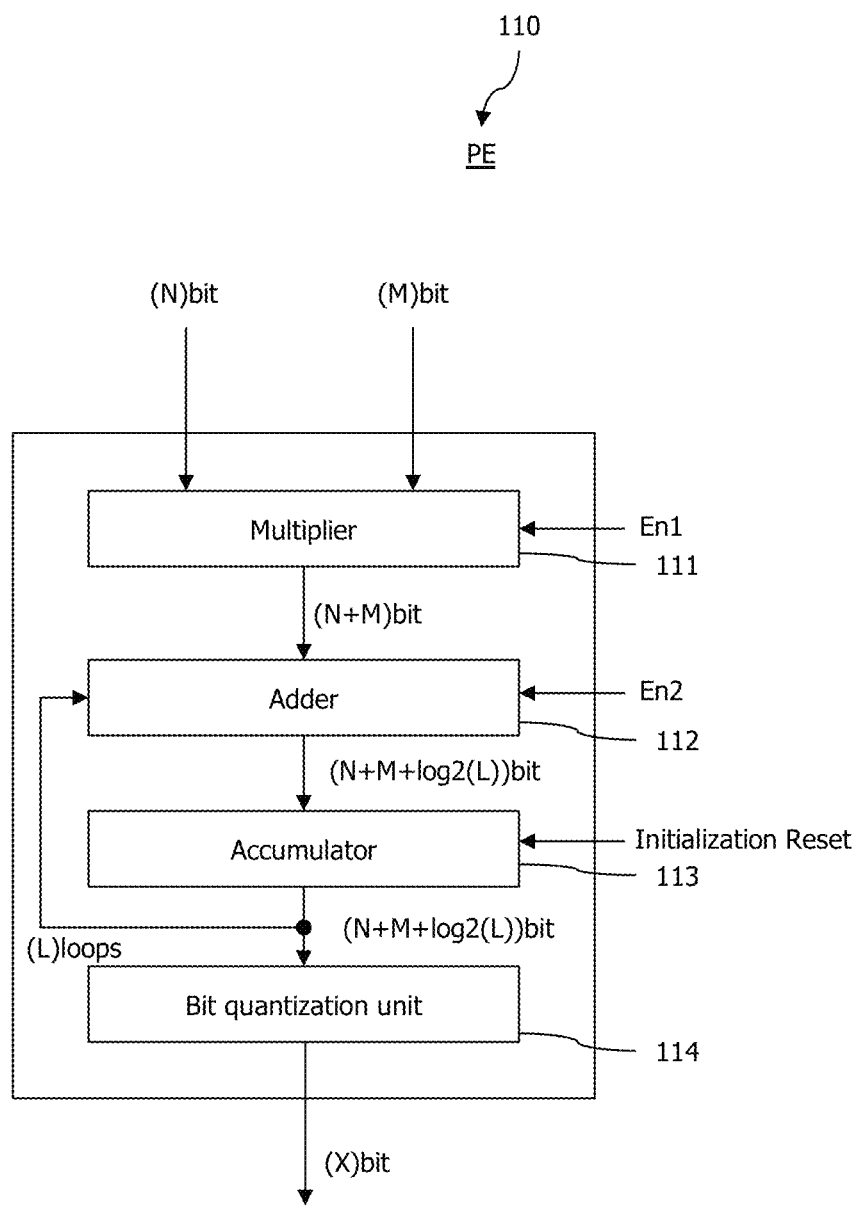
FIG. 4A is a schematic diagram illustrating one processing element (PE) of a plurality of processing elements that may be applied in an example of the present disclosure.

FIG. 4A is a schematic diagram illustrating a processing element of a plurality of processing elements that may be applicable to an example of the present disclosure.

A neural processing unit 100 according to an example of the present disclosure may include a plurality of processing elements 110, an NPU internal memory 120 configured to store a neural network model that may be inferred by the plurality of processing elements 110, and an NPU controller 130 configured to control the plurality of processing elements 110 and the NPU internal memory 120, the plurality of processing elements 110 configured to perform MAC operations, and the plurality of processing elements 110 configured to quantize and output results of the MAC operations. However, examples of the present disclosure are not limited thereto.

The NPU internal memory 120 may store all or part of the neural network model depending on the memory size and the data size of the neural network model.

The first processing element PE1 may include a multiplier 111, an adder 112, an accumulator 113, and a bit quantization unit 114. However, examples according to the present disclosure are not limited, and the plurality of processing elements 110 may be modified to account for the computational characteristics of the neural network.

The multiplier 111 multiplies the input N-bit data and the M-bit data. The result of the operation of the multiplier 111 is output as (N+M)-bit data.

The multiplier 111 may be configured to receive one weight parameter and one feature map parameter as input.

The multiplier 111 may be configured to operate in a zero skipping manner when a value of zero for a parameter is input to one of the inputs of the first input and the second input of the multiplier 111. In such a case, the multiplier 111 may be disabled when the multiplier 111 receives an input of a weight parameter or feature map parameter having a value of zero. Thus, the multiplier 111 may be configured to reduce power consumption of the plurality of processing elements 110 when processing a weight parameter with a pruning algorithm applied, or when the feature map parameter has a value of zero. Accordingly, the processing element including the multiplier 111 may be disabled.

The accumulator 113 accumulates the operation value of the multiplier 111 and the operation value of the accumulator 113 using the adder 112 for a number of L-loops. Thus, the bit width of the data at the output and input of the accumulator 113 may be output as (N+M+log 2 (L)) bit, where L is an integer greater than zero.

When the accumulator 113 finishes accumulating, the accumulator 113 may receive an initialization signal (initialization reset) to initialize the data stored inside the accumulator 113 to zero. However, the examples according to the present disclosure are not limited thereto.

The bit quantization unit 114 may reduce the bit width of the data output from the accumulator 113. The bit quantization unit 114 may be controlled by the NPU controller 130. The bit width of the quantized data may be output as X-bit, where X is an integer greater than zero. According to the configuration described above, the plurality of processing elements 110 are configured to perform a MAC operation, and the plurality of processing elements 110 has the effect that the results of the MAC operation can be quantized and output. In particular, this quantization has the effect of further reducing power consumption as the number of L-loops increases. Also, reducing power consumption has the effect of reducing heat generation. In particular, reducing heat generation has the effect of reducing the possibility of malfunctions caused by high temperatures in the neural processing unit 100.

The output data X-bit of the bit quantization unit 114 can be the node data of the next layer or the input data of the convolutional processor. If the neural network model is quantized, the bit quantization unit 114 may be configured to receive the quantized information from the neural network model. However, without limitation, the NPU controller 130 may also be configured to analyze the neural network model to extract the quantized information. Thus, the output data X-bit may be converted to a quantized bit width to correspond to the quantized data size. The output data X-bit of the bit quantization unit 114 may be stored in the NPU internal memory 120 in the quantized bit width.

The plurality of processing elements 110 of the neural processing unit 100 according to an example of the present disclosure may include a multiplier 111, an adder 112, and an accumulator 113. A bit quantization unit 114 may be selected depending on whether quantization is to be applied. In other examples, the bit quantization unit may be configured to be included in the SFU 150.

Figure 4B:
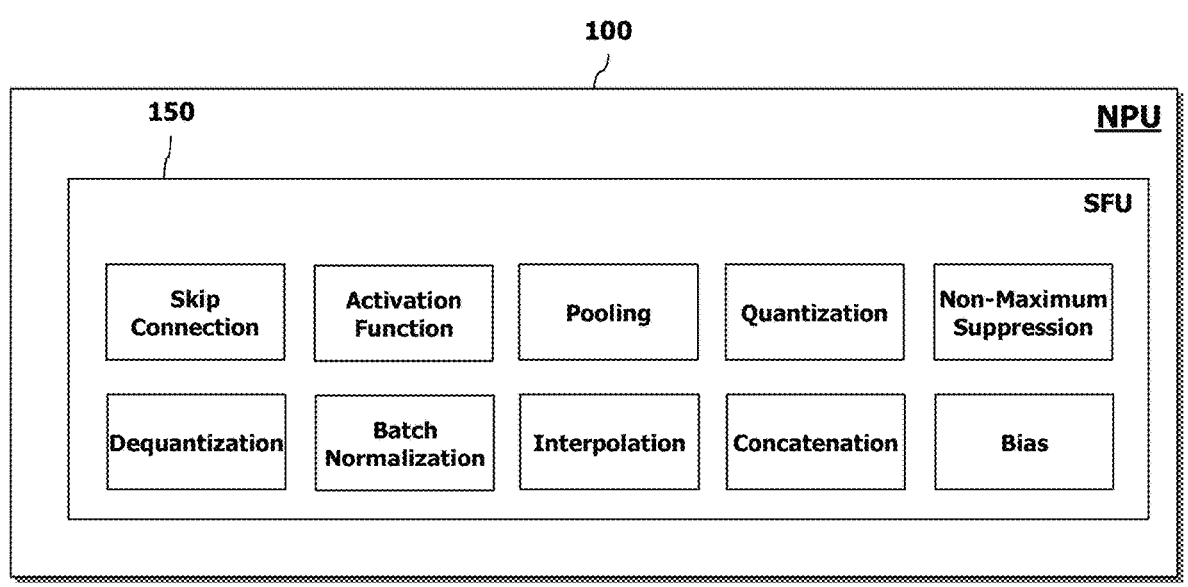
FIG. 4B is a schematic diagram illustrating a special function unit (SFU) that may be applicable to an example of the present disclosure.

FIG. 4B is a schematic diagram illustrating an SFU that may be applicable to an example of the present disclosure.

Referring to FIG. 4B, the SFU 150 may include multiple functional units. Each functional unit may be selectively actuated. Each functional unit may be selectively turned on or off, i.e., each functional unit is configurable.

In other words, the SFU 150 may include a variety of circuitry units necessary for performing neural network inference operations.

For example, the circuit units of the SFU 150 may include a functional unit for skip-connection operations, a functional unit for activation function operations, a functional unit for pooling operations, a functional unit for dequantization operations, a functional unit for quantization operations, a functional unit for non-maximum suppression (NMS) operations, a functional unit for batch-normalization operations, a functional unit for interpolation operations, a functional unit for concatenation operations, and a functional unit for bias operations. In addition, since certain functional unit need to be processed with floating-point parameters, conversion of floating-point parameters to integer parameters may optionally be performed in the SFU 150. Each functional unit may comprise a respective circuitry. The functional unit for the quantization operation and the functional unit for the de-quantization operation may be integrated into one circuit.

The functional units of the SFU 150 may be selectively turned on and/or off based on the data locality information of the neural network model. The data locality information of the neural network model may include control information related to turning on or off a corresponding functional unit when computation for a particular layer is performed.

Among the functional units of the SFU 150, an active unit may be turned on. In this way, selectively turning off some functional units of the SFU 150 may reduce power consumption of the neural processing unit 100. Alternatively, power gating may be utilized to turn off some functional units. Alternatively, clock gating may be performed to turn off some functional units.

Figure 5:
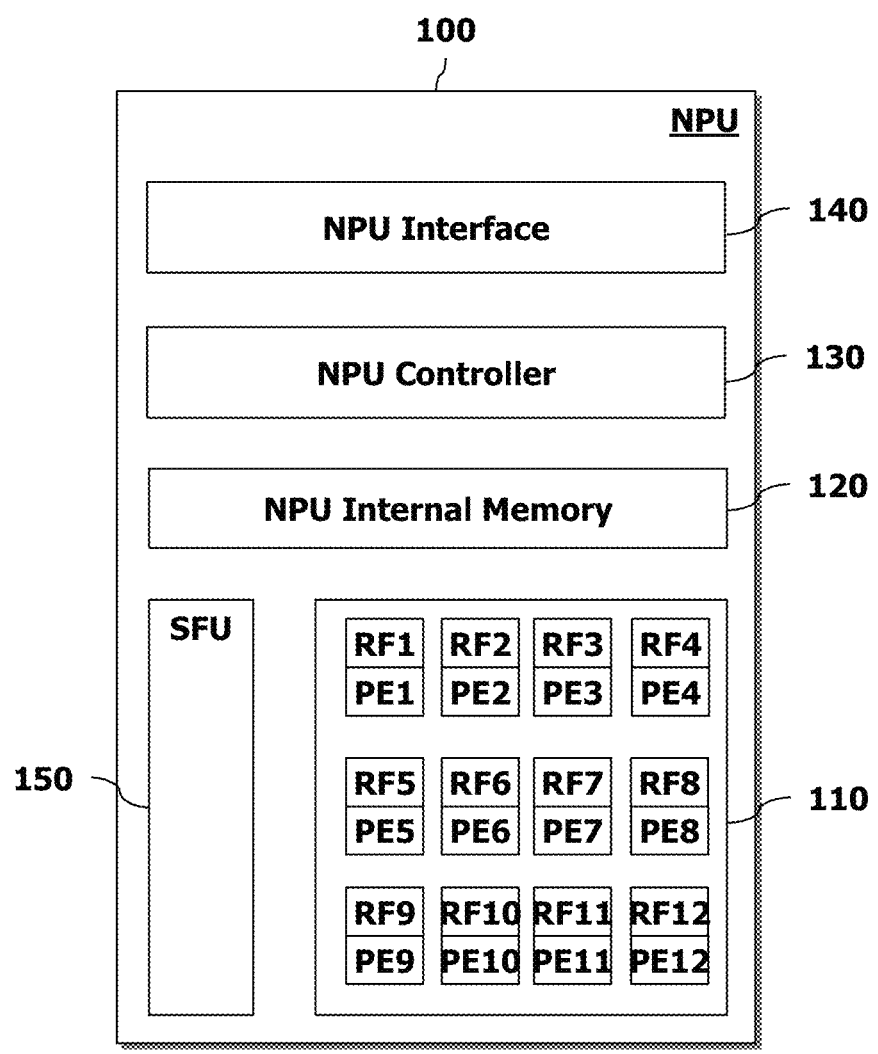
FIG. 5 is an example diagram illustrating a variation of the neural processing unit shown in FIG. 3.

FIG. 5 is an example diagram illustrating a variation of the neural processing unit 100 shown in FIG. 3.

Since the neural processing unit 100 shown in FIG. 5 is substantially the same as the processing unit 100 exemplified in FIG. 3, with the exception of the plurality of processing elements 110, redundant description may be omitted herein for ease of explanation only.

The plurality of processing elements 110 shown in FIG. 5 may further include, in addition to the plurality of processing elements PE1 to PE12, respective register files RF1 to RF12 corresponding to each of the processing elements PE1 to PE12.

The plurality of processing elements PE1 to PE12 and the plurality of register files RF1 to RF12 shown in FIG. 5 are illustrative only, and the number of the plurality of processing elements PE1 to PE12 and the plurality of register files RF1 to RF12 is not limited.

The number of the plurality of processing elements PE1 to PE12 and the number of the plurality of register files RF1 to RF12 may determine the size or number of the plurality of processing elements 110. The size of the plurality of processing elements 110 and the plurality of register files RF1 to RF12 may be implemented in the form of an N×M matrix, where N and M are integers greater than zero.

The array size of the plurality of processing elements 110 may be designed in consideration of the characteristics of the neural network model in which the neural processing unit 100 operates. In particular, the memory size of the register file may be determined by considering the data size of the neural network model to be operated, the required operation speed, the required power consumption, and the like.

The register files RF1 to RF12 of the neural processing unit 100 are static memory units directly connected to the processing elements PE1 to PE12. The register files RF1 to RF12 may comprise, for example, flip-flops and/or latches. The register files RF1 to RF12 may be configured to store MAC operation values of the corresponding processing elements PE1 to PE12. The register files RF1 to RF12 may be configured to provide or receive weight data and/or node data with the NPU internal memory 120.

The register files RF1 to RF12 may also be configured to function as temporary memory for the accumulator during MAC operations.

In order to accelerate AI computation, the neural processing unit 100 specialized for AI computation may have various hardware circuit configurations. On the other hand, a conventional neural network model is a neural network model that is trained without considering the hardware characteristics of the neural processing unit 100. That is, the conventional neural network model is trained without considering the hardware limitations of the neural processing unit 100. Therefore, when processing a conventional neural network model, the processing performance on the corresponding neural processing unit 100 may not be lower than desired. For example, processing performance degradation may be due to inefficient memory management and processing of large computational volumes of the neural network model. Therefore, the conventional neural processing unit 100 for processing a conventional neural network model may use high power consumption and/or have a low computational processing speed problem.

Examples of the Present Disclosure

A neural network model optimization device 1500 according to an example of the present disclosure improves a neural network model by utilizing structural data of the neural network model or hardware characteristic data of the neural processing unit 100. Thus, when the improved neural network model when processed in the neural processing unit 100 provides relatively improved performance with reduced power consumption compared to those of the unimproved neural network model.

The neural network model executed in the neural processing unit 100 may be processed in a corresponding dedicated circuit unit of the neural processing unit 100 at each step, and quantization and de-quantization of the input/output parameters processed in each dedicated circuit unit may be performed, which has the effect of reducing power consumption of the neural processing unit 100, improving processing speed, reducing memory bandwidth, minimizing deterioration of inference accuracy, and the like.

The neural network model optimization unit 1500 may be configured to improve a neural network model for the neural processing unit 100.

Figure 6:
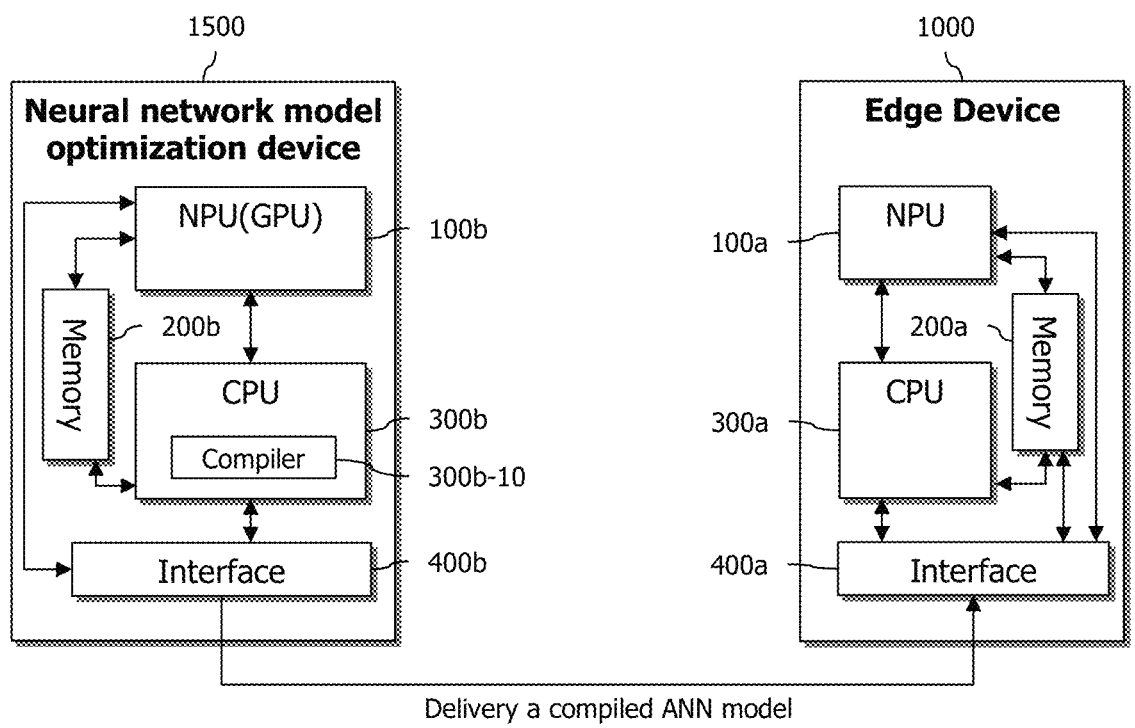
FIG. 6 is an illustrative diagram depicting a neural network model optimization device and an edge device, according to an example of the present disclosure.

FIG. 6 is a diagram illustrating a neural network model optimization device 1500 and an edge device 1000 as an example, according to an example of the present disclosure. As shown, the neural network model optimization device 1500 is a separate, external system configured to improve a neural network model used by the neural processing unit 100a in the edge device 1000 according to an example of the present disclosure. Thus, the neural network model optimization device 1500 may also be referred to as a dedicated neural network model emulator or neural network model simulator of the neural processing unit 100a in the edge device 1000.

The edge device 1000 may include the neural processing unit 100a, the memory 200a, the CPU 300a, and the interface 400a.

The neural network model optimization device 1500 may include a neural processing unit (NPU) or graphics processing unit (GPU) 100b, memory 200b, CPU 300b, and interface 400b.

The neural network model optimization device 1500 may be in communication with the neural processing unit 100a in the edge device 1000. To this end, the interface 400b of the neural network model optimization device 1500 may establish a link or session with the interface 400a of the edge device 1000. The interface may be an interface based on IEEE 802.3 for wired LAN or IEEE 802.11 for wireless LAN. Alternatively, the interface may be a peripheral component interconnect express (PCIe) based interface or a personal computer memory card international association (PCMCIA) based interface. Alternatively, the interface may be a universal serial bus (USB) based interface. However, the examples of the present disclosure are not limited to any particular interface and various interfaces may be employed.

The neural network model optimization device 1500 may improve a neural network model to be driven by the neural processing unit 100a in the edge device 1000. To this end, the neural network model optimization device 1500 may receive the neural network model from the edge device 1000. Alternatively, the neural network model optimization device 1500 may be configured to separately receive a neural network model from an external device.

When the neural network model optimization device 1500 receives the neural network model to be executed by the neural processing unit 100a in the edge device 1000, the model may be stored in the memory 200b in the neural network model optimization device 1500.

If the provided neural network model is generated by a particular machine learning framework, the neural network model may not be immediately operable on the edge device 1000. Therefore, the compiler 300b-10 of the neural network model optimization device 1500 may be configured to compile the neural network model to generate machine code that is operable on the neural processing unit 100a of the edge device 1000.

The compiler 300b-10 may be embodied as a semiconductor circuit. Alternatively, the compiler 300b-10 may be embodied as software stored in the memory 200b and executed by the CPU 300b. The CPU 300b in the neural network model optimization device 1500 may execute the compiler 300b-10. The compiler 300b-10 may be a software or a group of software that work together. For example, certain submodules of the compiler 300b-10 may be included in the first software, and other submodules may be included in the second software. The compiler 300b-10 may compile a neural network model stored in the memory 200b by improving it for the neural processing unit 100a of the edge device 1000.

To improve the neural network model, the neural network model optimization device 1500 may analyze the neural network model to be updated. Specifically, the compiler 300b-10 of the neural network model optimization device 1500 may analyze the neural network model. The neural network model optimization device 1500 may analyze parameter information of each layer of the neural network model. The neural network model optimization device 1500 may analyze the size of the weight parameters and feature map parameters of each layer. The neural network model optimization device 1500 may also analyze the connectivity between the respective layers. The neural network model optimization device 1500 may analyze the magnitude of the input parameters and output parameters of each layer. Here, a parameter of the multidimensional matrix may be referred to as a tensor. The neural network model optimization device 1500 may analyze the function modules applied to each layer. The neural network model optimization device 1500 may analyze the bifurcation points of a particular layer. The neural network model optimization device 1500 may analyze the merge points of the particular layers.

Further, the neural network model optimization device 1500 may analyze non-graph-based function modules applied to each layer. The neural network model optimization device 1500 may convert the non-graph-based function modules into graph-based modules. For example, the non-graph-based functions included in each layer may include, for example, add function, subtract function, multiply function, divide function, convolution function, matrix multiplication function, slice function, concatenation function, tensor view function, reshape function, transpose function, softmax function, permute function, chunk function, split function, clamp function, flatten function, tensor mean function, and sum function. The slice function may extract a portion of the tensor. The slice function may be used to select a particular element or range in a particular dimension of the tensor. The concatenation function can combine two or more tensors along a specified axis. The concatenation function is used to connect tensors to create a larger tensor, and can often be utilized to combine data along batch or feature dimensions. The tensor view function can reshape a tensor without changing the data. The tensor view function can change the appearance of a tensor by providing a different representation of the same data, making it compatible with different operations. The reshape function can change the shape of a tensor. The reshape function is used to modify the dimensions of a tensor and can change the existing data if the new shape is incompatible with the existing data. The transpose function can swap the dimensions of a tensor. The transpose function can be used to swap the dimensions of a tensor, primarily for operations such as matrix multiplication. The softmax function can transform a vector of real numbers into a probability distribution. The softmax function is often used in multi-class classification problems to obtain class probabilities from the output layer of a neural network. The permute function can change the dimensions of a tensor in a specified order. The permute function is similar to the transpose function, but the dimensions can be reordered arbitrarily. The chunk function can break the tensor into a specific number of chunks along the specified dimensions. The chunk function can be used to divide a tensor into chunks of equal size or a specified size. The split function can split a tensor into multiple tensors along a specified dimension. Unlike chunk, the split function can provide more flexibility to specify the size of the resulting chunks. The clamp function can clip the values of a tensor to within a specified range. The clamp function can be useful for constraining the value of a tensor to a specific range in updating scenarios. The flatten function can convert a multidimensional tensor to a one-dimensional tensor. The flatten function is often used in neural networks to transition from a convolutional layer to a fully connected layer. The tensor mean function can compute the average of a tensor along a specified dimension. The tensor mean function is often used for normalization or data summarization and can be useful for obtaining the average value of a tensor along a particular axis. These functions may be provided as non-graph-based functions in certain machine learning framework. The neural network model optimization device 1500 may explore the non-graph-based functions.

The neural network model optimization device 1500 may be configured to further receive data about the hardware of the neural processing unit 100a within the edge device 1000. Data about the hardware of the neural processing unit 100a may include, for example, information about the internal memory 120 within the neural processing unit 100a (e.g., size of the internal memory, bitwidth of read/write operations to the internal memory, information about the type/structure/speed of the internal memory), information about whether integer or floating-point operations are supported, and if so, how many bits of integer can be operated on (e.g., int8, and the like), information about whether it can operate on floating-point numbers, and if so, how many bits of floating-point numbers can be supported, information about the frequency of operation, information about the number of PEs, information about the type of special function unit, and the like. However, the present disclosure is not limited thereto.

Figure 7:
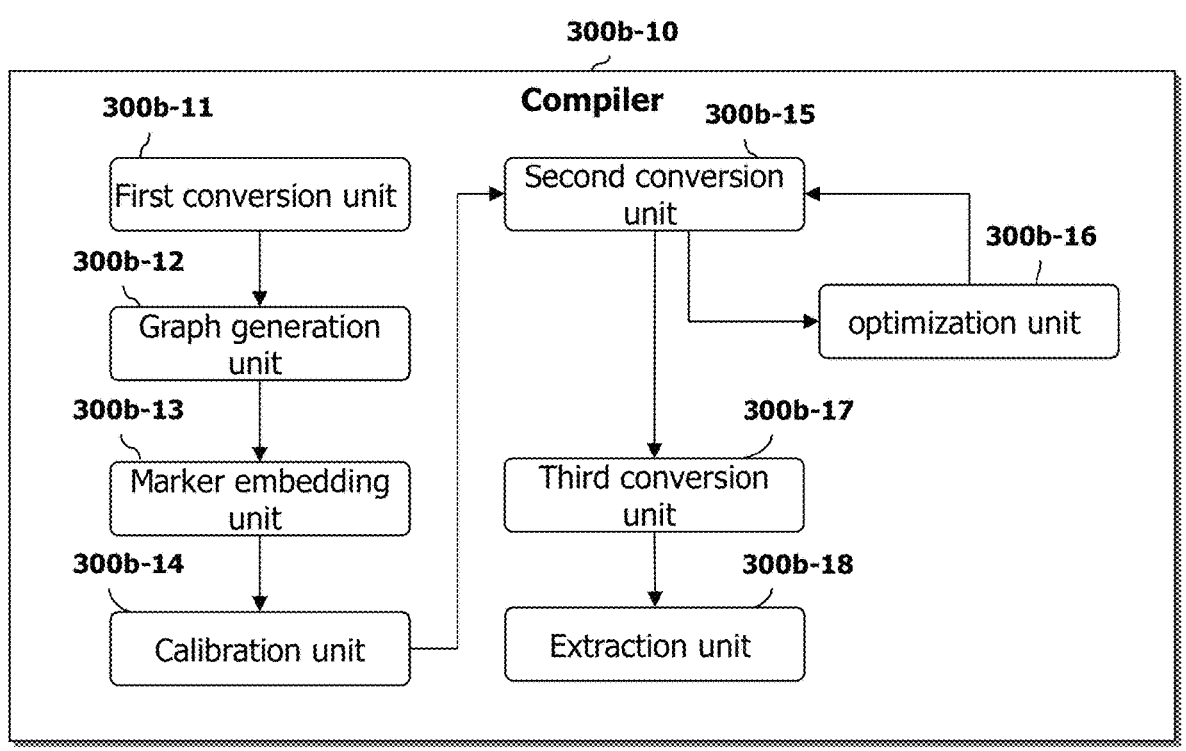
FIG. 7 is an illustrative diagram detailing the compiler shown in FIG. 6 according to an example of the present disclosure.

To improve the neural network model, the compiler 300b-10 may include the components shown in FIG. 7. Details of the compiler will be discussed below.

The memory 200b in the neural network model optimization device 1500 may store the software when the compiler 300b-10 is implemented as software, as described above. The CPU 300b of the neural network model optimization device 1500 may execute the software.

The memory 200b in the neural network model optimization device 1500 may store a neural network model to be driven by the neural processing unit 100a in the edge device 1000. Further, when improvement of the neural network model is completed in the neural network model optimization device 1500, the memory 200b in the neural network model optimization device 1500 may store the improved neural network model.

FIG. 7 is an example diagram illustrating the compiler 300b-10 shown in FIG. 6.

As can be seen with reference to FIG. 7, the compiler 300b-10 may include a first conversion unit 300b-11, a graph generation unit 300b-12, a marker embedding unit 300b-13, a calibration unit 300b-14, a second conversion unit 300b-15, an optimization unit 300b-16, a third conversion unit 300b-17, and an extraction unit 300b-18. The optimization portion 300b-16 may be optionally executed depending on compilation options.

Before describing compiler 300b-10 according to an example of the present disclosure, the difference between a non-graph-based neural network model and a graph-based neural network model will be discussed. In a non-graph-based neural network model, at least some of the operations of each layer of the plurality of layers are processed in a function call technique. The function call method is a way to process neural network operations by calling a predefined function and inputting corresponding input parameters to the function. This method can be convenient in terms of coding when designing a neural network model.

Each unit in FIG. 7 may be implemented as software, firmware and/or hardware. Each unit may be referred to as part, module, portion, block, and the like.

However, in order to compile a non-graph-based neural network model (i.e., a first neural network model) for accelerated computation on the neural processing unit 100a of the edge device 1000, several technical issues need to be addressed.

First, a non-graph-based (i.e., function-calling) neural network model may not be compilable by a compiler of the neural processing unit 100a of a particular structure, e.g., a compiler for the neural processing unit 100a of a particular structure may be designed to compile only graph-based neural network models, e.g., the compiler may not be able to compile a function-calling neural network model. The reason for this is that in a function-calling neural network model, the connections between the computational steps of each layer are not clearly defined, e.g., the flow of the computational steps of each layer (i.e., the connections between each graph module) of a non-graph-based (i.e., function-calling) neural network model may not be clearly defined. Specifically, because function-calling methods only operate when a function is called, the inputs and outputs outside of the neural network model may not be traceable. When a function of such a function call method is converted to a graph module, the compiler 300b-10 can track the inputs and outputs of the graph modules of the neural network model to be compiled. The graph module for a function call may be defined in advance. Also, for the above graph modules, a function that inherits a module class can be defined in advance, so that a directed acyclic graph (DAG) can be generated by connecting the graph modules. Next, in the case of the neural processing unit 100a of the edge device 1000, the internal memory (on-chip memory) may have a limited capacity, and in the case of an operation scenario with a small memory capacity, the caching efficiency of the data may have a significant impact on the performance of the edge device 1000. That is, if a neural network model is compiled without analyzing the connective relationship between each operation step in advance, the caching efficiency of the data may be reduced in the neural processing unit 100a of the edge device 1000. If the caching efficiency decreases, the amount of data transfer between the NPU internal memory 120 and the main memory 200a of the neural processing unit 100a of the edge device 1000 may increase unnecessarily (e.g., copying redundant data, moving unnecessary data, and deleting data to be used later).

In the case of a graph-based neural network model (e.g., a second neural network model) utilizing the graph modules converted in the first conversion unit 300b-11 of the compiler 300b-10 according to an example of the present disclosure, the connective relationship between each layer may be clearly analyzed. For example, the compiler 300b-10 may analyze the connectivity of the output data of the first layer of a typical neural network model, the output data of the first layer is utilized as input data for the second layer associated with the first layer. Furthermore, since the series of computational steps contained within each layer may also be represented by graph modules, the connective relationships within each layer may also be clearly defined. Thus, the compiler 300b-10 may utilize the above connectivity relationships during the compilation to improve memory management (e.g., caching) of the NPU internal memory 120 of the neural processing unit 100a of the edge device 1000. Additionally, the compiler 300b-10 may determine job-scheduling of the neural processing unit 100a processing a particular neural network model based on the above connectivity relationships during the compilation.

Therefore, in order to improve the computational acceleration of the neural network model in the neural processing unit 100a of the edge device 1000, the non-graph-based neural network model may be converted into a graph-based neural network model. Furthermore, compiling a graph-based neural network model may be more efficient than compiling a function-calling neural network model because the number of unexpected cases may be reduced during compilation.

The following describes a method for converting a function call type neural network model into a graph-based neural network model through a compiler 300b-10, and then quantizing the parameters of the neural network model. First, the first conversion unit 300b-11 receives a first neural network model as input. At least one layer of the first neural network model may include at least one function call instruction. That is, the first neural network model may be a neural network model including at least one function call instruction. Here, the compiler 300b-10 performs a series of steps to improve the first neural network model.

The first conversion unit 300b-11 may convert multiple function call instructions in the first neural network model into corresponding graph modules. The first conversion unit 300b-11 is described with reference to FIG. 8.

The compiler 300b-11 according to an example of the present disclosure may receive input of a non-graph-based or graph-based first neural network model. The first neural network model may be a neural network model generated based on a first machine learning framework. The first machine learning framework may be software that supports graph-based and non-graph-based neural network models.

The compiler 300b-10 according to an example of the present disclosure may be software configured to receive a non-graph-based neural network model as input, convert it to a graph-based neural network model, and then perform quantization. For example, the first neural network model may be a neural network model generated based on machine learning framework, such as PyTorch™, TensorFlow™, and the like. However, the present disclosure is not limited to any particular machine learning framework.

According to an example of the present disclosure, the first conversion unit 300b-11 may convert various operation functions in the first neural network model into corresponding graph modules. Accordingly, a compiler 300b-10 can connect the converted graph modules to form a graph-based neural network model. The first conversion unit 300b-11 may convert all function calls of the first neural network model into corresponding graph modules.

Next, the graph generation unit 300b-12 may utilize the graph modules converted by the first conversion unit 300b-11 to analyze the relationships (e.g., connectivity) between the inputs and outputs of the various modules in the first neural network model. Accordingly, the graph modules whose relationships with each other have been analyzed can be connected to each other according to the relationships.

The graph generation unit 300b-12 may generate a graph-based second neural network model based on the converted graph modules and the analyzed relationship. The second neural network model may be generated based on the first neural network model. Specifically, based on the analyzed connective relationship of the converted graph modules in the first conversion unit 300b-11, the graph generation unit 300b-12 may generate a second neural network model based on a graph in which graph modules are connected. More specifically, the graph generation unit 300b-12 may generate a second neural network model including a plurality of modules of connected graphs by mapping at least one input of the plurality of modules to at least one output of the plurality of modules. The graph-based modules already present in the first neural network model can be included in the second neural network model without any conversion. The graph modules may also be referred to hereinafter as "modules." Thus, by constructing the second neural network model, the compiler 300b-10 can analyze a sequence of operations that could not be analyzed in the first neural network model.

The non-graph-based function calls may include, for example, non-graph-based function call instructions such as add function, subtract function, multiply function, divide function, slice function, concatenation function, tensor view function, reshape function, transpose function softmax function, permute function, chunk function, split function, clamp function, flatten function, tensor mean function, sum function, and the like.

The compiler 300b-10 may receive the neural network model generated by the first machine learning framework as input and convert the non-graph-based function calls into corresponding graph modules, and connects the graph modules to each other according to the analyzed relationships of each module. In this way, the second neural network model can be represented as a directed acyclic graph (DAG) with connected graph modules.

Figure 8:
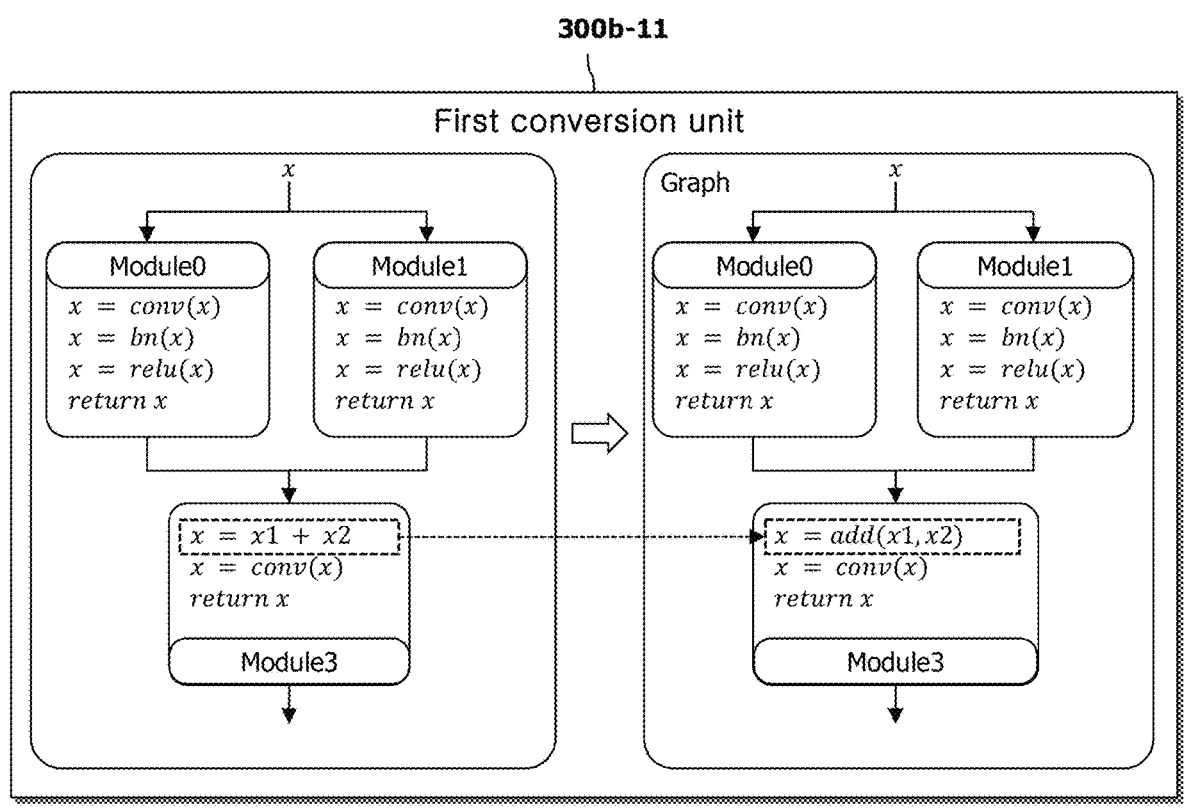
FIG. 8 is an illustrative diagram detailing a first translator of FIG. 7 according to an example of the present disclosure.

FIG. 8 is a block diagram illustrating the first conversion unit 300b-11 shown in FIG. 7. Referring to FIG. 8, the first conversion unit 300b-11 may convert various computational functions in the first neural network model into corresponding graph-based modules (e.g., graph modules). For example, the function call instructions of the first machine learning framework shown on the left side of FIG. 8 can be converted to the graph modules shown on the right side of FIG. 8. Specifically, x=x1+x2 on the left side of FIG. 8 is an undefined function. Since these functions are utilized only when the above functions are called, their inputs and outputs are not traceable outside of the neural network model.

On the other hand, the add (x1,x2) graph module on the right side of FIG. 8 is predefined, so its input and output can be traced. In addition, for the above graph module, a function inheriting from the module class is defined in advance to generate the graph, which can be configured to selectively add markers to the input and output as needed.

Additionally, the first machine learning framework includes basic arithmetic operations and function call instructions, but is accessed on a module-by-module basis rather than on the basis of an operation as a unit. Before the conversion, the inputs and outputs of the smallest unit of operation may not be monitored. However, when converted to a graph-based module, the inputs and outputs of all operations can be monitored, and a graph can be generated. In other words, one of the main differences between function calls and graph-based modules is the ability to monitor and trace values in all associated operations.

Specifically, the graph of the first machine learning framework shown on the left side of FIG. 8 includes the operations conv, bn, relu, and plus (+). In FIG. 8, conv, bn, relu are graph modules, but the plus (+) operation is a function call. Therefore, the plus (+) operation can be converted to an add graph module. conv stands for convolution graph module. bn stands for batch-normalization graph module. relu stands for the ReLU activation function graph module. The plurality of graph modules may be grouped, and the grouped graph modules may be referred to as subgraph modules of the group. That is, the first conversion unit 300b-11 is configured to convert all the function call instructions into corresponding graph modules.

Next, the marker embedding unit 300b-13 may add markers for tracking to each module of the second neural network model. By using the markers added to the second neural network model, calibration data may be collected at the input and output of each graph module. The markers are described below with reference to FIGS. 9A and 9B. As an example, the calibration data may be utilized to reduce inference accuracy degradation when quantizing the parameters of the second neural network model. The marker may also be referred to as tracking module, tracker, observer, and scope.

Figure 9A:
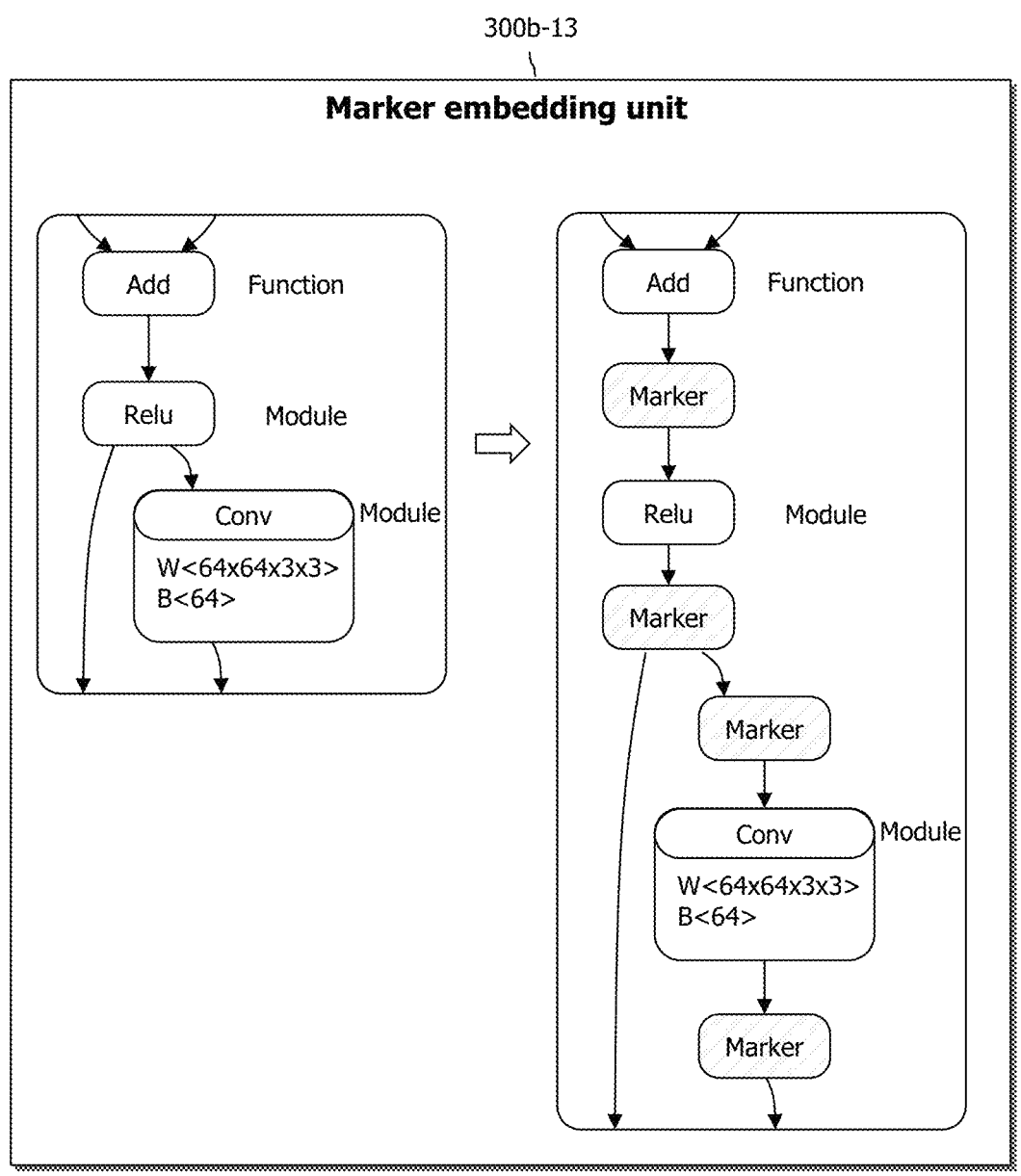
FIG. 9A is a conceptual diagram illustration the operation of a marker adding portion of FIG. 7, according to an example of the present disclosure.

FIG. 9A is a diagram illustrating the marker embedding unit 300b-13 shown in FIG. 7 as an example. The marker embedding unit 300b-13 can add a module for tracking, e.g., a marker, to each module of the second neural network model. As can be seen with reference to FIG. 9A, markers may be added to the input and output ends of the Relu module and the input and output ends of the Conv module, respectively. The markers added to each module can collect input and output values, respectively.

Figure 9B:
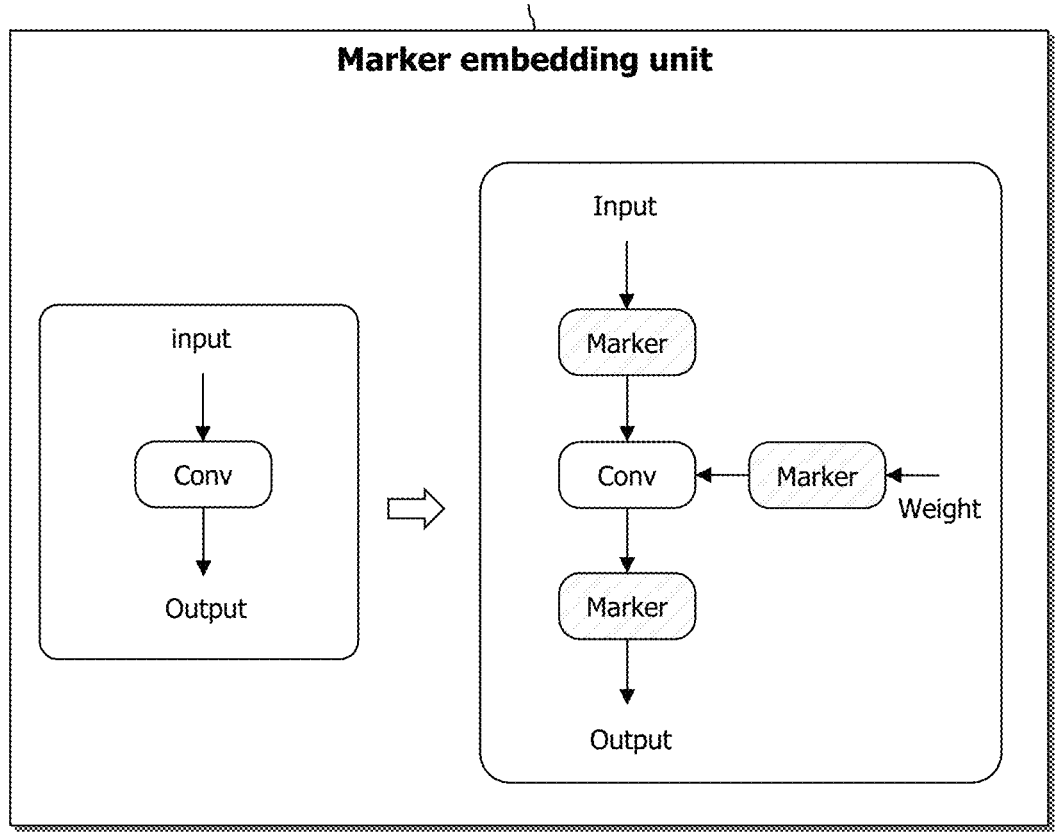
FIG. 9B is a conceptual diagram illustrating the operation of the marker adding portion of FIG. 7, according to an example of the present disclosure.

FIG. 9B is another diagram illustrating the marker embedding unit 300b-13 shown in FIG. 7 as an example. As can be seen with reference to FIG. 9B, markers may be added to the input and the output of the Conv module, respectively. In this case, a marker may also be added to the input where the weight parameters are input to the Conv module.

Next, a module that collects calibration data by adding markers to the second neural network model may be referred to as a calibration unit 300b-14. Markers may be selectively embedded to modules to be collected with calibration data and markers may not necessarily be added to all graph modules. Markers may be added to both the input and output of a single graph module. Thus, calibration data may be obtained from the inputs and outputs of each of the corresponding graph modules. For example, markers may be added to each graph module where quantized parameters are used in the second neural network model.

Referring to FIG. 7, calibration data may be obtained by the calibration unit 300b-14 by inputting a calibration dataset into the second neural network model. The calibration dataset may be, for example, a batch of tens or hundreds of images for an inference test. The more relevant the calibration dataset is to the dataset that trained the second neural network model, the better.

For example, if the second neural network model is a neural network model trained for autonomous driving, it is desirable that the training dataset include datasets related to autonomous driving. If the second neural network model is a neural network model trained for object detection by a camera of a drone, the training dataset preferably include a dataset related to object detection by a camera of a drone. If the second neural network model is a neural network model trained to distinguish the gender of a person, the calibration dataset preferably includes a dataset related to the gender of the person. If the second neural network model is a neural network model trained to detect defects in a particular product, the calibration dataset preferably includes datasets related to the product. If the second neural network model is a neural network model trained to determine the license plate of a vehicle, the training dataset preferably includes datasets related to the license plate of the vehicle. In other words, the calibration dataset can be the dataset that corresponds to the inference purpose of the second neural network model.

When feeding the calibration dataset into the second neural network model, the calibration unit 300b-14 may collect calibration data (e.g., input values and output values of the graph modules to which the markers are embedded) from each of the graph modules to which the markers are added, respectively. In other words, the calibration data may be generated independently for each marker, and the calibration data includes respective calibration data collected by a plurality of markers.

The calibration unit 300b-14 of the compiler 300b-11 may generate the calibration data by feeding the calibration dataset to the second neural network model and collecting the measured values. In one embodiment, the number of calibration data may correspond to the number of markers added to the second neural network model. For example, if a marker is added to each of the input and output of one graph module, the calibration data may be generated to correspond to each of the input and output of the graph module.

The calibration data obtained by inputting the calibration dataset into the second neural network model may be stored in the memory 200b. The calibration dataset may also be stored in the memory 200b. Thus, the respective calibration data collected from the respective graph modules may be stored in the memory 200b. Thus, the generation of the calibration data of the second neural network model in the calibration unit 300b-14 may be completed.

Next, the second conversion unit 300b-15 simulates quantization of the parameters of the second neural network model. In one embodiment, the parameters of the second neural network model are in the floating-point format, but the result of quantization of the parameters can be simulated (e.g., pseudo-quantization). For example, the parameter of the second neural network model input to the second conversion unit 300b-15 may be a 32-bit floating-point. The parameters of the neural network models may include feature maps (i.e., activations or activation parameters), weights, and the like. The feature maps may be referred to as input feature maps, output feature maps, activation maps, and the like. The input feature map may be referred to as the input parameter and the output feature map may be referred to as the output parameter. The input feature map may be referred to as the input activation and the output feature map may be referred to as the output activation. Since the output feature map may be the input feature map for the next layer, the output feature map and the input feature map may in some cases refer to substantially the same parameter. Weights may also be referred to as kernels. If the neural network model is a transformer, the parameters may be referred to as query (Q), key (K), and value (V), and attentions (Q,K,V), and the like.

Accordingly, the second conversion unit 300b-15 may calculate a corresponding quantized parameter based on the calibration data generated by the calibration unit 300b-14 for the parameter in the form of floating-point of the second neural network model. A method of quantization simulation of the parameters of the second neural network model will be described in detail below.

The compiler 300b-10 may calculate a scale value for quantization in the form of floating-point parameter based on the calibration data. The scale value represents the resolution of the quantized parameter. Further, the compiler 300b-10 may calculate a scale value and an offset value for quantization in the form of floating-point parameter based on the calibration data. That is, the offset value can be calculated or omitted. In detail, the scale value and the offset value may be calculated according to Equation 1 below. The scale value and the offset value may be calculated for each calibration data generated at each marker. For example, a first scale value and a first offset value for a particular graph module associated with a first marker can be calculated based on a first maximum value, a first minimum value, and a targeted bitwidth of quantization of the first calibration data measured at the first marker. For example, a second scale value and a second offset value for a particular graph module associated with the second marker can be calculated based on a second maximum value, a second minimum value, and a targeted bitwidth of quantization of the second calibration data measured at the second marker. The first marker may collect input values of the first graph module and the second marker may be configured to collect output values of the first graph module. In other words, in the example described above, a first scale value and a first offset value corresponding to the input values of the first graph module may be calculated, and a second scale value and a second offset value corresponding to the output values of the first graph module may be calculated. Referring to Equation 1 below, the calculation is described in detail.

$$\text{scale} = \frac{\max - \min}{2^{bitwidth} - 1}, \text{offset} = \frac{-\min}{\text{scale}} \quad \text{Equation 1}$$

In Equation 1, max represents the maximum value, min represents the minimum value, and bitwidth represents the target quantization bitwidth among the calibration data collected at a particular marker. This means that a single graph module can have the same or different quantization levels for input and output. Furthermore, the quantization degree of each graph module can be the same or different.

Thus, the max and min values of a particular calibration data corresponding to a particular graph module can be entered into Equation 1. Here, the scale value and the offset value may be utilized to reduce inference accuracy degradation due to quantization errors when quantizing the parameters of the second neural network model (e.g., feature maps and weights). Furthermore, if the quantization is performed using a scale value and an offset value that reflect data distribution characteristics of a particular graph module, the deterioration of inference accuracy due to quantization errors may be reduced. Furthermore, if quantization is performed by utilizing scale values and offset values reflecting data distribution characteristics of a plurality of graph modules included in the second neural network model, the deterioration of inference accuracy due to quantization of the second neural network model can be further reduced. Further, the collected calibration data may include at least one of a distribution histogram, a minimum value, a maximum value, and a mean value of the data. The scale value can be pre-calculated for each graph module or calculated dynamically during inference operations on a neural processing unit by obtaining the maximum and minimum values of the parameters input to each graph module. The offset value can be omitted by setting the value to zero.

The scale value corresponding to the feature map may be referred to as $s_f$. A scale value corresponding to a weight may be referred to as $s_w$. The offset value corresponding to the feature map may be referred to as of. The offset value corresponding to the weight may be referred to as $o_w$.

This is followed by Equation 2, which quantizes the feature map parameter $\text{feature}_{fp}$ into $\text{feature}_{int}$ reflecting the calibration data.

$$\text{feature}_{int} = \left\lfloor \frac{\text{feature}_{fp} - o_f}{s_f} \right\rfloor = \text{clip}\left\{\text{round}\left(\frac{\text{feature}_{fp} - o_f}{s_f}\right), Q_{min}, Q_{max}\right\} \quad \text{Equation 2}$$

where $\text{feature}_{int}$ represents the quantized feature map, $\text{feature}_{fp}$ represents the feature map in the form of floating-point to be quantized, of represents the offset value of Equation 1 for the feature map in the form of floating-point to be quantized, $s_f$ represents the scale value of Equation 1 for the feature map in the form of floating-point to be quantized, and $\lfloor \ \rfloor$ represents the round and clip operations, where $Q_{min}$ represents $-2n-1$, $Q_{max}$ represents $2n-1-1$, where n is the bitwidth.

Therefore, the feature map in the form of floating-point reflecting the calibration data can be quantized using Equation 2. However, the $\text{feature}_{int}$ is a value that simulates the quantization, and in practice, it may be stored in the memory 200b in the form of floating-point. In addition, the value calculated by Equation 2 may have a quantized integer value, but may be processed by the compiler 300b-10 substantially as a floating-point value. That is, in the second conversion unit 300b-15, the $\text{feature}_{int}$ may be a pseudo-integer and the $\text{feature}_{int}$ may represent a substantially quantized value, but may be stored in the memory 200b as a floating-point value.

The feature map may further include outliers based on the input data. These outliers may cause quantization errors to be amplified during quantization. Therefore, it is desirable that the outliers are appropriately compensated. For example, outliers may be compensated for by applying a moving average algorithm to the calibration data. By applying the moving average algorithm to the respective calibration data, minimum and maximum values can be obtained from which outliers are mitigated. However, the examples of the present disclosure are not limited to this and can be configured to compensate for outliers in the feature map through various compensation algorithms. That is, it is possible to reduce the impact of outliers in the feature map by truncating the outliers in the calibration data during quantization. According to one example of the present disclosure, a step 300b-16 may be added to update the parameters (e.g., input parameters, weight parameters) by mitigating outliers. Accordingly, in an example of the present disclosure, each of the calibration data corresponding to a feature map utilizing Equation 1 and Equation 2 may include max and min values for which outliers are compensated. Accordingly, the feature map may be the input value (e.g., input feature map) or the output value (e.g., output feature map) of a corresponding graph module.

The quantized feature map may be stored in memory 200b.

Next, Equation 3 is described, which may quantize a weight parameter $\text{weight}_{fp}$ into $\text{weight}_{int}$ reflecting calibration data.

$$\text{weight}_{int} = \left\lfloor \frac{\text{weight}_{fp}}{s_w} \right\rfloor = \text{clip}\left\{\text{round}\left(\frac{\text{weight}_{fp}}{s_w}\right), Q_{min}, Q_{max}\right\} \quad \text{Equation 3}$$

where $\text{weight}_{int}$ represents the quantized weight, $\text{weight}_{fp}$ represents the weight in the form of floating-point to be quantized, $s_w$ represents the scale value in Equation 1 for the weight in the form of floating-point to be quantized, and $\lfloor \ \rfloor$ represents the round and clip operations, where $Q_{min}$ means $-2n-1$, $Q_{max}$ means $2n-1-1$, where n is the bitwidth.

Therefore, the weight parameters reflecting the calibration data can be quantized via Equation 3. However, $\text{weight}_{int}$ may be a value that simulates quantization and may be stored in the memory 200b in a data format that is actually a floating-point. That is, the value calculated using Equation 3 has a quantized integer value, but may be processed by the compiler 300b-10 in a substantially floating-point form. That is, in the second conversion unit 300b-15, $\text{weight}_{int}$ may be a pseudo-integer, i.e., weight$_{int}$ may represent a substantially quantized value, but the stored data in memory 200b may be in the form of floating-point.

The quantized weights may be stored in memory 200b.

Additionally, the second neural network model may include a plurality of layers, each layer including at least one graph module. When the plurality of graph modules are interconnected, the quantization error may accumulate each time a graph module is traversed. Therefore, as the structure of the second neural network model becomes more complex and the number of layers increases, the quantization according to Equation 1 to Equation 3 may reduce the accumulation of the deterioration of the inference accuracy due to the quantization error of the second neural network model. In other words, if a floating-point parameter is quantized to an integer parameter by analyzing the data distribution, the deterioration of the inference accuracy of the second neural network model due to quantization may be reduced.

According to an example of the present disclosure, quantization using calibration data generated by analyzing the data distribution may be referred to as clipping quantization. Clipping quantization utilizing Equation 1 to Equation 3 may utilize the maximum and minimum values of the calibration data to quantize within a valid data distribution. Clipping quantization can be particularly useful when there are outliers that can affect the accuracy of the quantization. Compiler 300b-10 may optionally be performed to handle outliers in the feature map.

Figure 10:
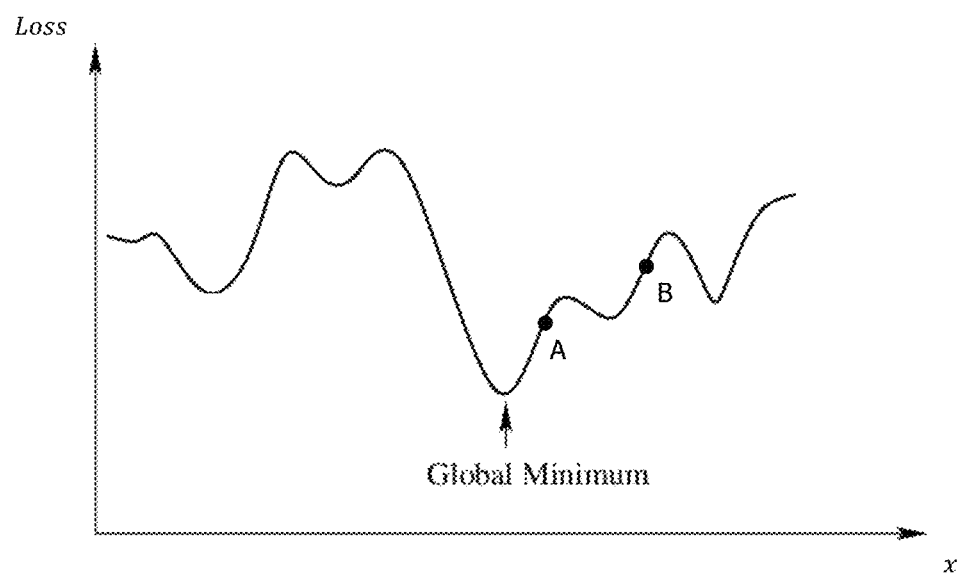
FIG. 10 is a graph illustrating the importance of choosing appropriate scale and offset values, according to an example of the present disclosure.

Referring to FIG. 10, the X-axis indicates the degree of outliers. The point with zero outlier indicates a global minimum of the loss value. The further away the outlier is from the global minimum, the higher the loss of the quantized neural network model. Using Equation 1 or Equation 3, the floating-point parameter of the second neural network model quantized to a certain bitwidth (point A in FIG. 10) can increase the probability that the value is relatively close to the global minimum of the quantization error. If quantization is performed without utilizing Equation 1 or Equation 3, the quantized value may be a value (point B in FIG. 10) that is further away from the global minimum than the value (point A in FIG. 10) that is relatively close to the global minimum.

When the quantization calculation of the parameters of the second neural network model is completed, the second conversion unit 300b-15 may remove the markers added for tracking in the second neural network model. That is, the markers added to the second neural network model may be deleted in the second conversion unit 300b-15 after obtaining the calibration data through the calibration unit 300b-14. That is, when the quantized parameters are obtained based on the calibration data, the markers may be unnecessary in the second neural network model. However, the examples of the present disclosure are not limited thereto.

Referring to FIG. 7, the optimization unit 300b-16 may improves on the quantization parameters calculated by the second conversion unit 300b-15. When the optimization unit 300b-16 improves the quantization parameters (e.g., the scale value and/or the offset value), the second conversion unit 300b-15 may generate a third neural network model comprising quantized weight parameters in integer format based on the second neural network model, based on the improved scale value and the improved offset value.

Figure 11:
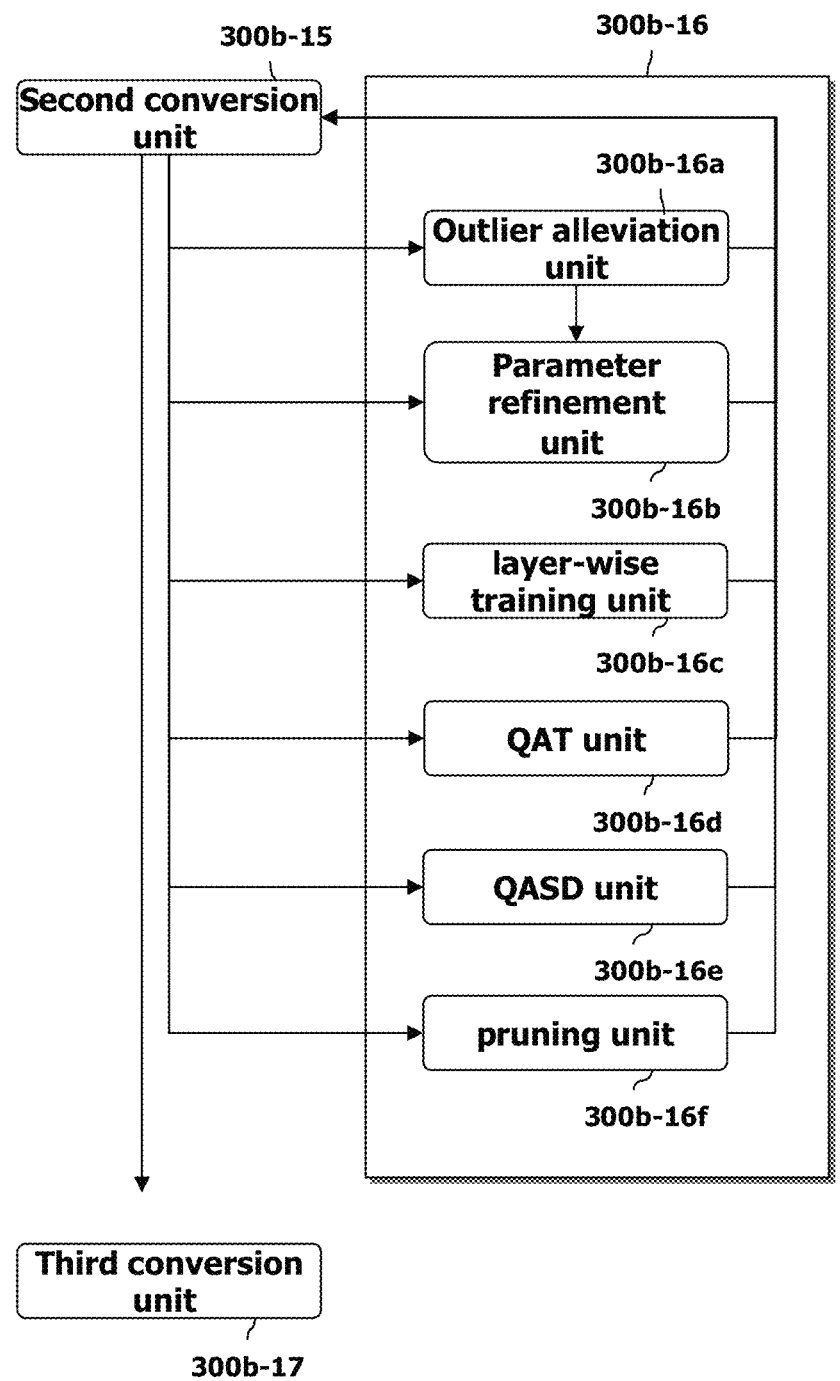
FIG. 11 is a conceptual diagram illustrating the optimization unit 300b-16 shown in FIG. 7, according to an example of the present disclosure.

FIG. 11 is an example diagram illustrating the optimization unit 300b-16 shown in FIG. 7.

The compiler 300b-10, according to one example of the present disclosure, may optionally improve parameters of the neural network model in the optimization unit 300b-16 according to compilation options. In one example, the optimization unit 300b-16 may improve one or more parameters included in the second neural network model to maintain or improve inference accuracy according to a quantization simulation for the graph-based second neural network model.

The second conversion unit 300b-15 may calculate the corresponding quantization parameters of the floating-point of the second neural network model based on the calibration data generated by the calibration unit 300b-14. The compiler 300b-10 may optionally improve the input parameters, the weight parameters, the scales and offsets of the input parameters, the scales of the weight parameters, and the like for improved quantization in the optimization unit 300b-16 according to the compilation options.

The optimization unit 300b-16 may include at least one of an outlier alleviation unit 300b-16a, a parameter refinement unit 300b-16b, a layer-wise training unit 300b-16c, a quantization-aware retraining (QAT) unit 300b-16d, a quantization aware self-distillation unit (QASD) 300b-16e, and a pruning unit 300b-16f. Each element of the optimization unit 300b-16 may be performed independently, and the results of the performance of each element may not affect the other elements. In various examples, the order of performance of the elements of the optimization unit 300b-16 may be adaptively determined, for example, to perform parameter refinement after performing outlier alleviation.

The optimization unit 300b-16 may improve the parameters of the second neural network model using at least one of an outlier alleviation unit 300b-16a, a parameter refinement unit 300b-16b, a layer-wise training unit 300b-16c, a quantization-aware retraining (QAT) unit 300b-16d, a quantization aware self-distillation unit (QASD) 300b-16e, and a pruning unit 300b-16f according to the compilation option. The compilation option may be selected based on hardware information of the neural processing unit 100a of the edge device 1000. Further, the compilation option may be selected in response to a parameter characteristic of the second neural network model (e.g., a size of the weight parameter, a size of the feature map, and the like) and an inference accuracy degradation characteristic.

In the following, the operation of the outlier alleviation unit 300b-16a according to one example of the present disclosure will be described in detail.

With respect to the graph module including a multiply and accumulate (MAC) operation (e.g., a convolution or matrix product operation), the outlier alleviation unit 300b-16a may alleviate outliers included in the input parameters while adjusting the weight parameters by the amount by which the outliers are alleviated. For example, the outlier alleviation unit 300b-16a may burden some of the outliers included in the input values with the weight values of the first graph module of the second neural network model by calculating a constant for adjusting the outliers with respect to the input values of the first graph module and the weight values of the first graph module, multiplying the input values of the first graph module by the reciprocal of the constant, and multiplying the weight values of the first graph module by the constant. The outlier alleviation unit 300b-16a do not remove the outliers, but rather share the burden of the outliers among the parameters of the MAC operation, and as a result, the result of the MAC operation may be regarded as including outliers even though quantization of the parameters is performed.

Figure 12A:
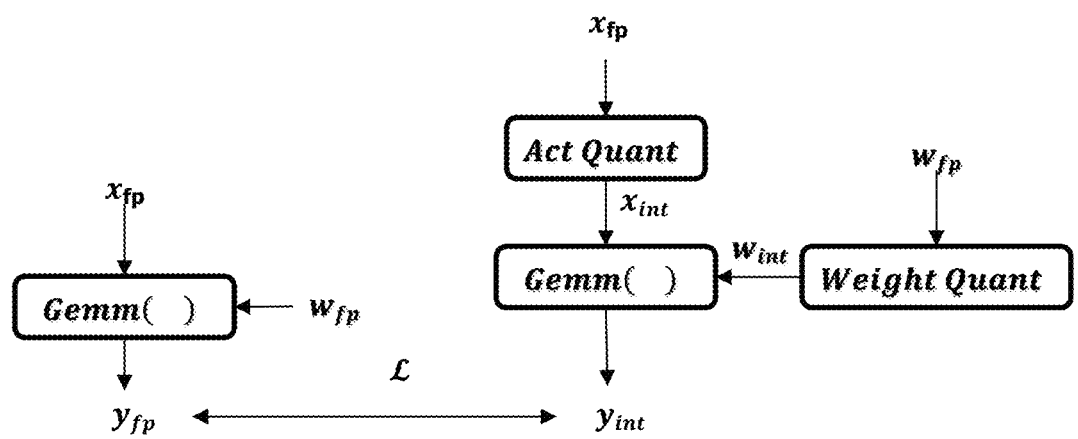
FIG. 12A a conceptual diagram illustrating the operation of the layer-wise training unit according to an example of the present disclosure.
Figure 12B:
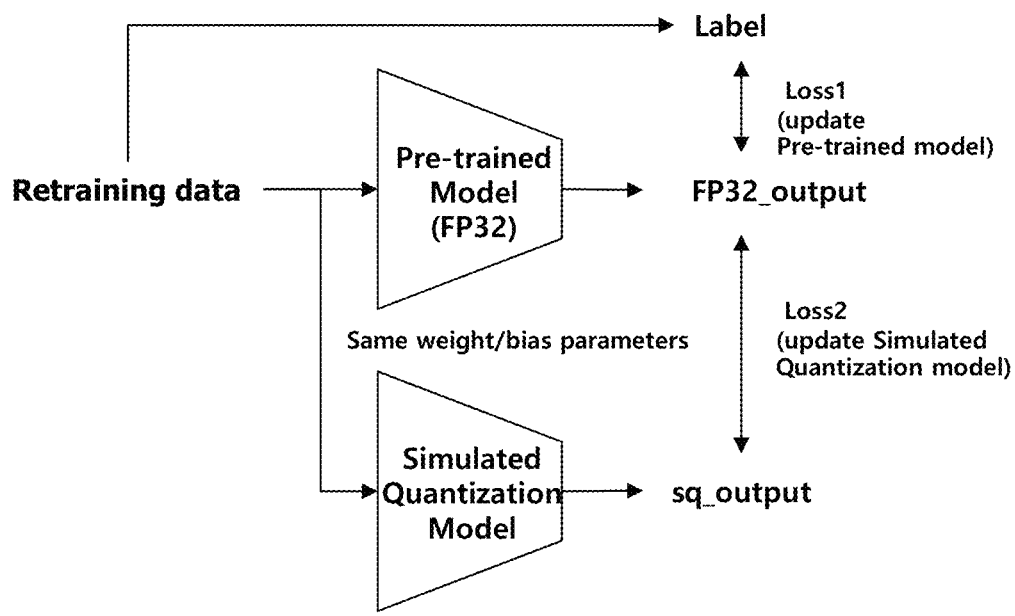
FIG. 12B is a conceptual diagram illustrating the operation of the QASD according to an example of the present disclosure.
Figure 12C:
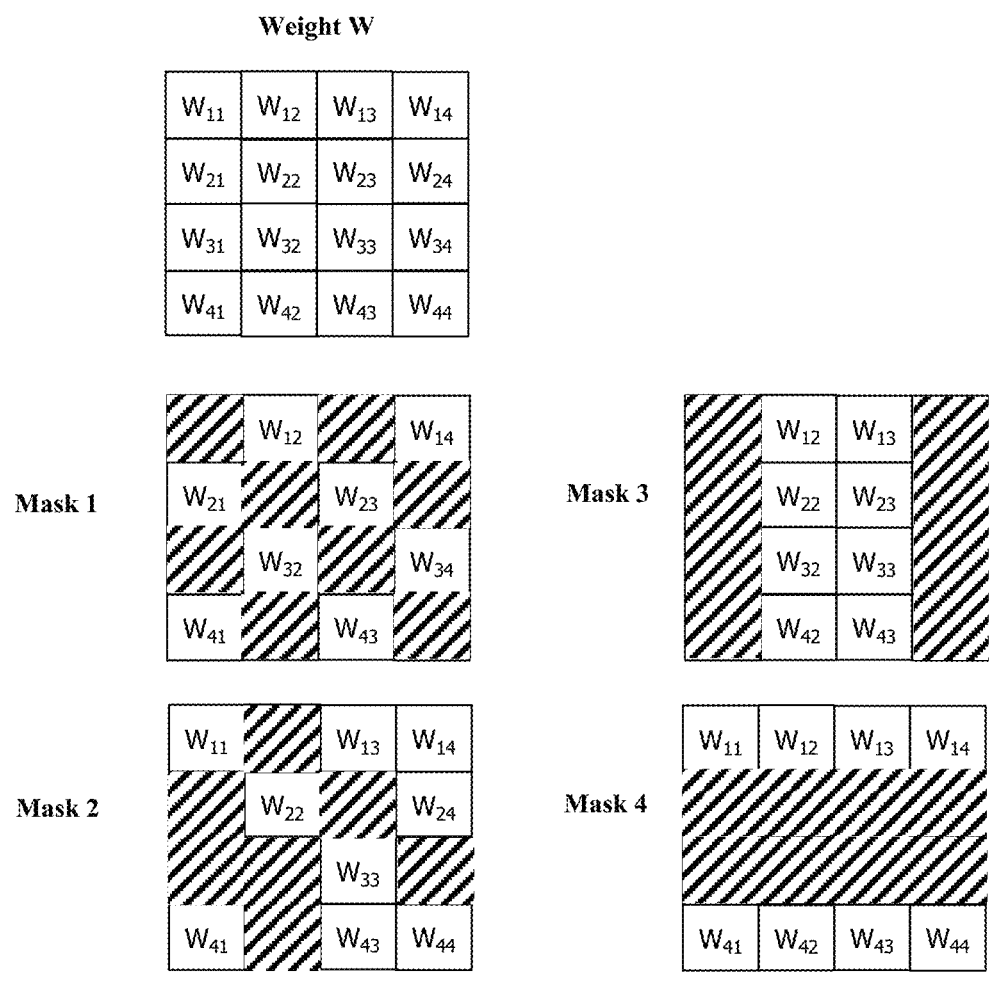
Figure 12D:
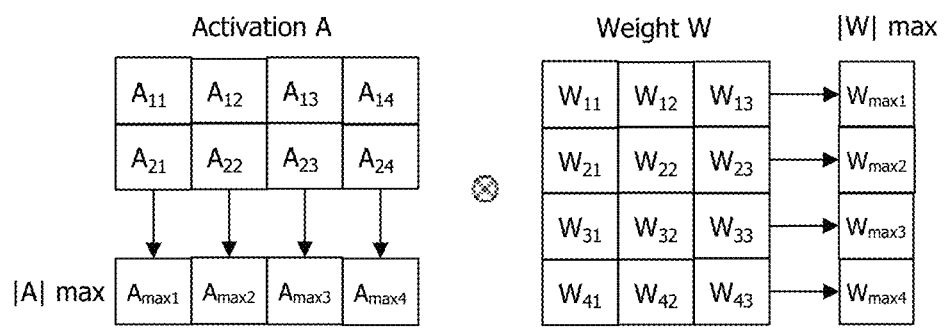
FIGS. 12D, 12E, and 12F are conceptual diagrams illustration each step of the operation performed by the outlier alleviation unit, according to an example of the present disclosure.
Figure 12E:
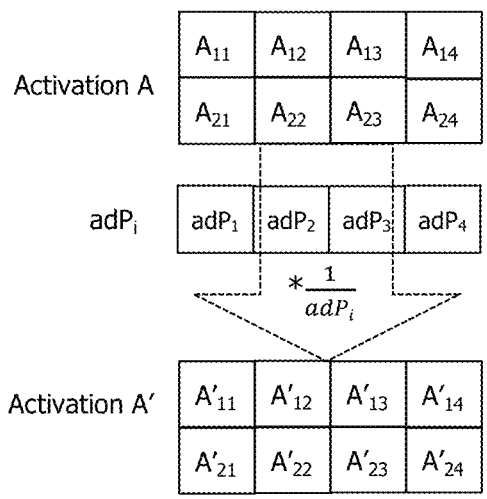
Figure 12F:
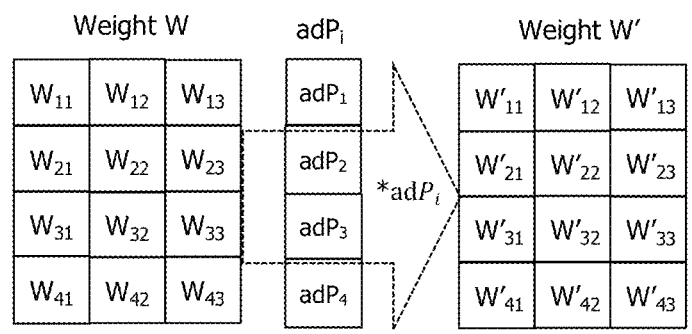

FIGS. 12D, 12E, and 12F are examples to illustrate each step of operation of the outlier alleviation unit 300b-16a according to one example of the present disclosure.

The outlier alleviation unit 300b-16a may alleviate outliers included in the operands of the MAC operation by transferring some of the outliers among the operands, such that the outliers in each operand are alleviated while the result of the MAC operation remains the same. In one example, this is the same as converting an A⊗W operation to (A*adP$^{-1}$)⊗(W*adP) where adP represents the outlier adjustment value.

The outlier alleviation unit 300b-16a may calculate an adjustment value based on the first calibration data that collects input parameters and weight parameters using markers added to each graph module. In one example, the outlier alleviation unit 300b-16a may perform 50 calibrations to collect the first calibration data using the markers added to each graph module. In one example, the outlier alleviation unit 300b-16a may obtain an adjustment value using the maximum value of the input parameters and the maximum value of the weight parameters. The adjustment value may be for adjusting the data range, and the outlier alleviation unit 300b-16a may obtain a maximum value of the absolute value of the input parameter and a maximum value of the absolute value of the weight parameters to obtain a positive maximum value.

The format of the adjustment value may be determined according to the format of the operands. For example, if the operands are matrices, the adjustment value may also be a matrix. If the first operand is an M*I matrix and the second operand is an I*N matrix, an adjustment value matrix **1*I** can be generated for channel I.

Referring to FIG. 12D, For example, suppose activation A is a 2*4 matrix and weight W is a 4*3 matrix, the operation contained in a graph module is a convolution operation, and A and W correspond to the operands of the convolution operation.

The outlier alleviation unit 300b-16a may obtain the maximum of the channel-specific absolute values for each of the first operand and second operand of the MAC operation. For example, the set of channel-wise maximum values for the A matrix may be $\{A_{max1}, A_{max2}, A_{max3}, A_{max4}\}$. For example, the set of channel-wise maximum values for the W matrix may be $\{W_{max1}, W_{max2}, W_{max3}, W_{max4}\}$.

In one example of the present disclosure, the adjustment value may be obtained by equation $$adPi = \sqrt{\frac{|A\max_i|}{|W\max_i|}}$$

where $adP_i$ is the adjustment value for channel i, $A_{maxi}$ represents the maximum value among the absolute values of all elements of channel i of the above input parameters, and $W_{maxi}$ represents the maximum value among the absolute values of all elements of channel i of the above weight parameters. However, the examples of the present disclosure are not limited to the above equations, and the adjustment value may be determined utilizing various formulas. However, the examples of the present disclosure are not limited to the above equations, and the adjustment value may be determined utilizing various formulas.

In order to update the input parameters and weight parameters to reduce the quantization error based on the adjustment value for adjusting outliers for each graph module of the second neural network model, the outlier alleviation unit 300b-16a may multiply the input parameters of the first graph module including the MAC operation by the reciprocal of the adjustment value (e.g., the first adjustment value) and the weight parameters of the first graph module by the adjustment value (e.g., the second adjustment value).

In one example, the outlier alleviation unit 300b-16a may update the input parameters and the weight parameters of the first graph module before performing the operation of the first graph module. The outlier alleviation unit 300b-16a may allow the parameter update operation to be performed in conjunction with existing operations by incorporating the adjustments into the multiplication operation performed before the first graph module, rather than adding a separate operation.

In one example, the step prior to the first graph module may further include a layer-normalization graph module. The layer-normalization step may include a multiplication operation, and may utilize the multiplication operation included in the layer-normalization to reflect the adjustment without adding a separate multiplication operation. Accordingly, the layer-normalization graph module may perform an operation to multiply the input parameters by the first adjustment value. The first graph module may then perform an operation to multiply an input parameter by a weight parameter reflecting the second adjustment value. For example, if the graph included in the layer-normalization that precedes the MAC operation contains the function $$y = \frac{x - E[x]}{\sqrt{\text{Var}[x] + \epsilon}} * \gamma + \beta,$$

the γ and β variables in the multiplication operation can be multiplied by the first adjustment value $$\frac{1}{adP_i},$$

modifying the functions to $$\gamma = \gamma * \frac{1}{adp_i} \text{ and } \beta = \beta * \frac{1}{adp_i},$$

respectively. Since γ and β variables are constants, they may be calculated in the optimization unit 300b-16 and stored as constant parameters. This can reduce the resource overhead of performing multiplication operations for parameter update (e.g., multiplying the input parameter by the first adjustment value) separately. Also, the multiplication operation of the second adjustment value and the weight parameter can be calculated and stored as a constant parameter. This may reduce the resource that would have been consumed by performing the multiplication operation for parameter update separately.

In various examples, the outlier alleviation unit 300b-16a may apply the parameter update operation to a multiplication operation scheduled prior to the operation in the graph module. In another example, if the graph module does not include a MAC operation (e.g., a matmul operation), or if the immediately preceding step of the graph module does not include a multiplication operation, the parameter update may not be performed due to the cost associated with performing the multiplication operation for parameter update separately.

By applying the adjustment values, the input parameters and weight parameters may be updated to reduce quantization error of outliers. Each of the adjustment values (e.g., the first adjustment value and the second adjustment value) may be calculated in the compilation step of the neural network model and stored as a constant parameter. In particular, adjustment values may be preferably calculated and stored as constant parameters in advance to reduce the power consumption of the inference operation of the neural processing unit and to improve the inference speed.

Referring to FIG. 12E, the outlier alleviation unit 300b-16a may update the input parameter values by multiplying each element of the input parameter by the reciprocal of the adjustment value. For example, $A_{11}*(adP_1)^{-1}=A'_{11}$, $A_{21}*(adP_1)^{-1}=A'_{21}$, $A_{12}*(adP_2)^{-1}=A'_{12}$, and the like may be calculated. The above calculations may be performed in the layer-normalization step, which is performed immediately before the operation of the graph module. The outlier alleviation unit 300b-16a may incorporate the parameter update operation into the multiplication operation included in the layer-normalization step immediately before the operation of each graph module. Since the parameter update is included in the existing multiplication operation, no additional computational cost is incurred. In other words, the outlier adjustment of the input parameters can be provided to the third neural network model without increasing additional inference resources by pre-adjusting γ variable in the case of layer regularization before the MAC operation. Thus, the third neural network model generated by the third conversion unit 300b-17 applied with the outlier alleviation value may involve substantially no increase in computation resources for outlier alleviation.

Referring to FIG. 12F, the outlier alleviation units 300b-16a may update the weight parameter values by multiplying each weight parameter by an adjustment value. For example, $W_{11}*adP_1=W'_{11}$, $W_{12}*adP_1=W'_{12}$, $W_{21}*adP_2=W'_{21}$, and so on.

In one example of the present disclosure, the input parameters and weight parameters applied with outlier mitigation may be applied both in the quantization step and in subsequent steps. For example, if the outlier alleviation unit 300b-16a has performed outlier mitigation on the second neural network model by the optimization unit 300b-16, the input value feature_in$_{int}$ of the third neural network model may indicate that outlier alleviation has been applied.

In one example of the present disclosure, the outlier alleviation unit 300b-16a may further include a component separate from the calibration unit 300b-14 to acquire calibration data for outlier alleviation. The calibration data can be obtained as input values and weight values collected from markers included in each graph module using any of the calibration datasets. The calibration data generated by the calibration unit 300b-14 may be utilized by the second conversion unit 300b-15 to calculate a scale value and an offset value for each parameter. The outlier alleviation unit 300b-16a may alleviate outliers for the input parameters and the weight parameters independently of the operation of the second conversion unit 300b-15. The optimization unit 300b-16 may perform parameter refinement after performing the outlier alleviation, and the quantization simulation for the second neural network model may reflect both the outlier alleviation and the parameter refinement. When outlier alleviation is performed, the quantization simulation process of the second neural network model and the process may reflect the input parameters with the outlier alleviated, that is, the third conversion unit may generate the third neural network model based on the quantization simulation of the second neural network model with the input parameters and weight parameters reflecting the adjustment value that alleviates the outlier. Once the outlier alleviation values are determined, the third conversion unit may reflect the respective adjustment values in the input parameters and weight parameters of the corresponding neural network model.

In the following, the operation of the parameter refinement unit 300b-16b according to one example of the present disclosure will be described in detail.

The parameter refinement unit 300b-16b may perform calculated updated parameters for the quantization process in order to reduce errors that may occur due to quantization, and to increase computational performance due to quantization while maintaining accuracy of the neural network model. The parameter refinement unit 300b-16b may calculate the updated values for each of the scale value and offset value for quantization of the floating-point parameters of the neural network model.

The parameter refinement unit 300b-16b may calculate updated values for each of the scale value and the offset value for quantization of the floating-point parameter calculated by the second conversion unit 300b-15. For convenience of the following description, the scale value calculated by the second conversion unit 300b-15 may be referred to as $Scale_{default}$, and the offset value calculated by the second conversion unit 300b-15 is referred to as $Offset_{default}$.

Cosine similarity is a measure of the similarity between two vectors in an inner space. Cosine similarity can be measured by the cosine value of the angle between two vectors, and determines whether they are pointing in approximately the same direction. The parameter refinement unit 300b-16b may determine that the higher the cosine similarity between the output values without quantization and with quantization, the smaller the quantization error, and consequently the inference accuracy of the neural network model can be maintained. In other words, the parameter refinement unit 300b-16b may perform updating of the scale value and the offset value for performing the quantization, based on the cosine similarity of the output values with or without performing the quantization. The parameter refinement unit 300b-16b may obtain an improved value for each of the scale value $Scale_{default}$ calculated by the second conversion unit 300b-15, and the offset value $Offset_{default}$ calculated by the second conversion unit 300b-15. In one example, the parameter refinement unit 300b-16b may select an improved value from neighboring values of $Scale_{default}$, which is a scale value calculated by the second conversion unit 300b-15. Further, the parameter refinement unit 300b-16b may select an updated value from neighboring values of $Offset_{default}$, which is an offset value calculated by the second conversion unit 300b-15.

The second neural network model may include a plurality of layers where each layer includes at least one graph module. The compiler 300b-10 may calculate a scale value and an offset value for a particular graph module associated with a marker based on calibration data measured at the marker added to each graph module. Referring to FIG. 9B, markers have been added to each of an input, an output and a weight input for the weight parameters of the Conv module, and scale values and offset values may be calculated based on calibration data measured at each marker, respectively.

A first scale value and a first offset value for the input parameters of the Conv module can be calculated using Equation 1 based on the first maximum, first minimum, and target quantization bitwidth of the first calibration data measured at the first marker added to the input of the Conv module in FIG. 9B.

A second scale value and a second offset value for the weight parameters of the Conv module can be calculated using Equation 1 based on the second maximum, second minimum, and target quantization bitwidth of the second calibration data measured at the second marker added to the weight input of the Conv module in FIG. 9B.

The output parameters of the Conv module in FIG. 9B can be calculated from the first scale value and the first offset value for the input parameters and the second scale value for the weight parameter of the Conv module. The output of the Conv module is an integer, which can be dequantized using the scale and/or offset values as the first and second scale/offset. After dequantizing, the output of the Conv module corresponds to the first scale value of the following module since it is the input to the following graph module.

The parameter refinement unit 300b-16b may improve the first scale value and the first offset value for the input parameters of the Conv module, and the second scale value for the weight parameters of the Conv module, respectively. The output parameters of the Conv module may correspond to the input parameters of the next graph module connected to the Conv module, and the improvement may be performed in the next graph module.

The optimization unit 300b-16 may optionally perform outlier alleviation and parameter refinement depending on compilation options. When only outlier alleviation is performed, the outlier alleviation unit 300b-16a may perform outlier alleviation for the quantized parameter based on the calibration data before the parameter is quantized by the second conversion unit 300b-15. When only parameter refinement is performed, the parameter refinement unit 300b-16b may perform iteratively update the quantization parameter after quantizing the parameter by the second conversion unit 300b-15. However, when outliers exist in the parameters, it may cause severe quantization error due to the outliers when calculating the scale value and the offset value according to Equation 1 using the maximum and minimum values of the calibration data. When the optimization unit 300b-16 performs both outlier alleviation and parameter refinement, the outlier alleviation may be performed first, and the parameter refinement may be performed subsequently.

In one example, the optimization unit 300b-16 may iteratively update the parameters in the order of: 1) alleviating the outliers contained in the input parameters by the outlier alleviation unit 300b-16a, while adjusting the weight parameters by the amount by which the outliers are alleviated, 2) calculating quantization parameters (scale values and offset values) based on the calibration data using Equation 1 by the second conversion unit 300b-15, and 3) improve the calculated parameters (e.g., a scale value for an input parameter, an offset value for an input parameter, and/or a scale value for a weight parameter) by the parameter refinement unit 300b-16b.

The parameter refinement unit 300b-16b may improve corresponding scale values or offset values for quantization parameters for each graph module of the second neural network model. The parameter refinement unit 300b-16b may determine preferred values for the scale values or offset values in the order of the first graph module to the last graph module, based on connective relationships between each graph module included in the second neural network model. For example, the parameter refinement unit 300b-16b may improve offset values for a plurality of graph modules included in the second neural network model, in the order of the first graph module to the last graph module based on the connective relationships between the graph modules. The order of improving for the graph modules may be one of forward, backward, or a particular order. After improving the offset values, the parameter refinement unit 300b-16b may improve the scale values in order from the first layer to the last layer. The improving order may be one of forward, reverse, or a specific order.

In one example, the parameter refinement unit 300b-16b may selectively operate on some of the connected graph modules to iteratively improve their associated parameters. For example, the parameter refinement unit 300b-16b may perform operations on a first graph module, not perform operations on second graph module, and perform operations a third graph module out of the entire set of connected graph modules. The parameter refinement unit 300b-16b may proceed with parameter refinement for the entire graph module in this manner.

The parameter refinement unit 300b-16b may select the order of performing operations on the graph modules in an experimental manner. In one example, the parameter refinement unit 300b-16b may determine the order of improving a plurality of quantization parameters. The parameter refinement unit 300b-16b may first improve the offset values of the parameters, and then improve the scale values of the parameters. The parameter refinement unit 300b-16b may first improve the input parameters, and then improve the weight parameters. For example, the parameter refinement unit 300b-16b may, for a layer comprising an input activation map, a weight, 1) first improve an offset value of the activation map, 2) next improve a scale value of the activation map, and 3) finally improve a scale value of the weights. The parameter refinement unit 300b-16b may first determine improved values for the offset values for the plurality of layers included in the second neural network model, and then determine improved values for the scale values for the second neural network model reflecting the improved offset value for each of the plurality of layers.

The parameter refinement unit 300b-16b may generate improved value candidates by selecting neighboring values for the scale value or offset value to be improved. The parameter refinement unit 300b-16b may determine one of the improvement candidates as the preferred value by comparing the result value of performing the quantization simulation using the improvement candidates with the result value of not performing the quantization. That is, the parameter refinement unit 300b-16b calculate the cosine similarity of the calculation result values for each graph module of the second neural network model and the calculation result values of the quantization simulation performed for each graph module of the second neural network model using each candidate included in the improvement candidate group. Thus, the candidate with the highest cosine similarity value among the candidates in the improvement candidates can be selected as the value to be used.

The parameter refinement unit 300b-16b may determine the candidates for the scale value or offset value to be improved by experimental measurements. The parameter refinement unit 300b-16b may select a predetermined number of candidates for the scale value to be improved within a predetermined range, that is, a neighboring range that including the scale value calculated using Equation 1. Further, the parameter refinement unit 300b-16b may select a predetermined number of candidates for the offset value to be improved, within a certain range, such as a periphery that including the offset value calculated using Equation 1.

In one example, referring to FIG. 11, the parameter refinement unit 300b-16b may brute force select candidates according to the search space within an under bound factor α and an upper bound factor β. The parameter refinement unit 300b-16b may select as many candidates as the number of search spaces within a range from $Scale_{default}*\alpha$ to $Scale_{default}*\beta$. The parameter refinement unit 300b-16b may select as many candidates as the number of search spaces evenly within the range from $Scale_{default}*\alpha$ to $Scale_{default}*\beta$. For example, for a scale value S of 3, α of 0.5, β of 2, and a search space of 10, the candidates may be {1.5, 2, 2.5, 3, 3.5, 4, 4.5, 5, 5.5, 6}. In the example above, a scale value S may be included in the candidates, but in some cases, scale value S are not included in the candidates, in which case scale value S can be included in the candidates. For example, if the scale value S is 3, α is 0.5, β is 3, and the search space is 10, the candidates can be {1.5, 2.33, 3, 3.16, 3.99, 4.82, 5.65, 5.65, 6.48, 6.48, 7.31, 7.31, 8.14, 9}. The parameter refinement unit 300b-16b may utilize array generation functions. For example, the parameter refinement unit 300b-16b may generate the candidates using the function np.linspace (scale*α, scale*β, search_space). In another example, the parameter refinement unit 300b-16b may determine the candidates unequally among neighboring values based on the scale value or offset value calculated by the second conversion unit 300b-15.

The parameter refinement unit 300b-16b describes a specific method for improving a scale value for the current graph module. An example for illustrative purposes is as follows: assuming that the parameter to be improved has a scale value $Scale_{default}$ calculated by the second conversion unit 300b-15 is 3, α is 0.5, β is 2, and the search space 10, the updated candidates of the scale value are {1.5, 2, 2.5, 3, 3.5, 4, 4.5, 5, 5.5, 6}. The current scale value $S_1$ may be set to 0. The parameter refinement unit 300b-16b may use some of the calibration datasets as input data for the improvement process. For example, if the calibration dataset includes 50 samples of data, the parameter refinement unit 300b-16b may use two randomly selected samples of data of the calibration dataset as input data for the improvement process. The parameter refinement unit 300b-16b may experimentally determine the type and number of input data.

The parameter refinement unit 300b-16b may calculate a value $O_1$ as a result of an operation by the original module that does not perform quantization on the first input value of the input data.

The parameter refinement unit 300b-16b may calculate a value $\hat{O}_1$ as a result of an operation by a module performing a quantization simulation using each candidate included in the candidate group for the first input value. The Q-module performing the quantization simulation may be the second conversion unit 300b-15. Referring to FIG. 11, the parameter refinement unit 300b-16b may calculate $\hat{O}_{1^i}$ as a result of performing the quantization simulation using the first candidate $s_1^i$. In this case, $\hat{O}_{1^i}$ is an integer value, and cosine similarity can be calculated after performing dequantization in the form of a floating-point number. The specific method of performing the dequantization of the quantization simulation operation result is described later in the detailed description of Equations 15 to 16 and FIG. 11.

The parameter refinement unit 300b-16b may calculate a cosine similarity for the calculation result $O_1$ in the case of not performing quantization and the calculation result $\hat{O}_{1^i}$ in the case of performing quantization simulation using the update candidate $s_1^i$, and compare it with the current scale value $S_1$, which is a reference value, and the cosine similarity value MAX in the case of not performing quantization. The parameter refinement unit 300b-16b may update the current scale value $S_1$ to the update candidate $s_1^i$ if the cosine similarity of the calculation result $\hat{O}_{1^i}$ according to the update candidate $s_1^i$ and the calculation result $O_1$ in the case of not performing quantization is greater than a reference value. The parameter refinement unit 300b-16b may repeat the above process for the next update candidate $s_1^{i+1}$. The parameter refinement unit 300b-16b may repeat the above process for all the candidates included in the update candidate group, and may calculate an update value for the scale value $Scale_{default}$ calculated by the second conversion unit 300b-15.

The module (i.e., Q-module) performing the quantization simulation may be a separate module from the second conversion unit 300b-15. In this case, the separate module may include the steps of quantizing each input value of each graph module using the scale and offset values, performing the operation of each graph module with the quantized input value, and then dequantizing the operation result again. In other words, if the module is a separate module, it may include both the second conversion unit 300b-15 and further configured to perform the dequantization step.

The parameter refinement unit 300b-16b may repeat the above process for the second input value of the input data. The parameter refinement unit 300b-16b may perform updating on the scale value $Scale_{default}$ calculated by the second conversion unit 300b-15, and may pass to the second conversion unit 300b-15 a second neural network model with an updated scale value for each connected graph module based on the connective relationship of all graph modules.

In the following, the operation of the quantization-aware retraining unit 300b-16d according to one example of the present disclosure will be described in detail.

The quantization-aware retraining unit 300b-16d may incorporate quantization into the learning phase of the neural network model to fine-tune the weights in the neural network model to reflect quantization errors. The quantization-aware retraining algorithm may include loss function, gradient calculation, and improvement algorithm modification. The quantization-aware retraining unit 300b-16d may compensate for the quantization error by quantizing the trained neural network model and then performing fine-tuning to retrain in a direction that minimizes the loss according to the quantization.

The quantization-aware retraining unit 300b-16d may fine-tune the weight parameters so that the loss (the difference between the output value of the training data and the output value of the second neural network model) is reduced through the retraining process in order to reduce the quantization error in the trained neural network model. The quantization-aware retraining unit 300b-16d may be improved by updating only the weight parameter values by performing retraining after the second conversion unit 300b-15 performs a quantization simulation on the second neural network model in the form of a directed acyclic graph. That is, the quantization-aware retraining unit 300b-16d may perform retraining to update the weight parameter values such that the difference between the output value of the training data and the output value of the second neural network model is minimized in order to improve the weight parameter values of the neural network model that has been trained.

In one example of the present disclosure, the second conversion unit 300b-15 may perform a quantization simulation of the parameters of the second neural network model. As discussed above, the second conversion unit 300b-15 may perform quantization of the parameters of the second neural network model using the equation 1 to the equation 3.

In one example of the present disclosure, the quantization-aware retraining unit 300b-16d may find an updated value for a weight parameter using a gradient descent method for a neural network model including the quantized parameter. The gradient descent method is a method that gradually iterates the process of subtracting the gradient (i.e., the degree of loss according to the change of the weights) of the graph between the weights and the cost starting from the initial weight value to reach the point where the cost is minimized (Minimum Cost) in the correlation between the weights and the cost. Here, the cost can be the difference between the original output value and the output value of the neural network model.

The quantization-aware retraining unit 300b-16d may update the weight parameter values using the following equation 4 while performing retraining for the second neural network model in which quantization is performed.

$$w_{t+1} = w_t - \lambda \frac{\partial L}{\partial w_t} \quad \text{Equation 4}$$

where $w_t$ is the current weight parameter value, L is the loss value, and $w_{t+1}$ is the updated weight parameter value. $\lambda$ is the learning rate. The learning rate indicates the fineness of the retraining performance, and the smaller the learning rate, the finer the change in weight parameters can be applied during the retraining process. The amount of time to retrain and the size of the learning rate can be a tradeoff. Accordingly, the quantization recognition retraining unit 300b-16c may determine the learning rate according to the time to perform retraining experimentally or according to an option selected by the user. In one example, the quantization-aware retraining unit 300b-16d may determine a size of the learning rate, which is the degree of change of the current parameter, according to the user option or the retraining completion time.

The quantization-aware retraining unit 300b-16d may obtain a new weight value by subtracting the degree of loss, i.e., the gradient, according to the change of the weight from the current weight value, as shown in Equation 4. At each step of the quantization-aware retraining of the quantized second neural network model, the quantization-aware retraining unit 300b-16d may update the current parameters by subtracting the loss difference according to the change of the current parameters.

The quantization-aware retraining unit 300b-16d may determine a termination condition of the quantization-aware retraining. In one example, the quantization-aware retraining unit 300b-16d may predetermine a target loss and terminate the quantization-aware retraining when the target loss (threshold) is reached within the predetermined target loss. In another example, the quantization-aware retraining unit 300b-16d may terminate the quantization-aware retraining within a finite execution time. The execution time may be set in epochs. The limited execution time may be predetermined by a user option.

The quantization-aware retraining unit 300b-16d may apply a loss change calculation function to the operation of the graph module to calculate $$\frac{\partial L}{\partial w_t}$$

representing a loss change with respect to a weight parameter for the neural network model in which quantization has been performed.

First, it is described how to calculate the degree of loss according to the change of weight parameters in a neural network model without quantization.

For example, for an input value of x and a weight w of in the first graph module, the output value can be y=x*w. Let $y_{truth}$ be the actual output value of the first graph module, the loss can be calculated as $L=(y_{truth}-y)^2$. The forward calculation as $L=(y_{truth}-y)^2$. The forward calculation is y=x*w, and the backward calculation to verify the degree of loss $$\frac{\partial L}{(\partial w)}$$

for a weight parameter can be defined as $$\frac{\partial L}{\partial w} = \frac{\partial L}{\partial y} * \frac{\partial y}{\partial w} = -2(y_{truth} - y) * x,$$

using $$\frac{\partial L}{\partial y} = -2(y_{truth} - y)$$

to differentiate L from y. However, if quantization is performed on the input value x, the weight w, the degree of loss according to the change of the weight parameter cannot be verified in the backward calculation.

Specifically, when quantization is performed according to the examples of the present disclosure for the first graph module, the input value becomes $$\left\lfloor \frac{x-o}{s_x} \right\rfloor * s_x + o$$

and the weight value becomes $$\left\lfloor \frac{w}{s_w} \right\rfloor * s_w,$$

wherein, x represents an input feature map parameter of the graph module, $s_x$ represents a scale value for the input feature map parameter, o represents an offset value for the input feature map parameter, w represents a weight parameter of the graph module, and $s_w$ represents a scale value for the weight parameter. The forward calculation for the first graph module becomes $$y = \left( \left\lfloor \frac{x-o}{s_x} \right\rfloor * s_x + o \right) * \left( \left\lfloor \frac{w}{s_w} \right\rfloor * s_w \right).$$

Therefore, if the above forward calculation is simply differentiated as it is, the loss change for the weight parameter in the backward calculation cannot be verified.

To solve above-described problem, the quantization-aware retraining unit 300b-16d according to one example of the present disclosure applies the detach function as a loss change calculation function so that the loss changes for the weight parameter, which is not actually calculated in the forward calculation, can be verified in the differentiation process of the backward calculation, as shown in the following Equation 5. In other words, the detach function may be referred to as a loss change calculation function.

Referring to FIG. 11, the quantization-aware retraining unit 300b-16d may add a loss change calculation function to the forward calculation of each of the plurality of graph modules in the quantized second neural network model in response to the quantization modules (e.g., Act Quant, Weight Quant) added to each of the plurality of graph modules. By the loss change calculation function, the quantization-aware retraining unit 300b-16d may verify the output value of each graph module according to the change of each parameter in the backward calculation of each of the plurality of graph modules.

$$y = \left(\left(\text{detach}\left(\left\lfloor\frac{x-o}{s_x}\right\rfloor\right) - \frac{x-o}{s_x}\right) + \frac{x-o}{s_x}\right) * s_x + o\right) * \qquad 1)$$

$$\left(\left(\text{detach}\left(\left\lfloor\frac{w}{s_w}\right\rfloor\right) - \frac{w}{s_w}\right) + \frac{w}{s_w}\right) * s_w\right)$$

$$y = \left(\left(A + \frac{x-o}{s_x}\right) * s_x + o\right) * \left(\left(B + \frac{w}{s_w}\right) * s_w\right) \qquad 2)$$

$$y = \alpha * \beta \qquad 3)$$

In Equation 5, x denotes an input feature map parameter of the graph module, $s_x$ denotes a scale value for the input feature map parameter, o denotes an offset value for the input feature map parameter, w denotes a weight parameter of the graph module, and $s_w$ denotes a scale value for the weight parameter. For example, Equation 5 includes a substitution process to derive 3) $y = \alpha * \beta$, which is the result of the operation of the first graph module (e.g., the Gemm function (i.e., the General Matrix Multiply function) of FIG. 11) from the formula 1), including the detach function. The graph modules utilized to calculate the change in output value according to the examples of the present disclosure may include, for example, Gemm functions, matrix multiplication functions, or convolution functions, and the present disclosure is not limited to the above functions. In formula 1), which contains the detach function, $$\text{detach}\left(\left\lfloor\frac{x-o}{s_x}\right\rfloor\right) - \frac{x-o}{s_x}$$

for the input parameter can be replaced by A, and $$\text{detach}\left(\left\lfloor\frac{w}{s_w}\right\rfloor\right) - \frac{w}{s_w}$$

for the weight parameter can be replaced by B to create the formula 2). In the formula 2), substitute $$\left(\left(A + \frac{x-o}{s_x}\right) * s_x + o\right)$$

for $\alpha$ and $$\left(\left(B + \frac{w}{s_w}\right) * s_w\right)$$

for $\beta$ to create the formula 3).

Using formulas 1) to 3) above, the loss change according to the change of the scale value of the input feature map parameter, the offset value of the input feature map parameter, and the scale value of the weight parameter can be calculated.

In one example, the quantization-aware retraining unit 300b-16d may calculate the respective loss changes $$\frac{\partial L}{\partial s_x}, \frac{\partial L}{\partial o}, \frac{\partial L}{\partial s_w}$$

according to changes in the scale value $s_x$ of the input feature map parameter, the offset value o of the input feature map parameter, and the scale value $s_w$ of the weight parameter by using the derivative of Equation 5, as shown in Equation 6 below.

Equation 6

$$\frac{\partial L}{\partial y} = -2(y_{truth} - y) \qquad 1)$$

$$\frac{\partial L}{\partial \beta} = \frac{\partial L}{\partial y} * \frac{\partial y}{\partial \beta} = -2(y_{truth} - y) * \alpha \qquad 2)$$

$$\frac{\partial L}{\partial w} = \frac{\partial L}{\partial y} * \frac{\partial y}{\partial \beta} * \frac{\partial \beta}{\partial w} = -2(y_{truth} - y) * \alpha * 1 \qquad 3)$$

$$\frac{\partial L}{\partial s_w} = \frac{\partial L}{\partial y} * \frac{\partial y}{\partial \beta} * \frac{\partial \beta}{\partial s_w} = -2(y_{truth} - y) * \alpha * \beta \qquad 4)$$

$$\frac{\partial L}{\partial \alpha} = \frac{\partial L}{\partial y} * \frac{\partial y}{\partial \alpha} = \beta \qquad 5)$$

$$\frac{\partial L}{\partial s_x} = \frac{\partial L}{\partial y} * \frac{\partial y}{\partial \alpha} * \frac{\partial \alpha}{\partial s_x} = -2(y_{truth} - y) * \beta * A \qquad 6)$$

$$\frac{\partial L}{\partial o} = \frac{\partial L}{\partial y} * \frac{\partial y}{\partial \alpha} * \frac{\partial \alpha}{\partial o} = \begin{cases} 0 & \text{if } n < \frac{x-0}{s_x} < m \\ -2(y_{truth} - y) * \beta & \text{otherwise} \end{cases} \qquad 7)$$

n: minimum quantization value m: maxmimum quantization value

Equation 6 includes formula 1) where the loss function $L = (y_{truth} - y)^2$ is differentiated by y. Equation 6 includes differentiating the formula 3) in Equation 5 by $\beta$ and $\alpha$, respectively. Equation 6 includes differentiating the formula corresponding to $\alpha$ in Equation 5 by $s_x$ and o, respectively. The Equation 6 includes differentiating the expression corresponding to $\beta$ in Equation 5 by w and $s_w$, respectively. According to steps 2) to 6) in the Equation 6 can determine the respective loss change $$\frac{\partial L}{\partial s_x}, \frac{\partial L}{\partial o}, \frac{\partial L}{\partial s_w}$$

according to the change of the scale value $s_x$ of the input feature map parameter, the offset value O of the input feature map parameter, and the scale value $s_w$ of the weight parameter.

Referring to Equation 4, the quantization-aware retraining unit 300*b*-16*d* may update the next weight parameter value by subtracting the loss change $$\frac{\partial L}{\partial s_w}$$

according to the change in the scale value $s_w$ of the current weight parameter from the current weight parameter value. At this time, if the degree of loss change reaches a predetermined target loss, the quantization-aware retraining unit 300*b*-16*d* may terminate retraining.

In the following, the operation of the layer-wise training unit 300*b*-16*c* according to one example of the present disclosure will be described in detail.

FIG. 12A is a conceptual diagram describing the operation of the layer-wise training unit 300*b*-16*c*, according to one embodiment. The layer-wise training unit 300*b*-16*c* may improve one or more parameters of the neural network model through layer-wise training. The second conversion unit 300*b*-15 may simulate a quantization for the second neural network model. As described above, the second conversion unit 300*b*-15 may quantize the weight parameters $W_{fp}$ to weight parameters $W_{int}$ reflecting the calibration data using Equation 3. The layer-wise training unit 300*b*-16*c* may update the parameters to reduce a quantization loss that may occur in a function that quantizes the parameters. In one example, the layer-wise training unit 300*b*-16*c* may reduce quantization losses caused by the rounding operation included in Equation 3. In another example, the layer-wise training unit 300*b*-16*c* may update the weight parameters by updating on an element-by-element basis to reduce the quantization loss with respect to the scale included in Equation 3. For a plurality of layers included in the acyclic graph-based neural network model, the layer-wise training unit 300*b*-16*c* may update the parameters by updating at least a portion of the function (e.g., operation or variable) that quantizes the parameters such that the difference (loss) between the output value (output$_{int}$) of the layer that reflects the quantized parameters (e.g., $W_{int}$) and the output value (output$_{fp}$) of the layer that does not perform quantization is reduced for each layer.

Referring to FIG. 12A, for the graph module (Gemm function) included in the first layer, the result of performing an operation within the graph module on the layer input $x_{fp}$ and the weight $w_{fp}$ is $y_{fp}$. If quantization is performed, a quantization module can be added to each of the input and weight values. The layer input $x_{fp}$ becomes $x_{int}$ by the quantization module, and the weight $W_{fp}$ becomes $W_{int}$. The layer-wise training unit 300*b*-16*c* may train to update the rounding operation value or scale value in the weight quantization module such that the difference between the output value $y_{fp}$ of the layer that did not perform quantization and the output value $W_{int}$ of the layer that did perform quantization is reduced.

In one example, when the second conversion unit 300*b*-15 simulates quantization for the second neural network model, the Equation 3 for quantizing the weight parameters may include a rounding operation. Using rounding when quantizing weight parameters may be a preferred way to reduce the quantization loss of the weight values, but in terms of the inference accuracy of the neural network model, rounding may not be the preferred way to reduce quantization error. The layer-wise training unit 300*b*-16*c*, according to one example of the present disclosure, may determine whether each of the weight parameters is rounded down or up such that the quantization loss of the output inferenced by the quantized neural network model is minimal. In one example, the layer-wise training unit 300*b*-16*c* may train layer-by-layer of the neural network model to determine whether to floor or ceil when quantizing the neural network model, instead of performing a rounding operation.

The layer-wise training unit 300*b*-16*c* may update parameters on a layer-by-layer basis to effectively quantize the acyclic graph-based neural network model. In one example, the layer-wise training unit 300*b*-16*c* may, for a plurality of layers included in the second neural network model, update the weight parameters of each layer such that the quantization loss in each layer is reduced. The layer-wise training unit 300*b*-16*c* may apply the quantized parameter values only to the current layer with updated parameters, while the remaining layers may perform operations on the neural network model with the original unquantized parameter values. According to one example of the present disclosure, the quantization function of the weight parameters is represented by Equation 7.

$$\hat{W} = s * \text{clip}\left(\text{floor}\left(\frac{W}{s}\right) + h(V), Qn, Qp\right) \quad \text{Equation 7}$$

where, w is the original weight. ŵ is the weight that was quantized and then de-quantized. s is the scale (or scale vector). Let v be the element-wise parameter to be trained, and let v have the same shape as w. For example, if w is an M*N matrix, then v is also an M*N matrix. Qn and Qp denote the minimum and maximum values in the quantized representation. h(V) is a Rectified Sigmoid with values between 0 and 1. The initial value of v is set to $$h(V) = \left(\frac{W}{s}\right) - \text{floor}\left(\frac{W}{s}\right).$$

For example, the Rectified Sigmoid function h(V) may be defined as $h(V_{i,j}) = \text{clip}(\sigma(V_{i,j})(\zeta-\gamma)+\gamma 0, 1)$ However, h(V) is not limited to the above example, and can be applied to various functions that output values between 0 and 1.

Unlike Equation 3, which is a quantization function for weight parameters involving rounding operations, Equation 7 allows for the selective application of a flooring or ceiling operation by reflecting the learned parameter v that reduces quantization loss for the output value of each layer, instead of using a rounding operation.

The layer-wise training unit 300*b*-16*c* may update a training parameter v included in the quantization function such that the difference (loss) between the output value of the neural network model without quantization (e.g., the FP32 matmul output) and the output value of the neural network model with quantization (e.g., the INT8 matmul output) is reduced for each layer of the neural network model. As v is updated, a rounding error can be introduced to ensure that h(V) approaches 0 or 1. According to one example of the present disclosure, the loss function is (shown in Equation 8.

$$\mathcal{L} = \underset{V}{\text{argmin}} \left\| f_a(Wx) - f_a(\hat{W}\hat{x}) \right\|_F^2 + \lambda f_{reg}(V) \quad \text{Equation 8}$$

where, x is the input of each layer. $f_\alpha$ is the activation function. $\|\cdot\|_F^2$ is a normalization function (e.g., Frobenius norm). A variety of normalization functions may be applied in addition to the Frobenius norm. $f_\alpha(Wx)$ represents the output of each layer of the neural network model containing the parameters in a floating-point form before performing quantization, and corresponds to $y_{fp}$ in FIG. 12A. $f_\alpha(\hat{W}\hat{x})$ represents the output value of each layer of a neural network model with integer parameters and corresponds to $y_{int}$ in FIG. 12A. According to Equation 8, argmin for v computes the loss using the mean squared error (MSE) of the inferenced value of the layer that performed quantization and the original inferenced value of the layer that did not perform quantization.

$f_{reg}$ is an induction function to drive h(V) to converge to either 0 or 1. For example, $f_{reg}$ may be defined as $$f_{reg}(V) = \sum_{i,j} 1 - |2h(V_{i,j}) - 1|^\beta$$

for h(V). h(V) may converge to 0 or 1, but it will be a real value rather than an integer, i.e., a floating-point. In one example, once the learned parameter v is updated, the value of h(V) may be converted to an integer value by rounding it to 0 or 1. This may result in rounding error. $f_{reg}$ may be introduced as a regularization function to reduce the rounding error. However, $f_{reg}$ is not limited to the above examples, and various regularization functions may be applied to minimize the rounding error contained in the h(V) In Equation 8, the variables that are duplicated in Equation 7 may be the same as in Equation 7.

The layer-wise training unit 300b-16c may set a learning rate λ when performing updating of the learned parameter v such that the rounding error is reduced. For example, for a batch size of 1, the learning rate may be set to 0.001.

The layer-wise training unit 300b-16c may update the weight parameters by training the neural network model layer-wise using Equations 7 and 8. The layer-wise training unit 300b-16c may reduce the deterioration of the inference accuracy according to the quantization of the neural network model by reducing the loss of the output value of each layer rather than reducing the loss of the weight value itself before and after quantization.

As another example, when the second conversion unit 300b-15 simulates quantization for the second neural network model, Equation 3 for quantizing the weight parameter includes an operation of dividing the weight weight$_{fp}$ by the scale $s_w$. The weight parameters can be multi-elemental. For example, the weight values may be an M*N matrix. In one example of the present disclosure, the scale value for performing quantization may be calculated as shown in Equation 1. In this case, one scale value is calculated for one parameter, so that one scale value applies equally to all elements contained in the parameter. The layer-wise training unit 300b-16c according to one example of the present disclosure may update the scale value for each element of the parameter (i.e., element-wise). The layer-wise training unit 300b-16c may each determine a scale value for each weight parameter for each layer of the neural network model such that the quantization loss of the output inferenced by the quantized neural network model is reduced.

The layer-wise training unit 300b-16c may update the weight parameters as shown in Equation 9 by learning the elements included in the weight parameters with respect to the scale $S_W$ that quantizes the weight parameters.

Equation 9

$$\hat{W} = \begin{cases} s_1 \, \text{round}\left(\dfrac{W}{s_1 \odot s_2 \odot s_3}\right) & \text{if } W \text{ is a fully-connected layer} \\ s_1 \, \text{round}\left(\dfrac{W}{s_1 \odot s_2 \odot s_3 \odot s_4}\right) & \text{if } W \text{ is a convolutional layer} \end{cases}$$

where, w is the original weight. $\hat{w}$ is the dequantized weight after quantizing and then dequantizing again. s is the scale (or scale vector). $s_1$ is the initial scale value. For example, $s_1$ can be a value calculated according to Equation 1. $s_2$ is a learned parameter of the same shape as the weight parameters. $s_1 \odot s_2$ allows one scale value to be expressed as the values of the weight parameters. $s_3$ is the channel-wise learned parameter, which is updated to reduce the quantization loss. For a fully-connected layer, the scale value is updated according to Equation 1. For a convolutional layer, the scale value is updated according to Equation 2. For Convolutional layer, more learned parameters $s_4$ is further required.

For a fully-connected layer, when $W \in \mathbb{R}^{C_{out} \times C_{in}}$, it can be defined as $S_2 \in \mathbb{R}_{>0}^{C_{out} \times C_{in}}$ and $s_3 \in \mathbb{R}_{>0}^{C_{out} \times 1}$.

For a convolutional layer, when $W \in \mathbb{R}^{C_{out} \times C_{in} \times H \times W}$, it can be defined as $S_2 \in \mathbb{R}_{>0}^{C_{out} \times C_{in} \times H \times W}$, $s_3 \in \mathbb{R}_{>0}^{C_{out} \times C_{in} \times 1 \times 1}$, and $s_4 \in \mathbb{R}_{>0}^{C_{out} \times C_{in} \times 1 \times 1}$.

The layer-wise training unit 300b-16c may update a scale value included in the quantization function such that the difference (loss) between the output value of the neural network model without quantization (e.g., FP32 matmul output) and the output value of the neural network model with quantization (e.g., INT8 matmul output) is reduced for each layer of the neural network model, and the scale value is updated according to Equation 9. In this case, the loss function can be defined as Equation 10.

$$\text{Loss funtion: } \mathcal{L} = \|Wx - \hat{W}\hat{x}\|_F^2 \qquad \text{Equation 10}$$

where, w is the original weight. $\hat{w}$ is the dequantized weight after quantizing and then dequantizing again. x is the input of each layer.

$$\|\cdot\|_F^2$$

is a normalization function (e.g., Frobenius norm). A variety of normalization functions may be applied in addition to the Frobenius norm. Wx denotes the output values of each layer of the neural network model containing the parameters in the form of floating-point numbers before performing quantization, and corresponds to $y_{fp}$ in FIG. 12A. $\hat{W}\hat{x}$ denotes the output values of each layer of the neural network model containing the parameters in the form of integers corresponding to $y_{int}$ in FIG. 12A. The layer-wise training unit 300b-16c may update the scale values such that the loss of the loss function of Equation 10 is reduced for each layer of the neural network model, according to Equation 9.

The layer-wise training unit 300b-16c may set a learning rate when performing training on the learned parameters to reduce the quantization loss. For example, for a batch size of one, the learning rate may be set to 0.00003.

In the following, the operation of the quantization aware self-distillation unit (QASD) 300b-16e according to one example of the present disclosure will be described in detail.

FIG. 12B is a diagram illustrating the operation of the QASD according to one example of the present disclosure.

The quantization aware self-distillation unit (QASD) 300b-16e can perform self-distillation by calculating the loss of the quantized neural network model based on the output values of the same neural network model with floating-point parameters that have not undergone quantization. In other words, the QASD unit 300b-16e according to one example of the present disclosure may, for the same neural network model, perform quantization-aware retraining by applying a self-distillation that performs retraining of the model that has performed quantization based on the output value of the model before performing quantization.

The optimization unit 300b-16 according to one example of the present disclosure may increase the inference accuracy of the neural network model by improving parameters, such as outlier alleviation unit 300b-16a or parameter refinement unit 300b-16b, after the training of the neural network model is completed. Further, the optimization unit 300b-16 may perform retraining to improve parameters to reduce quantization error of the quantized neural network model via the QAT 300b-16d.

Retraining of a neural network model refers to retraining a model using additional data to an initially trained model. If a model has been initially trained, new data can be used to tune or update the existing model. It can be used to reflect new knowledge, usually when data has been added or changed. Retraining usually refers to the process of updating the trained weights on a dataset. Related to retraining, data augmentation in deep neural network models can be used to improve the performance of the model.

Data augmentation may refer to the process of transforming or expanding existing training data to generate new training data. It can be applied to various types of data, including images, text, and audio. For instance, in the case of image data, transformations such as rotation, translation, resizing, flipping, and brightness adjustment can be applied to create a new set of images. For text data, new datasets can be created by changing synonyms or restructuring sentences. When applying data augmentation to deep neural network models, the original data intended for model training is first collected. This data may be relevant to the target that the model aims to infer. Various methods can be employed to augment the original data. The augmented data is then added to the existing training dataset, and the model can be retrained. This enables the model to learn a wider variety of data patterns more effectively, thereby improving its generalization performance. The retrained model can be evaluated using a validation dataset to assess its performance. During this evaluation, metrics such as accuracy or other performance indicators (e.g., execution time) can be measured to determine how the augmented data has improved the performance of the model. This process can be repeated, with additional data augmentation performed as needed, to continually enhance the model. Data augmentation is particularly useful in situations where data is scarce or labeling is challenging.

In deep learning models, quantization-aware training (QAT) differs from general retraining of neural network models by considering quantization during the training process. When a neural network model undergoes quantization, floating-point weights and activation parameters are expressed in an integer format with a reduced number of bits, which can affect the model's inference accuracy. Therefore, in one example of the present disclosure, the quantization-aware retraining (QAT) method in the QASD unit 300b-16e aims to minimize quantization errors by treating the difference between the ground truth (e.g., label values) of the retraining data and the inference result value (e.g., output values) from the quantized neural network model as the loss, and updating the parameters to minimize this loss. If the data augmentation methods used for general neural network retraining are directly applied to quantization-aware retraining, there can be an issue of overfitting (i.e., overgeneralization) to the retraining data. To explain, since data augmentation improves generalization performance to avoid overfitting, and quantization-aware retraining also improves generalization performance, simultaneous data augmentation and quantization-aware retraining can lead to too much generalization, which can actually degrade the performance of the neural network model. To address this issue, the QASD unit 300b-16e in one example of the present disclosure may use self-distillation to reduce overgeneralization during QAT.

In one example, the quantization-aware self-distillation (QASD) method of the QASD unit 300b-16e refers to a method of referring to output values of the same neural network model, rather than labels of the training data, when performing quantization-aware retraining. The quantization-aware self-distillation retraining (QASD) method of the QASD unit 300b-16e may perform self-distillation to calculate the loss of the quantized neural network model based on an output value of the neural network model that includes a parameter in the form of a floating-point number that has not been quantized. In other words, the quantization-aware self-distillation retraining (QASD) method of the QASD unit 300b-16e according to one example of the present disclosure may, for the same neural network model, perform quantization-aware retraining by applying a self-distillation that performs retraining of the model that has performed quantization based on the output value of the model before performing quantization.

Referring to FIG. 12B, the compiler 300b-10 according to one example of the present disclosure may generate a simulated quantization model to include parameters in the form of integers having a predetermined target number of bitwidth from a pre-trained model that includes parameters in the form of floating-point numbers. For simplicity, the pre-trained model with parameters in the form of floating-point numbers will be referred to hereafter as a P-neural network model and the simulated quantization model as a Q-neural network model.

The QASD unit 300b-16e performing QASD may first retrain the P-neural network model using the retaining data. The QASD unit 300b-16e performing QASD may calculate a first loss (e.g., loss1) as a difference between the output value (FP32_output) of the P-neural network model and the actual output value (label) of the retraining data. The QASD unit 300b-16e performing QASD may update the parameters of the P-neural network model such that the first loss is reduced during retraining.

In one example, the QASD unit 300b-16e performing QASD may generate a Q-neural network model using Equations 1 to 3 for the P-neural network model. The P-neural network model and the Q-neural network model are substantially the same neural network model, differing only in the type of representation of the parameters. The P and Q neural network models have the same neural network structure, and each layer has substantially the same parameters (e.g., weight parameters and bias parameters). In this case, the parameters of the P-neural network model may be in the floating-point form and the parameters of the Q-neural network model may be in the integer form.

The QASD unit 300b-16e performing QASD may retrain the Q-neural network model using the retraining data. The QASD unit 300b-16e may calculate the difference between the output value (e.g., FP32_output) of the P-neural network model and the output value (e.g., sq_output) of the Q-neural network model based on the output value (e.g., FP32_output) of the P-neural network model, rather than the actual output value (e.g., label) of the retraining data, as the second loss. The QASD unit 300b-16e performing QASD may update the parameters of the Q-neural network model such that the second loss is reduced during retraining.

Using $k^{th}$ training data as an example, the output value of the P-neural network model on the $k^{th}$ training data is $y_{fp}$, and the output value of the Q neural network model on the kth training data is $y_{int}$, given that the actual output value on the $k^{th}$ training data is $y_{truth}$. The QASD unit 300b-16e may calculate the first loss as $L_1=(y_{truth}-y_{fp})^2$ and the second loss as $L_2=(y_{fp}-y_{int})^2$. The QASD unit 300b-16e performing QASD may update the weight parameters of the P-neural network model such that the first loss is reduced during retraining of the P-neural network model. The QASD unit 300b-16e performing QASD may update the weight parameters of the Q-neural network model such that the second loss is reduced during retraining of the Q-neural network model.

In one example of the present disclosure, the retraining data may be the same as the initial training data. For example, the retraining data may be part of the initial training data. Alternatively, in another example of the present disclosure, the retraining data may be different from the initial training data. However, the retraining data may be determined with respect to the initial training data. For example, if the initial training data is a video image, the retraining data may also be a video image. The retraining data may be generated by expanding the initial training data through data augmentation.

In one example of the present disclosure, QASD unit 300b-16e performing QASD may find the preferred value for the weight parameters using gradient descent for a neural network model that includes quantized parameters. Gradient descent is a method that iteratively performs the process of subtracting the gradient of the cost with respect to the weight (i.e., the rate of change in loss due to weight changes) from the initial weight value, in order to reach the point where the cost is reduced (e.g., Minimum Cost) based on the correlation between weight and cost. The QASD unit 300b-16e performing QASD may calculate the cost based on inference values, i.e., an output values, of a neural network model having parameters in the form of floating-point numbers identical to those of the neural network model that performed the quantization, i.e., the actual output values of the retrained data, rather than label values. Specifically, the cost, i.e., the loss according to quantization, can be calculated as the square of the output value $y_{fp}$ of the neural network model with parameters in the form of minor decimal points minus the output value $y_{int}$ of the neural network model with quantization performed $L_2=(y_{fp}-y_{int})^2$.

The QASD unit 300b-16e performing QASD may perform retraining of the Q-neural network model simulating quantization according to Equations 1 to 3 for the P-neural network model, while updating the weight parameter values using Equation 4.

In one example, the QASD unit 300b-16e performing QASD may first perform retraining on the P-neural network model. Since the P-neural network model has not been quantized, the parameters may be updated based on the label values of the retraining data according to a general retraining method. The QASD unit 300b-16e performing QASD may store the output values of the P-neural network model for the retrained data. In another example, if the retraining data is the same as the initial training data, retraining of the P-neural network model may not be performed. The output values of the P-neural network model on the initial training data can be used as is.

Using Equation 5, the QASD unit 300b-16e performing QASD may forward pass the retrained data through the Q-neural network model to generate an inferenced output value. The QASD unit 300b-16e performing QASD may calculate a loss function $L_2=(y_{fp}-y_{int})^2$ representing the difference between the inferenced output value 1 of the P-neural network model and the inferenced output value $y_{int}$ of the Q-neural network model. In this case, the loss function reflects quantization-related losses. The QASD unit 300b-16e performing QASD may calculate a gradient of the loss function in the back propagation process using Equation 6. According to the value of the gradient, each parameter may be updated. For example, the weight parameters can be updated according to the change in loss function due to the weight difference. By repeating this process, the weight parameters of a particular layer will converge to the updated value.

The compiler 300b-10, according to one example of the present disclosure, may add a plurality of markers to the plurality of graph modules included in the first neural network model in the form of a directed acyclic graph (DAG) using the marker embedding unit 300b-13. The compiler 300b-10 may generate calibration data by collecting input values and output values of each of the plurality of graph modules using the plurality of markers using the calibration unit 300b-14 to generate calibration data. The second conversion unit 300b-15 of the compiler 300b-10 may determine, based on the calibration data, a scale value and an offset value applicable to the first neural network model according to Equation 1. Based on the scale value and the offset value, the second conversion unit 300b-15 may perform quantization on the first neural network model having parameters in the floating-point format to generate a second neural network model having quantized parameters in the integer format. The QASD unit 300b-16e performing QASD may obtain an output value of the first neural network model based on the retraining data. Based on the output value of the first neural network model, the QASD unit 300b-16e performing QASD may perform quantization-aware retraining of the second neural network model to update the at least one weight parameter included in the second neural network model.

The QASD unit 300b-16e performing QASD may update the parameters of each of the plurality of graph modules included in the second neural network model using a gradient descent method for each of the plurality of graph modules such that the loss according to the parameter change is reduced. In this case, the loss represents the difference between the output value of the graph module of the first neural network model corresponding to the graph module of the second neural network model and the output value $y_{fp}$ of the graph module of the second neural network model. In other words, in the process of the quantization-aware retraining, the loss is the difference between the inferenced output value of the P-neural network model and the inferenced output value $y_{int}$ of the Q-neural network model. The QASD unit 300b-16e performing QASD may update the current weight parameters by subtracting a loss difference according to the change in the current weight parameters using Equation 4. Equation 4 may include a learning rate λ indicative of the degree of parameter change. The learning rate indicates a fine degree of performing retraining, such that the smaller the learning rate, the finer the degree of change of the weight parameters can be applied during the retraining process. The QASD unit 300b-16e performing QASD may select a degree of change in the current parameter by determining magnitude of a learning rate according to user options or a processing time for retraining. The QASD unit 300b-16e performing QASD may terminate when the loss reaches a predetermined threshold or exceeds a predetermined execution time. The execution time may be set in epochs. The execution time limit may be predetermined by user options.

The QASD unit 300b-16e performing QASD may add a loss change calculation function to the forward calculation of each of the plurality of graph modules included in the second neural network model in response to the quantization module added to each of the plurality of graph modules, as shown in Equation 5, and may check the output value of each graph module according to the change of each parameter in the backward calculation of each of the plurality of graph modules, as shown in Equation 6.

In one example, the graph module may be a General Matrix Multiply function (Gemm function), a matrix product function, or a convolution function, and the present disclosure is not limited to said functions.

The loss calculation function may not affect the calculation result of the forward calculation, but may allow the backward calculation to preserve the original formula that was removed by the round and clip operations included in the quantization module. For example, the QASD unit 300b-16e performing QASD may include a detach function, which is a loss change calculation function, in the operation y=α*β of the graph module for the forward calculation, as shown in Equation 5. The loss may be defined as a loss function $L_2=(y_{fp}-y_{int})^2$ for the output value $y_{fp}$ of the first neural network model and the output value $y_{int}$ of the second neural network model. The QASD unit 300b-16e performing QASD may change the expression 1)

$$\frac{\partial L}{\partial y} = -2(y_{truth} - y)$$

in Equation 6 to an expression $$\frac{\partial L}{\partial y} = -2(y_{fp} - y_{int})$$

that differentiates $L_2$. The variables are changed, but said equations are the same.

According to the change of 1), the variables of 2) to 7) of Equation 6 are also changed. The QASD unit 300b-16e performing QASD may determine each loss change $$\frac{\partial L}{\partial s_x}, \frac{\partial L}{\partial o}, \frac{\partial L}{\partial s_w}$$

according to the change of the scale value $s_x$ of the input feature map parameter, the offset value o of the input feature map parameter, and the scale value $s_w$ of the weight parameters in the backward calculation using the changed expression of the derivative of the loss function of Equation 6.

Referring to Equation 4, the QASD unit 300b-16e performing QASD may update the next weight parameter value by subtracting the loss change according to the change in the scale value of the current weight parameters from the current weight parameter value. At this time, if the loss change reaches a predetermined target loss, the QASD unit 300b-16e performing QASD may terminate the retraining.

In the following, the operation of the pruning unit 300b-16f according to one example of the present disclosure will be described in detail.

According to an example of the present disclosure, the pruning unit 300b-16d may provide a technique to reduce the computational load of a neural network model. The pruning algorithm may be configured to replace small values close to zero among the weights in all layers of the neural network model with zero. Multiple neural processing units 2200a may skip multiplication operations associated with weights that are zero, thereby improving convolution operation speed and reducing power consumption, as well as reducing the parameter size of the machine code for the pruned neural network model. To elaborate, if specific weight parameters are replaced with zero by the pruning option, the pruning algorithm can effectively sever the neural network model connections containing those weights, achieving a similar effect. For instance, pruning options may include a first size-based pruning option that removes small weights and a second percentage-based pruning option that removes a specific percentage of the smallest weights.

The pruning unit 300b-16f may perform pruning of the weight parameters for each layer of the second neural network model at a level that does not substantially degrade the inference accuracy of the second neural network model. In one example, the pruning unit 300b-16f may remove some elements of the weight parameter for each layer of the neural network model, and then mark the elements if the inference accuracy of the neural network model is within a particular threshold range. The method for selecting which elements to remove may vary. In one example, the selection can be made by a range of weight values, the selection can be made according to the position of the element, or the selection can be made arbitrarily. The pruning unit 300b-16f may perform maximum pruning by gradually increasing the degree of pruning while the inference accuracy of the neural network model is within a particular threshold range. Alternatively, the pruning unit 300b-16f may gradually increase the degree of pruning until a certain degree of pruning is reached while the inference accuracy of the neural network model is within a threshold range.

In one example, the pruning unit 300b-16f may perform magnitude-based pruning. The pruning unit 300b-16f may perform pruning by setting a threshold value A, and setting weights with absolute values less than A to zero. The pruning unit 300b-16f may reset the threshold value A, while increasing the pruning rate while the inference accuracy of the neural network model is within the threshold range.

In one example, the pruning unit 300b-16f may perform pruning by judging the importance of a weight parameter. The importance of the weights in the neural network can be determined by sensitivity or saliency. Sensitivity indicates the importance of a weight and can be measured by the magnitude of the derivative of the weight with respect to loss. The higher the sensitivity of a weight, the more important the weight may be considered. The pruning unit 300b-16f can identify important weights in the neural network based on the sensitivity of the weights, and can be used as a means of pruning the least important parts of the network with low impact on the performance (e.g., inference accuracy) of the network. Sensitivity can be calculated in several ways.

In one example, the pruning unit 300b-16f may prune the weight parameter based on a loss change criterion. The loss change criterion may measure the importance of a weight by evaluating the difference in loss of the neural network when a particular weight is removed from the neural network and when it is not removed. The pruning unit 300b-16f may utilize a first-order Taylor-expansion to measure the loss change for small changes. The first-order Taylor-expansion is a useful mathematical tool when dealing with differentiable functions, and the pruning unit 300b-16f can calculate the change in the loss function in the neural network. The neural network may be trained to reduce the loss of the loss function using gradient descent, and the rate of change of the loss function may play an important role. For example, for a function f(x), the first-order Taylor expansion can be expressed as f(x+Δx)≈f(x)+f'(x)Δx, where f'(x) is the derivative of f(x), and Δx represents a very small change. For the loss function L(θ), let θ denote a parameter of the model. The rate of change for the parameters of the loss function can be summed, for example, the rate of change for $\theta_i$ can be found as $$L(\theta + \Delta\theta) \approx L(\theta) + \frac{\partial L}{\partial \theta_i}\Delta\theta, \text{ where } \frac{\partial L}{\partial \theta_i}$$

is the partial derivative of the loss function L with parameter $\theta_i$, and Δθ represents a very small change. The rate of change of the loss function calculated through the above process can be used to update the parameters. If the rate of change is negative, the update can be made to reduce the loss, and if the rate of change is positive, the update can be made to increase the loss. The pruning unit 300b-16f can decrease the loss, i.e., decrease the degree of progressive pruning, or stop pruning. The pruning unit 300b-16f may repeat the gradual pruning again in the direction of increasing the loss, or increase the degree of pruning.

Each of the elements included in the compiler 300b-10 may be performed independently, and may not affect each other. For example, if n number of elements included in the compiler 300b-10 are to be improved, the order in which they are performed may be determined by as many as n!. In various examples, outlier alleviation may be performed first, followed by parameter refinement, as an example of increasing efficiency. After the pruning process is performed, for each parameter, whether or not it is marked according to pruning may be stored as a flag or the like, and when it is finally compiled, computation may be skipped on elements that have been deleted by pruning. For example, the value of an element removed by pruning may be zero-skipped. Because each parameter requires an additional bit to store a marker indicating the result of pruning after pruning has been performed, it may be determined that pruning is performed last in the improvement sequence within compile, given memory requirements, and the like. FIG. 12C is an example of the operation of the pruning unit 300b-16f shown in FIG. 11.

The pruning unit 300b-16f may perform pruning on the weight parameters included in each layer of the second neural network model. The pruning unit 300b-16f may remove values of the weight parameters that do not affect the resulting value of the neural network model, thereby reducing the amount of computation to improve the overall computation speed. The pruning unit 300b-16f may perform pruning on the second neural network model based on the directed acyclic graph, and may perform pruning on the second neural network model in which at least some parameters are improved.

In one example, the pruning unit 300b-16f may perform pruning for a weight parameter for each layer of the second neural network model. The pruning unit 300b-16f may apply 1) a method for pruning elements corresponding to a preset pattern, 2) a method for pruning elements having a weight value close to zero based on a threshold value A, 3) a method for pruning elements corresponding to a certain channel, or 4) a method for pruning elements corresponding to a certain row, and the like, for the weight parameter weight W. According to each method, the pruned elements can be stored as a mask. The mask may have a value of 0 or 1, and may have the same shape as the weight parameter. If the mask value is 1, the value of the weight parameter is maintained, and if the mask value is 0, the value of the weight parameter is pruned and can be zero-skipped in the calculation. Referring to FIG. 12C, the hatched portions of masks 1 to 4 have a value of 0 to be pruned, and the remaining portions have a value of 1 to preserve the element values.

Mask 1 in FIG. 12C is an example of pruning elements corresponding to a predetermined pattern. The pruning unit 300b-16f may predefine various patterns reflecting features of the input data, structural features of the neural network model, and the like. The pruning unit 300b-16f may perform pruning on the neural network model by selecting one of the predefined patterns, and the predefined pattern may be determined to increase the pruning area, and may gradually increase the pruning ratio.

Mask 2 in FIG. 12C is an example of pruning elements with a weight value close to zero based on a threshold A. The threshold A may be a ratio, or it may be an absolute value. For example, if the threshold A is a percentage, it might prune A % of the weighted values that are close to zero. Alternatively, if the threshold A is an absolute value, it might prune weight values that are less than the threshold A. The threshold A may be adaptively determined to reflect features of the input data, structural features of the neural network model, and the like.

Mask 3 in FIG. 12C is an example of pruning elements corresponding to a certain channel. The pruning unit 300b-16f may perform pruning on a channel-by-channel basis. In the case of channel-by-channel pruning, the effectiveness of pruning in hardware operations can be increased. The pruning unit 300b-16f may mask as in Mask 3, and may adjust the shape of the weight parameter to be small. For example, in channel 1, channel 2, channel 3, and channel 4, if channels 1 and 4 are masked, the size of the weight parameter matrix can be cut from 4×4 to 2×4 (e.g., channel mask).

Mask 4 in FIG. 12C is an example of pruning elements corresponding to a certain row. The pruning unit 300b-16f may perform pruning on a row-by-row basis. Similar to pruning on a channel-by-channel basis (i.e. channel-wise), the shape of the weight parameter itself can be adjusted to be smaller when masked on a row-by-row basis (i.e., row-wise). For example, in row 1, row 2, row 3, and row 4, after masking rows 2 and 3, the size of the weight parameter matrix can be pruned from 4×4 to 4×2 (e.g., row mask).

The pruning unit 300b-16f may incrementally update the mask using each pruning method. After applying the initial mask value to the weight parameters, the degree of loss of the neural network model may be checked to determine whether to mask or not. If the degree of loss is greater than a predetermined threshold, the masking may not be adopted. The pruning unit 300b-16f may be repeated by gradually increasing the degree of pruning.

In various examples, the pruning unit 300b-16f may set a separate pruning marker for each weight parameter in each layer, and may check the marker when the corresponding element of the weight parameter is marked.

Figure 13A:
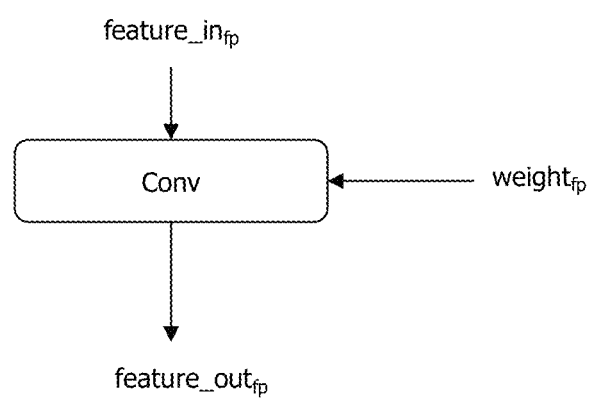
FIG. 13A is a conceptual diagram illustrating the convolution operation of a first neural network model, according to an example of the present disclosure.

FIG. 13A and Equation 11 are examples of convolutions of a first neural network model to illustrate an example of the present disclosure.

The convolution of the first neural network model may be represented by FIG. 13A and Equation 11. In FIG. 13A, a graph module Conv corresponding to the convolution are shown. Each graph module has parameters to be input. The input/output parameters of the graph module may refer to Equation 11. The graph module shown in FIG. 13A can form a directed acyclic graph (DAG). The first neural network model is an example of a typical neural network model, which is a neural network model in which all operations are performed with floating-point parameters. The first neural network model may be a model that is only executable on the GPU 100b of the neural network model optimizer 1500, and may include function call instructions.

$$\text{feature\_out}_{fp} = \text{feature\_in}_{fp} \otimes \text{weight}_{fp}, \quad \text{Equation 11}$$

where feature_out$_{fp}$ is the output feature map in the form of floating-point, feature_in$_{fp}$ is the input feature map in the form of floating-point, and weight$_{fp}$ is the weight in the form of floating-point, where $\otimes$ means convolution. Here, Equation 11 expresses substantially the same operation as in FIG. 13A.

Figure 13B:
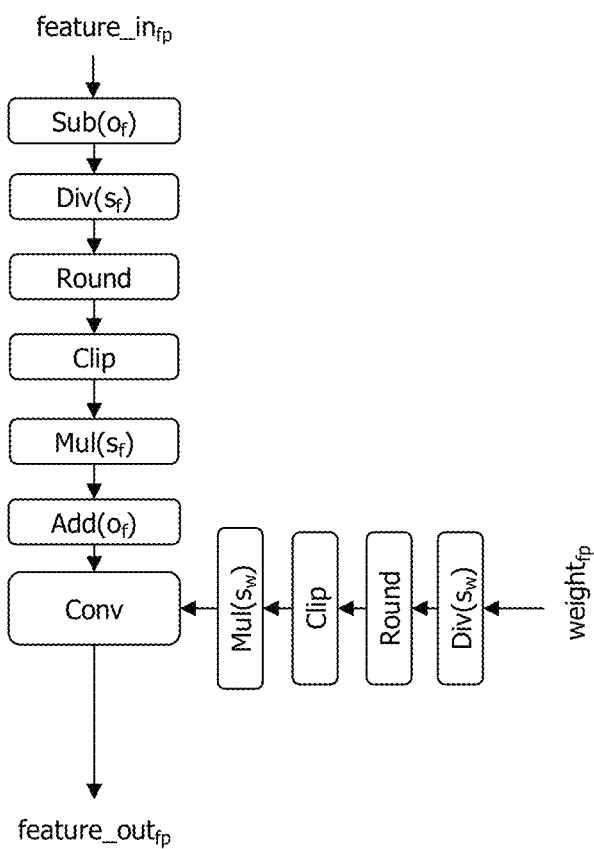
FIG. 13B is a conceptual diagram illustrating a convolutional product of a second neural network model, according to an example of the present disclosure.

FIG. 13B and Equation 12 are examples of convolutions of a second neural network model to illustrate an example of the present disclosure.

The convolution of the second neural network model can be represented by FIG. 13B and Equation 12. In FIG. 13B, a graph module corresponding to convolution Conv, a graph module corresponding to subtraction Sub, a graph module corresponding to division Div, a graph module corresponding to round Round, a graph module corresponding to clip Clip, and a graph module corresponding to addition Add are shown. Each graph module is configured with input parameters. The parameters of each graph module may refer to Equation 12. Some of the graph modules in FIG. 13B may be converted function call instructions from the graph generation unit 300b-12. Each of the graph modules shown in FIG. 13B may be connected to each other to form a directed acyclic graph (DAG). The second neural network model is an example of a neural network model that can simulate quantization of the first neural network model, and is a neural network model in which all operations are processed with floating-point parameters, and can calculate inference accuracy deterioration due to quantization, quantization errors, and the like.

$$\text{feature\_out}_{fp} = \left( \left\lfloor \frac{\text{feature\_in}_{fp} - o_f}{s_f} \right\rfloor \times s_f + o_f \right) \otimes \left\lfloor \frac{\text{weight}_{fp}}{s_w} \right\rfloor \times s_w \quad \text{Equation 12}$$

where feature_out$_{fp}$ represents the output feature map in the form of floating-point for which quantization is simulated, feature_in$_{fp}$ represents the input feature map in the form of floating-point, of represents the offset value of Equation 1 for the input feature map in the form of floating-point to be quantized, and s$_f$ represents the scale value of Equation 1 for the input feature map in the form of floating-point to be quantized, weight$_{fp}$ represents the weight in the form of floating-point to be quantized, s$_w$ represents the scale value of Equation 1 for the weight in the form of floating-point to be quantized, $\lfloor \ \rfloor$ represents the round and clip operations, and $\otimes$ represents a convolution. Here, Equation 12 expresses substantially the same operations as in FIG. 13B.

Thus, the compiler 300b-10 may simulate quantization of the first neural network model using the second neural network model. By simulating the quantization using the second neural network model, the compiler 300b-10 may evaluate the degree of inference accuracy degradation. The degree of inference accuracy degradation may depend on the level of target quantization (e.g., 16-bit, 8-bit, 4-bit, 2-bit quantization level) and the degree of clipping. Depending on the settings of the compiler 300b-10, quantization of various bitwidth can be simulated.

Additionally, the compiler 300b-10 may set the same quantization degree for each graph module. The compiler 300b-10 may set different quantization degrees for each graph module. The compiler 300b-10 may set different quantization degrees for the input parameters and output parameters of the graph modules. The compiler 300b-10 may set the quantization degrees of the input parameters and the output parameters of the graph module to be the same as each other.

Next, the third conversion unit 300b-17 may convert the second neural network model into a third neural network model executable on the neural processing unit 100a of the edge device 1000. That is, the third conversion unit 300b-17 may perform an operation to generate the third neural network model based on the quantization simulation result of the second neural network model.

Here, the first neural network model and the second neural network model may be models executable on the GPU 100b capable of inference and learning, and the third neural network model may be a model executable on the neural processing unit 100a of the edge device 1000 capable of inference only.

In other words, the third neural network model may be a neural network model improved for inference. Thus, the edge device 1000 may receive the third neural network model from the neural network model optimization unit 1500. The third neural network model may be a compiled neural network model, which may be referred to as binary code, machine code, or the like. The third neural network model may be stored in memory 200a of edge device 1000. The third neural network model is configured to run on the neural processing unit 100a of the edge device 1000.

Figure 13C:
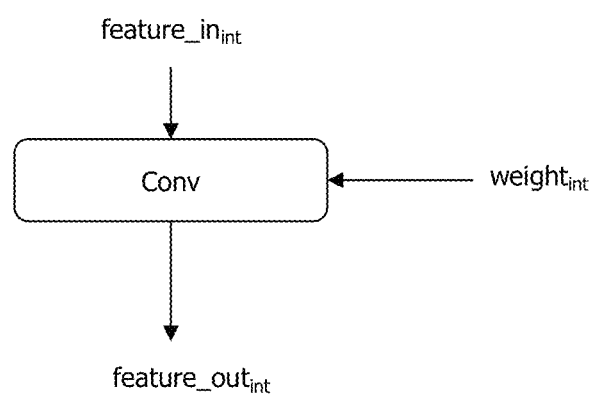
FIG. 13C is a conceptual diagram illustrating a convolutional product of a third neural network model, according to an example of the present disclosure.

FIG. 13C and Equation 13 are examples of convolutions of a third neural network model to illustrate an example of the present disclosure.

The convolution of the third neural network model may be represented by FIG. 13C and Equation 13. FIG. 13C illustrates a graph module Conv corresponding to the convolution. Each graph module has input parameters set. The input/output parameters of the graph module of FIG. 13C may refer to Equation 13. The graph modules shown in FIG. 13C may comprise a directed acyclic graph (DAG).

FIG. 13C illustrates an example of a quantized convolution of a third neural network model. A processing element (not shown) of the neural processing unit 100a of the edge device 1000 may be a circuit configured to process the convolution of the third neural network model. The processing element may be a circuit configured to receive an integer parameter as an input and output an integer parameter. The processing element may be an operator configured to process a multiply and accumulation (MAC) operation. For example, the plurality of processing elements (not shown) of the neural processing unit 100a may correspond to the plurality of processing elements 110 shown in FIGS. 3, 4A, and 5. The neural processing unit 100 illustrated in FIGS. 3, 4A, and 5 may correspond to the neural processing unit 100a included in the edge device 1000 of FIG. 6.

$$\text{feature\_out}_{int} = \text{feature\_in}_{int} \otimes \text{weight}_{int} \quad \text{Equation 13}$$

where $\text{feature\_out}_{int}$ represents the output feature map in the form of integer, $\text{feature\_in}_{int}$ represents the input feature map in the form of integer, $\text{weight}_{int}$ represents the weight in the form of integer, and $\otimes$ means convolution. Here, Equation 13 and FIG. 13C express substantially the same operation.

For example, $\text{feature\_in}_{int}$ may be input to the first input of the first processing element PE1 of FIG. 4A. Here, $\text{feature\_in}_{int}$ may be a parameter quantized to 8-bit. However, the present disclosure is not limited thereto, and the bitwidth of $\text{feature\_in}_{int}$ may be from 2 to 16 bit.

As an example, the $\text{feature\_in}_{int}$ of Equation 13 may be quantized via Equation 2. Alternatively, the $\text{feature\_in}_{int}$ may be configured to be provided by a sensor, such as an image sensor, microphone, radar, lidar, or the like, connected via interface 400a of edge device 1000. Here, the value of $\text{feature\_in}_{int}$ may be stored in memory 200b via interface 400a of edge device 1000 in real-time (e.g., frame-by-frame, line-buffer-by-line, and the like). For example, $\text{feature\_in}_{int}$ may be an RGB image with a resolution of 8-bit output from a camera. Thus, the edge device 1000 can process the computation of the third neural network model with the feature map in quantized integer format.

For example, $\text{weight}_{int}$ may be input to the second input of the first processing element PE1 of FIG. 4A. Here, $\text{weight}_{int}$ may be a parameter quantized to 8-bit. However, the present disclosure is not limited thereto, and $\text{weight}_{int}$ may have a bitwidth of 2 to 16 bit.

Additionally, the $\text{weight}_{int}$ of Equation 13 may be pre-calculated using Equation 3. If training of the weight parameters of the second neural network model is completed, $\text{weight}_{fp}$ and $s_w$ in Equation 3 become constants whose values do not change. Therefore, the compiler 300b-10 can pre-calculate the value of $\text{weight}_{int}$ and store it in the memory 200b as a constant. Further, the quantized $\text{weight}_{int}$ may be passed to the memory 200a of the edge device 1000. Thus, the edge device 1000 can process the computation of the third neural network model with weights in quantized integer format.

According to an example of the present disclosure, the bitwidth of the input parameters (e.g., input feature maps) and output parameters (e.g., output feature maps) of the convolution graph module of the graph module of the third neural network model may be different.

Referring to FIG. 4A, for example, the bitwidth X of the $\text{feature\_in}_{int}$ may be 8-bit, and the bitwidth X of the $\text{feature\_out}_{int}$ may be 24-bit. Note that values may accumulate in the convolution, and if $\text{feature\_out}_{int}$ is an 8-bit integer, an overflow may occur. Therefore, to prevent overflow, the bitwidth X bit of the output feature map may be set appropriately.

Furthermore, the magnitude of the accumulated value in the accumulator 113 may have a larger bitwidth (e.g., the bitwidth X in FIG. 4A) than the bitwidth of the input integer parameters (e.g., the bitwidth N and M in FIG. 4A), depending on the amount of computation of the convolution.

For example, a bitwidth of an input parameter (e.g., an input feature map) of a convolution graph module of a graph module of the third neural network model may be smaller than a bitwidth of an output parameter (e.g., an output feature map).

For example, a bitwidth of an output parameter (e.g., an output feature map) of a convolution graph module of the graph module of the third neural network model may be larger than a bitwidth of an input parameter (e.g., an input feature map).

Figure 13D:
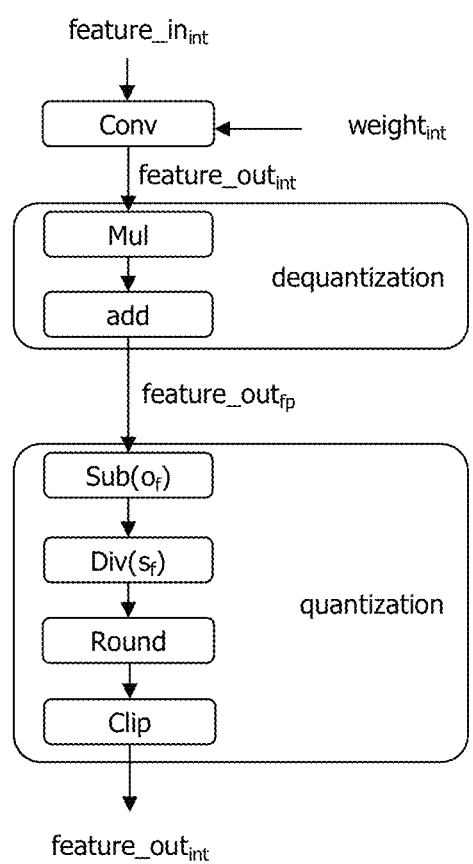
FIG. 13D is a conceptual diagram illustrating convolution, dequantization, and quantization operations in a third neural network model, according to an example of the present disclosure.

FIG. 13D and Equations 14 to 16 are examples of convolution, dequantization, and quantization of a third neural network model to illustrate an example of the present disclosure.

The dequantization and quantization after convolution of the third neural network model may be represented by FIG. 13D and Equations 2, 13, 14, 15 and 16. FIG. 13D shows a graph module corresponding to convolution Conv, graph modules corresponding to dequantization (Mul(dequant), Add(dequant)), and graph modules corresponding to quantization (Sub($o_f$), Div($s_f$), Round, Clip). Each graph module is parameterized with inputs. The parameters of the graph modules of FIG. 13D may refer to Equations 2, 13, 14, 15 and 16. The graph modules shown in FIG. 13D can form a directed acyclic graph (DAG).

After convolution of the third neural network model (the convolution may refer to Equation 13), the parameters quantized as integers may need to be converted to floating point, depending on the graph modules that may be included in the third neural network model.

Accordingly, FIG. 13D illustrates an example of convolution, dequantization, and quantization of a third neural network model.

A processing element (not shown) of the neural processing unit 100a of the edge device 1000 may be a circuit configured to process a convolution of the third neural network model. The processing element may be a circuit configured to receive an integer parameter as an input and output an integer parameter. The processing element may be an operator configured to perform a multiply and accumulate (MAC) operation. The convolution of FIG. 13D may be substantially the same as the convolution of FIG. 13C. For example, the plurality of processing elements (not shown) of the neural processing unit 100a may correspond to the plurality of processing elements 110 shown in FIGS. 3, 4A, and 5. The neural processing unit 100 shown in FIGS. 3, 4A, and 5 may correspond to the neural processing unit 100a included in the edge device 1000 of FIG. 6.

The SFU (not shown) of the neural processing unit 100a of the edge device 1000 may be configured to include circuitry configured to process dequantization and quantization of the third neural network model. For example, the SFU (not shown) of the neural processing unit 100a of the edge device 1000 may correspond to the SFU 150 shown in FIGS. 3, 4B, and 5. The neural processing unit 100 illustrated in FIGS. 3, 4B, and 5 may correspond to the neural processing unit 100a included in the edge device 1000 of FIG. 6.

Specifically, for example, the dequantization circuit of the SFU 150 may be a circuit designed to process the dequantization of Equations 15 and 16, and the quantization circuit of the SFU 150 may be a circuit designed to process the quantization of Equation 2. That is, the dequantization circuit takes integer parameters as input, converts them to floating-point parameters, and outputs them. The quantization circuit takes floating-point parameters as input, converts them to integer parameters, and outputs them.

That is, the convolution graph module Conv of the third neural network model shown in FIG. 13D may be set to be processed in a processing element of a neural processing unit according to an example of the present disclosure, the dequantization graph modules (Mul (dequant), Add (dequant)) of the third neural network model may be configured to be processed in the dequantization circuit of the neural processing unit according to one example of the present disclosure, and the quantization graph modules (Sub($o_f$), Div $s_f$), Round, Clip) of the third neural network model may be configured to be processed in the quantization circuit of the neural processing unit according to an example of the present disclosure.

Referring to Equations 14 to 16 below, convolution, dequantization, and quantization will be described.

For example, in the SFU 150 of FIG. 4B, the activation function circuit and the batch normalization circuit may be configured to receive a floating-point parameter.

$$\text{feature\_out}_{int} = \left\lfloor \frac{((\text{feature\_in}_{int} \otimes \text{weight}_{int}) \times \text{dequant}_{mul} + \text{dequant}_{add}) - o_f}{s_f} \right\rfloor = $$

$$\left\lfloor \frac{(\text{feature\_out}_{int} \times \text{dequant}_{mul} + \text{dequant}_{add}) - o_f}{s_f} \right\rfloor = $$

$$\left\lfloor \frac{\text{feature\_out}_{fp} - o_f}{s_f} \right\rfloor$$

Equation 14

The feature_out$_{int}$ in Equation 14 represents the output feature map of the dequantized and then quantized the integer parameter. In Equation 14, feature_in$_{int}$ represents the input feature map of the integer parameter, weight$_{int}$ represents the weight of the integer parameter, and $\otimes$ represents the convolution operation, which is substantially the same as in Equation 13. The dequant$_{mul}$ in Equation 14 is defined in Equation 15, and the dequant$_{add}$ in Equation 14 is defined in Equation 16. Equation 15 and Equation 16 can be used to perform dequantization, i.e., applying dequant$_{mul}$ and dequant$_{add}$ to Equation 14 can convert feature_out$_{int}$ output from the Conv graph module of FIG. 13D to feature_out$_{fp}$. The $s_f$ and $o_f$ in Equation 14 can be computed via Equation 1. The feature_out$_{int}$ output from the Conv graph module is then dequantized to a feature_out$_{fp}$ via dequant$_{mul}$ and dequant$_{add}$, and then the feature_out$_{fp}$ may be provided to a corresponding functional unit of the SFU 150 to process the necessary operations. After the computation is complete in the SFU 150, the output value may be quantized. Here, Equation 14 and FIG. 13D represent substantially the same operation. Thus, the feature_out$_{fp}$ may be provided to the SFU 150 to serve a particular functional unit that require floating-point arithmetic processing.

$$\text{dequant}_{mul} = s_f \times s_w$$

Equation 15

In Equation 15, dequant$_{mul}$ is a floating-point constant parameter, and $s_f$ and $s_w$ are floating-point constant parameters. Additionally, $s_f$ and $s_w$ may be calculated in the second conversion unit 300b-15 of the compiler 300b-10. Also, since $s_f$ and $s_w$ are constants, dequant$_{mul}$ can be calculated in advance. Thus, dequant$_{mul}$ can be a constant parameter of the pre-calculated third neural network model. Thus, dequant$_{mul}$ can be stored in the memory 200a of the edge device 1000, and the operation of Equation 15 may be omitted at the neural processing unit 100a. Thus, the operation of the neural processing unit 100a that processes the third neural network model can be accelerated, power consumption can be reduced, and the amount of memory 200a required for the operation of the Equation 15 can be reduced.

$$\text{dequant}_{add} = $$
$$o_f \otimes \text{clip} \left\{ \text{round}\left(\frac{\text{weight}_{fp}}{s_w}\right), Q_{min}, Q_{max} \right\} \times s_w = $$
$$o_f \otimes \left\lfloor \frac{\text{weight}_{fp}}{s_w} \right\rfloor \times s_w = o_f \otimes \text{weight}_{int} \times s_w$$

Equation 16

In Equation 16, dequant$_{add}$ is the floating-point constant parameter, and $o_f$ and $s_w$ are the floating-point constant parameters. Dequant$_{add}$ can be tensor data. Additionally, of, weight$_{int}$, and $s_w$ may be calculated in the second conversion unit 300b-15 of the compiler 300b-10. Also, since of, weight$_{int}$, and $s_w$ are constants, dequant$_{add}$ may be pre-calculated. Thus, dequant$_{add}$ can be a pre-calculated constant parameter of third neural network model. Accordingly, dequant$_{add}$ can be stored in the memory 200a of the edge device 1000, and the operation of Equation 16 can be omitted in the neural processing unit 100a. Thus, the operation of the neural processing unit 100a that processes the third neural network model can be accelerated, power consumption can be reduced, and the amount of memory 200a required for the operation of the Equation 16 can be reduced.

FIG. 13D illustrates how integer parameters and floating-point parameters of a third neural network model executable in the neural processing unit 100a operate in each of the corresponding circuits of the neural processing unit 100a.

Describing an example of the present disclosure in terms of integer parameters, integer parameters quantized to a specific bitwidth can be input to a plurality of processing elements of the neural processing unit to process a convolution or matrix multiplication. In particular, the convolution or matrix multiplication accounts for the largest portion of the total computation of the neural network model, and the convolution or matrix multiplication is relatively less sensitive to quantization errors than other operations of the neural network model. Thus, by providing a neural processing unit including processing elements configured to process the convolution or matrix multiplication with quantized integer parameters, and a neural network model compiled to accelerate and execute inference operations specialized for the neural processing unit, an edge device can be provided that achieves accelerated computation speed at low power.

Describing an example of the present disclosure in terms of floating-point parameters, a convolution or matrix multiplication result of integer parameters may be input to a SFU of a neural processing unit, and a corresponding circuit in the SFU may convert the integer parameters to floating-point parameters to process certain operations of the neural network model. In particular, certain operations of the neural network model are vulnerable to quantization errors of quantized integer parameters. Therefore, by providing an SFU configured to selectively convert and process quantized integer parameters output from the processing element into floating-point parameters for operations that are sensitive to quantization errors, and a neural network model compiled to accelerate and execute inference operations specialized for the neural processing unit, it is possible to provide an edge device that can achieve accelerated computation speed with low power while substantially suppressing deterioration of inference accuracy due to quantization errors.

The extraction unit 300b-18 may convert the third neural network model into a format compatible with the neural processing unit 100a within the edge device 1000. The format may be, for example, machine code, binary code, or a model in open neural network exchange (ONNX™) format. However, the extraction unit 300b-18 of the present disclosure are not limited to any particular format and may be configured to convert the third neural network model to any format compatible with the neural processing unit on which the third neural network model is executed.

Figure 14:
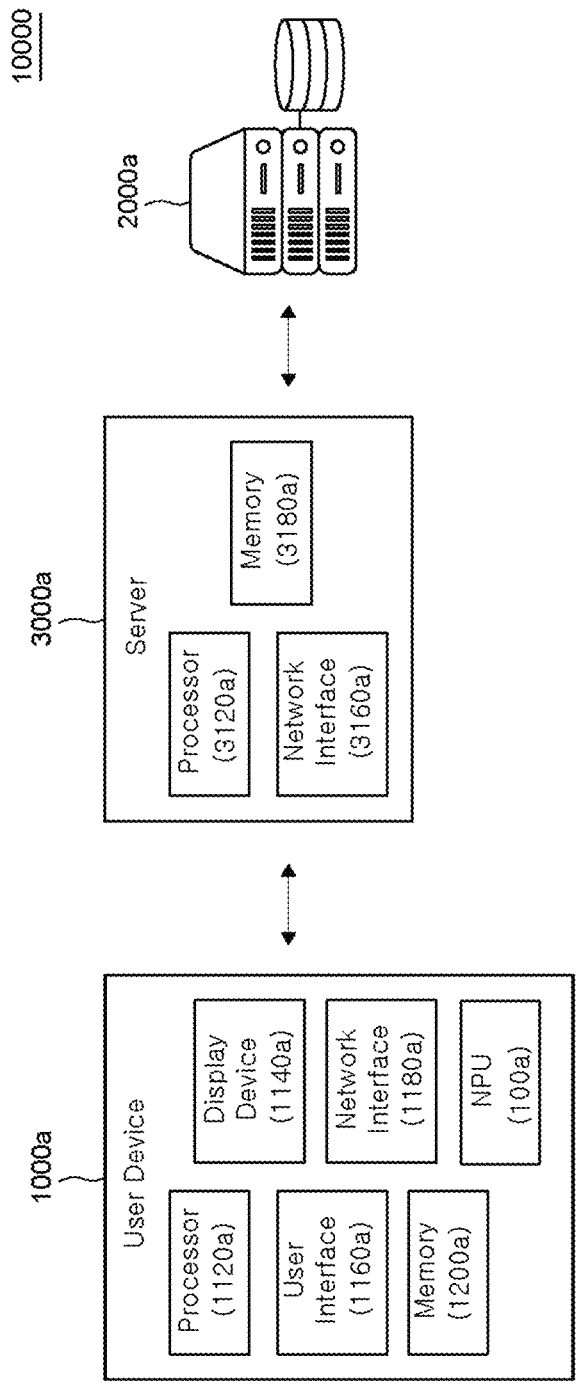
FIG. 14 is a block diagram illustrating a neural network model performance evaluation system, according to an example of the present disclosure.

FIG. 14 is a block diagram of an NN model performance evaluation system 10000, according to another example of the present disclosure.

The NN model performance evaluation system 10000 may include, among other components, a user device 1000a, an NN model processing device 2000a, and a server 3000a between the user device 1000a and the NN model processing device 2000a. The NN model performance evaluation system 10000 of FIG. 14 may process a particular NN model on the NN model processing device 2000a and provide processing performance evaluation results of the NN model processing device 2000a to a user via the user device 1000a.

The user device 1000a may be a device used by a user to obtain processing performance evaluation result information of an NN model processed on the NN model processing device 2000a. The user device 1000a may include a smartphone, tablet PC, PC, laptop, or the like that can be connected to the server 3000a and may provide a user interface for viewing information related to the NN model. The user device 1000a may access the server 3000a, for example, via a web service, an FTP server, a cloud server, or an application software executable on the user device 1000a. These are merely examples, and various other known communication technologies or technologies to be developed may be used instead to connect to the server 3000a. The user may utilize various communication technologies to transmit the NN model to the server 3000a. Specifically, the user may upload an NN model and a particular evaluation dataset to the server 3000a via the user device 1000a for evaluating the processing performance of a NPU that is a candidate for the user's purchase.

In addition, the user device 1000a may include the neural processing unit 100a, and an improved NN model may be provided by the NN model processing device 2000a for use in the user's neural processing unit 100a.

The evaluation dataset refers to an input for feeding to the NN model processing device 2000a for performing performance evaluation by the NN model processing device 2000a.

The user device 1000a may receive from the NN model processing device 2000a a performance evaluation result of the NN model processing device 2000a for the NN model, and may display the result. The user device 1000a may be any type of computing device that may perform one or more of the following: (i) uploading the NN model to be evaluated by the NN model performance evaluation system 10000 to the server 3000a, (ii) uploading an evaluation dataset for evaluating an NN model to the NN model performance evaluation system 10000, and (iii) uploading a training dataset for retraining the NN model to the NN model performance evaluation system 10000. In other words, the user device 1000a may function as a data transmitter for evaluating the performance of the NN model and/or a receiver for receiving and displaying the performance evaluation result of the NN model.

For this purpose, the user device 1000a may include, among other components, a processor 1120a, a display device 1140a, a user interface 1160a, a network interface 1180a and memory 1200a. The display device 1140a may present options for selecting one or more NPUs for instantiating the NN model, and also present options for compiling the NN model, as described below in detail. Memory 1200a may store software modules (e.g., web browser) executable by processor 1120a to access server 3000a, and also store NN model and performance evaluation data set for sending to the NN model processing device 2000a via the server 3000a. The user interface 1160a may include keyboard and mouse, and enables the user to provide user inputs associated with, among others, making selections on the one or more NPUs for instantiating the NN model and compilation options associated with compiling of the NN model. The network interface 3160a is a hardware component (e.g., network interface card) that enables the user device 1000a to communicate with the server 3000a via a network.

The NN model processing device 2000a may include NPU farm 2180a for instantiating NN models received the user device 1000a via the server 3000a. The NN model processing device 2000a may also compile the NN models for instantiation on one or more NPUs in the NPU farm 2180a, assess the performance of the instantiated NN models, and report the performance result to the user device 1000a via the server 3000a, as described below in detail with reference to FIG. 15.

The server 3000a is a computing device that communicates with the user device 1000a to manage access to the NN model processing device 2000a for testing and evaluating one or more NPUs in the NPU farm 2180a. The server 3000a may include, among other components, a processor 3120a, a network interface 3160a, and memory 3180a. The network interface 3160a enables the server 3000a to communicate with the user device 1000a and the NN model processing device 2000a via networks. Memory 3180a stores instructions executable by processor 3120a to perform one or more of the following operations: (i) manage accounts for a user, (ii) authenticate and permit the user to access the NN model processing device 2000a to evaluate the one or more NPUs, (iii) receive the NN model, evaluation datasets, the user's selection on NPUs to be evaluated, and the user's selection on compilation choices, (iv) encrypt and store data received from the user, (v) send the NN model and user's selection information to the NN model processing device 2000a via a network, and (vi) forward a performance report on the selected NPUs and recommendation on the NPUs to the user device 1000a via a network. The server 3000a may perform various other services such as providing a marketplace to purchase NPUs that were evaluated by the user.

To enhance the security of the data (e.g., the user-developed NN model, the training dataset, the evaluation dataset) received from the user, the server 3000a may enable users to securely login to their account, and perform data encryption, differential privacy, and data masking.

Data encryption protects the confidentiality of data by encrypting user data. Differential privacy uses statistical techniques to desensitize user data to remove personal information. Data masking protects user data by masking parts of it to hide sensitive information.

In addition, access control by the server 3000a limits which accounts can access user data, audit logging records on accounts that have accessed user data, and maintains logs of system and user data access to track who accessed the model and when, and to detect unusual activity. In addition, the uploading of training datasets and/or evaluation datasets may further involve signing a separate user data protection agreement to provide legal protection for the user's NN model, training dataset, and/or evaluation dataset.

Figure 15:
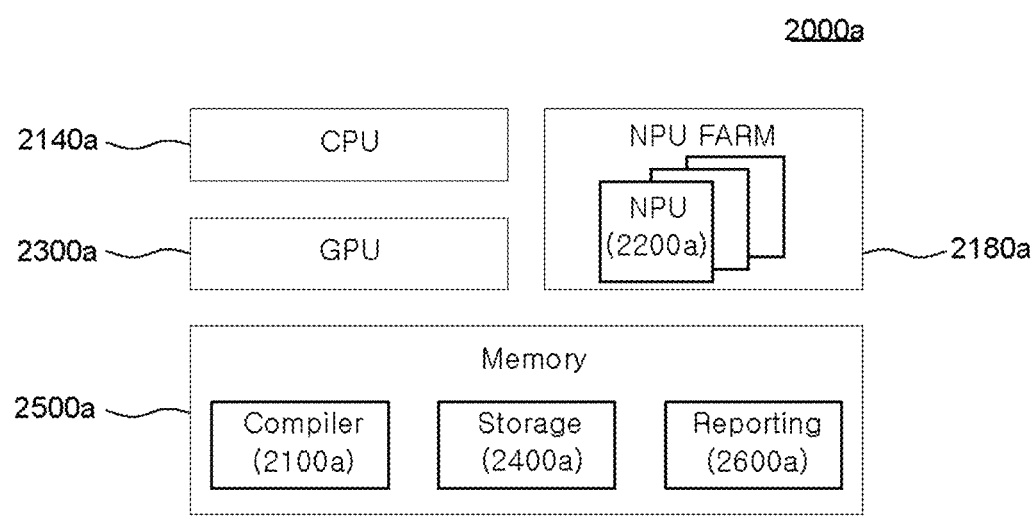
FIG. 15 is a conceptual block diagram illustrating a neural network model processing apparatus, according to an example of the present disclosure.

FIG. 15 is a block diagram of the NN model processing device 2000a, according to another example of the present disclosure.

The NN model processing device 2000a may include, among other components, a central processing unit (CPU) 2140a, an NPU farm 2180a (including a plurality of NPUs 2200a), a graphics processing unit (GPU) 2300a, and memory 2500a. These components may communicate with each other via one or more communication buses or signal lines (not shown).

The CPU 2140a may include one or more operating processors for executing instructions stored in memory 2500a. Memory 2500a may store various software modules including, but not limited to, compiler 2100a, storage device 2400a, and reporting program 2600a. Memory 2500a can include a volatile or non-volatile recording medium that can store various data, instructions, and information. For example, memory 2500a may include a storage medium of at least one of the following types: flash memory type, hard disk type, multimedia card micro type, card type memory (e.g., SD or XD memory), RAM, SRAM, ROM, EEPROM, PROM, network storage, cloud, and blockchain database.

The CPU 2140a or the GPU 2300a in the neural network model processing device 2000a may load and execute a compiler 2100a stored in memory 2500a. Here, the compiler 2100a may be a semiconductor circuit, or it may be software stored in the memory 2500b and executed by the CPU 2140b.

The compiler 2100a may translate a particular NN model into machine code or instructions that can be executed by a plurality of NPUs 2200a. In doing so, the compiler 2100a may take into account different configurations and characteristics of NPUs 2200a selected for instantiating and executing the NN model. Because each type of NPUs may have different number of processing elements (or cores), different internal memory size, and channel bandwidths, the compiler 2100a generates the machine code or instructions that are compatible with the one or more NPUs 2200a selected for instantiating and executing the NN model. For this purpose, the compiler 2100a may store configurations or capabilities of each type of NPUs available for evaluation and testing.

The compiler 2100a may perform compilation based on various compilation options as selected by the user. The compilation options may be provided as user interface (UI) elements on a screen of the user device 1000a, as described below in detail with reference to FIG. 17. The compiler 2100a may set the plurality of compilation options differently for each NPU selected for performance evaluation to generate compatible machine code or instructions. The plurality of compilation options may vary for different types of NPUs 2200a, so that even for the same NN model, the compiled machine code or instructions may vary for different types of NPUs 2200a of different configurations.

The storage device 2400a may store various data used by the NN model processing device 2000a. That is, the storage device 2400a may store NN models compiled into the form of machine code or instructions for configuring selected NPUs 2200a, one or more training datasets, one or more evaluation dataset, performance evaluation results and output data from the plurality of neural processing units 2200a.

The reporting program 2600a may determine whether the compiled NN model is operable by the plurality of NPUs 2200a. If the compiled NN model is inoperable by the plurality of NPUs 2200a, the reporting program 2600a may report that one or more layers of the NN model are inoperable by the selected NPUs 2200a, or that a particular operation associated with the NN model is inoperable. If the compiled NN model is executable by a particular NPU, the reporting program 2600a may report the processing performance of that particular NPU.

The performance may be indicated by performance parameters such as a temperature profile, power consumption (Watt), trillion operations per second per watt (TOPS/W), frames per second (FPS), inference per second (IPS), and inference accuracy. Temperature profile refers to the temperature change data of a NPU measured over time when the NPU is operating. Power consumption refers to power data measured when the NPU is operating. Because power consumption depends on the computational load of the user-developed NN model, the user's NN model may be provided and deployed for accurate power measurement. Trillion operations per second per watt (TOPS/W) is a metric that measures the efficiency of AI accelerator, meaning the number of operations that can be performed for one second per watt. TOPS/W is an indicator of the energy efficiency of the plurality of NPUs 2200a, as it represents how many operations the hardware can perform per unit of power consumed. Inference Per Second (IPS) is an indicator of the number of inference operations that the plurality of NPUs 2200a can perform in one second, thus indicating the computational processing speed of the plurality of NPUs 2200a. IPS may also be referred to as frame per second (FPS). Accuracy refers to the inference accuracy of the plurality of NPUs 2200a, as an indicator of the percentage of samples correctly inferenced out of the total. As further explained, the accuracy of the plurality of NPUs 2200a and the inference accuracy of the graphics processing unit 230 may differ. This is because the parameters of the NN model inferred by the graphics processing unit 230 may be in the form of floating-point, while the parameters of the NN model inferred by the plurality of NPUs 2200a may be in the form of integers. Further, various optimization algorithms may be optionally applied. Thus, the parameters of the NN models inferred by the plurality of NPUs 2200a may have differences in values calculated by various operations, and thus may have different inference accuracies from the NN models inferred by the graphics processing unit 230. The difference in inference accuracy may depend on the structure and parameter size characteristics of the NN model, and in particular, the shorter the length of the bitwidth of the quantized parameter, the greater the degradation in inference accuracy due to excessive quantization. For example, the quantized bitwidth can be from 2-bit to 16-bit. The degradation of inference accuracy due to excessive pruning also tends to be larger.

The reporting program 2600a may analyze the processing performance of the NN model compiled according to each of the compilation options, and recommend one of the plurality of compilation options. The reporting program 2600a may also recommend a certain type of NPU for instantiating the NN model based on the performance parameters of different NPUs. Different types or combinations of NPUs may be evaluated using the evaluation dataset to determine performance parameters associated with each type of NPU or combinations of NPUs. Based on the comparison of the performance parameters, the reporting program 2600a may recommend the type of NPU or combinations of NPUs suitable for instantiating the NN model.

Memory 2500a may also store software components not illustrated in FIG. 15. For example, memory 2500a may store instructions that combine outputs from multiple selected NPUs. When multiple NPUs are selected to generate their own outputs that are subsequently combined or processed to generate an output of a corresponding NN model, the combining or the processing of the outputs from the NPUs may be performed by the CPU 2140a. Alternatively, such operations may be performed by GPU 2300a or one of the selected NPUs.

The NPU farm 2180a may include various families of NPUs of different performance and price points sold by a particular company. The NPU farm 2180a may be accessible online via the server 3000a to perform performance evaluation of user-developed NN models. The NPU farm 2180a may be provided in the form of cloud NPUs. The plurality of NPUs 2200a may receive an evaluation dataset as an input and receive a compiled NN model for instantiation and performance evaluation. The plurality of NPUs 2200a may include various types of NPUs. In one or more embodiments, the NPUs 2200a may include different types of NPUs available from a manufacture.

More specifically, the plurality of NPUs 2200a may be categorized based on processing power. For example, a first NPU may be a NPU for a smart CCTV. The first NPU may have the characteristics of ultra-low power, low-level inference processing power (e.g., 5 TOPS of processing power), very small semiconductor package size, and very low price. Due to performance limitations, the first NPU may not support certain NN models that include certain operations and require high memory bandwidth. For example, the first NPU may have a model name "DX-V1" and may compute NN models such as ResNet, Mobilenet v1/v2, SSD, YOLOv5, YOLOv7, and the like.

On the other hand, the second NPU may be a NPU for image recognition, object detection, and object tracking of a robot. The second NPU may have the characteristics of low power, moderate inference processing power (e.g., 16 TOPS of processing power), small semiconductor package size, and low price. The second NPU may not support certain NN models that require high memory bandwidth. For example, the second NPU may have a model name "DX-V2" and may compute NN models such as ResNet, Mobilenet v1/v2, SSD, YOLOv5, YOLOv7, and the like.

The third NPU may be a NPU for image recognition, object detection, object tracking, and generative AI services for autonomous vehicles. The third NPU may have low power, high level inference processing power (e.g., 25 TOPS of processing power), medium semiconductor package size, and medium price. For example, the third NPU may have a model name "DX-M1" that may compute NN models such as ResNet, MobileNet v1/v2/v3, SSD, EfficientNet, EfficientDet, YOLOv5, YOLOv7, YOLOv8, DeepLabv3, PIDNet, ViT, Generative adversarial network, Stable diffusion, and the like. The fourth NPU may be a NPU for CCTV control rooms, control centers, large language models, and generative AI services.

The fourth NPU may have low power, high level inference processing power (e.g., 400 TOPS of processing power), large semiconductor package size, and high price characteristics. For example, the fourth NPU may have a model name "DX-H1", and may compute NN models such as ResNet, Mobilenet v1/v2, SSD, YOLOv5, YOLOv7, YOLOv8, DeepLabv3, PIDNet, VIT, Generative adversarial network, Stable diffusion, and large LLM. In other words, each NPU can have different computational processing power, different semiconductor chip die sizes, different power consumption characteristics, and the like. However, the types of the plurality of NPUs 2200a are not limited thereto and may be categorized by various classification criteria.

The GPU 2300a is hardware that performs complex computational tasks in parallel. The GPUs are widely used in graphics and image processing but have expanded their uses to processing various machine learning operations. Although GPU 2300a is illustrated as a single device, it may be embodied as a plurality of graphics processing units connected by a cloud GPU, NVLink, NVSwitch, or the like. The graphics processing unit 230 may include a plurality of cores that process multiple tasks in parallel. Thus, the graphics processing unit 230 can perform large-scale data processing tasks such as scientific computation and deep learning.

Specifically, the GPU 2300a may be used to train deep learning and machine learning models on large datasets. Deep learning models have a large number of parameters, making training time-consuming. The GPU 2300a can perform operations in parallel to generate or update the parameters, and thereby speed up training. When a user selects a particular NPU from the plurality of NPUs 2200a and performs retraining of the NN model through various compilation options, the GPU 2300a may be used to retrain of the NN model according to each compilation option. Furthermore, when a layer of the NN model is not compatible for instantiating on an NPU, the GPU 2300a may be used instead to instantiate (off-loading) the layer and perform processing of the instantiated layer.

In one or more embodiments, a plurality of NPUs 2200a and one or more GPUs 2300a may be implemented in the form of an integrated chip (IC), such as a system on chip (SoC) that incorporates various computing devices, or a printed circuit board on which the integrated chip is mounted.

Figure 16:
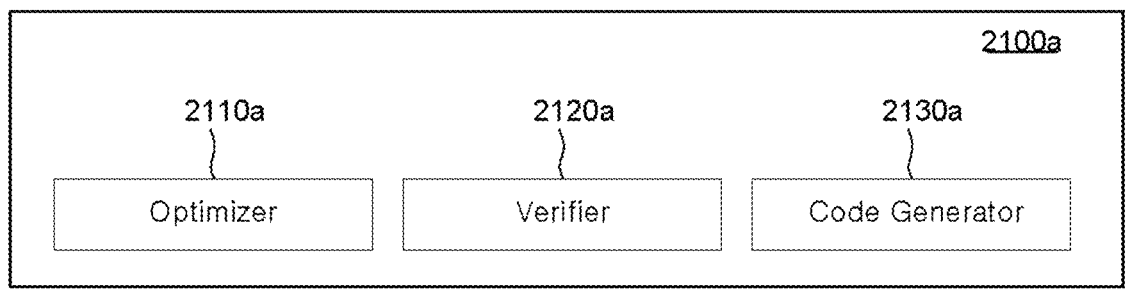
FIG. 16 is a conceptual block diagram illustrating a compiler of a neural network model processing apparatus, according to an example of the present disclosure.

FIG. 16 is a block diagram illustrating the compiler 2100a of the NN model processing device 2000a, according to another example of the present disclosure.

The compiler 2100a may compile an NN model into machine code or instructions based on a plurality of compilation options. The compiler 2100a may be provided with hardware data of a NPU selected from the plurality of NPUs 2200a. The hardware data of the NPU may include the size of the NPU internal memory, a hierarchical structure of the NPU internal memory, information about the number of processing elements (or cores), information about special function units, and the like. The compiler 2100a may determine a processing order for each layer based on the hardware data of the NPU and the graph information of the NN model to be compiled. The machine code or the instructions may be fed to one or more selected NPUs 2200a to configure them to instantiate the NN model. The compiler 2100a may include, among other components, an optimization module 2110a, a verification module 2120a, and a code generator module 2130a.

The optimization module 2110a may perform the task of modifying the NN model represented by a directed acyclic graph (DAG) to increase one or more of efficiency, accuracy and speed. The user may select at least one of various improvement options provided by the optimization module 2110a online via the user device 1000a. For example, the optimization module 2110a may provide an option to convert to parameters of a particular bitwidth to parameters of another bitwidth. The specific bitwidth may be between 2-bit and 16-bit. For example, the optimization module 2110*a* may convert the NN model based on floating-point parameters to an NN model based on integer parameters when the one or more selected NPUs 2200*a* are designed to process integer parameters. The optimization module 2110*a* may also convert an NN model based on nonlinear trigonometric operations to an NN model based on piecewise linear function approximation when the one or more selected NPUs 2200*a* are designed to process the piecewise linear function approximation operations. The optimization module 2110*a* may also apply various optimization algorithms to reduce the size of parameters such as weights, feature maps, and the like of the NN model. For example, the optimization module 2110*a* can improve the accuracy degradation problem of an optimized neural network model by using various retraining algorithms.

The verification module 2120*a* may perform validation to determine whether the user's NN model is operable on the one or more selected NPUs 2200*a*. The verification module 2120*a* determines whether the NN model is executable by analyzing the structure of the modified NN model and determining whether the operations at each layer are supported by the hardware of the one or more selected NPUs 2200*a*. If the operations are not executable, a separate error report file can be generated and reported to the user.

The code generator module 2130*a* may generate machine code or instructions for instantiating and executing the NN model, as modified by the optimization module 2110*a*, on each of the selected NPUs 2200*a*. In one embodiment, such generation of machine code or instructions may be performed only on the NN models determined to be operable on the one or more selected NPUs 2200*a* by the verification module 2120*a*. The generated machine code can be provided to program one or more selected NPUs 2200*a* to instantiate the modified NN model. For example, first through fourth machine code or instruction set corresponding to the modified NN model may be generated and fed to the first through fourth NPUs, respectively.

Figure 17:
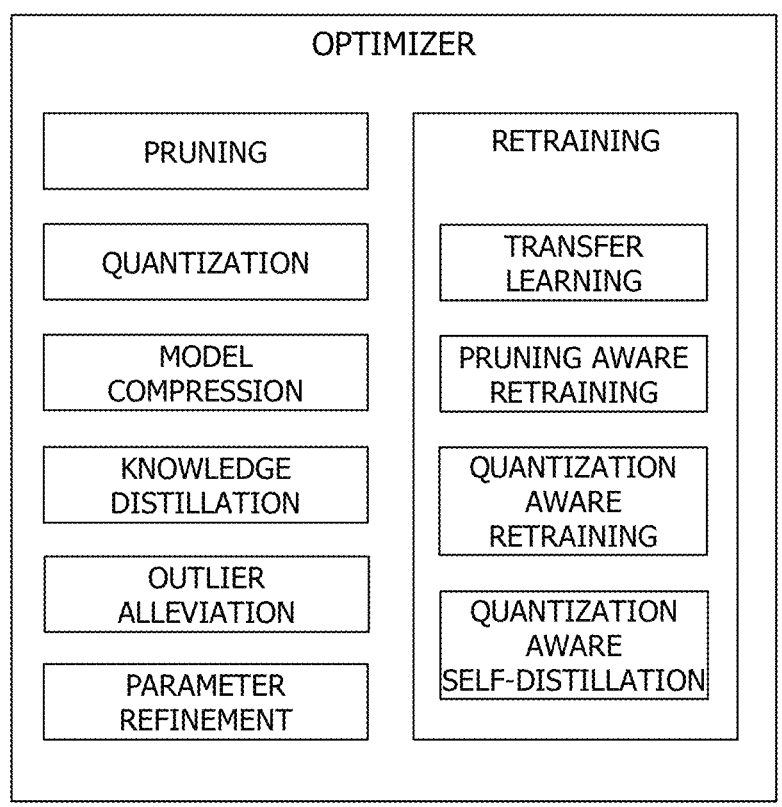
FIG. 17 is a conceptual block diagram illustrating an optimization module of a neural network model processing apparatus, according to an example of the present disclosure.

FIG. 17 is a block diagram illustrating the optimization module, according to another example of the present disclosure.

The optimization module 2110*a* can modify the NN model based on a plurality of compilation options to enhance the NN model in terms of at least one of the efficiency, speed and accuracy. The compilation options may be set based on hardware information of the NPU 2200*a* being used to instantiate the NN model. In addition or alternatively, the optimization module 2110*a* may automatically set the plurality of compilation options taking into account characteristics or parameters of the NN model (e.g., size of weights and size of feature maps) and characteristics of inference accuracy degradation. The plurality of compilation options set using the optimization module 2110*a* may be at least one of 1) a quantization option, 2) a pruning option, 3) an outlier alleviation option, 4) a parameter refinement option, 5) a layer-wise training option, 6) a model compression option, 7) a knowledge distillation option, and 8) a retaining option.

1) Activation of the quantization option may provide a technique for reducing the size of the parameters of the NN model. The quantization algorithm may selectively reduce the number of bits in the weights and the feature maps of each layer of the NN model. When the quantization option reduces the number of bits in a particular feature map and particular weights, it can reduce the overall parameter size of the machine code of the NN model. For example, a 32-bit parameter of a floating-point can be converted to a parameter of 2-bit through 16-bit integer when the quantization option is active. A second conversion unit 300*b*-15 included in the compiler 300*b*-10 of the neural network model optimization unit 1500 according to one example of the present disclosure may perform the quantization option.

2) Activation of the pruning option may provide techniques for reducing the computation of an NN model. The pruning algorithm may replace small, near-zero values with zeros in the weights of all layers of the NN model, and thereby sparsify the weights. The plurality of NPUs 2200*a* can skip multiplication operations associated with zero weights to speed up the computation of convolutions, reduce power consumption, and reduce the parameter size in the machine code of the NN model with the pruning option. Zeroing out a particular weight parameter by pruning is equivalent to disconnecting neurons corresponding to that weight data in a neural network. The pruning options may include a value-based first pruning option that removes smaller weights or a percentage-based second pruning option that removes a certain percentage of the smallest weights. The pruning unit 300*b*-16*d* included in compiler 300*b*-10 of neural network model optimization unit 1500 according to one example of the present disclosure may perform the pruning option.

3) Activation of the outlier alleviation option applies a technique that can be performed in conjunction with the quantization option. The input values and/or weights of a neural network model may contain outliers according to the actual data, which can cause quantization errors to be amplified during the quantization process. For effective quantization, it is necessary to properly compensate for outliers. According to an outlier mitigation option, an adjustment value for outlier adjustment may be used to adjust the outliers contained in the input parameters and the weight parameters before the MAC operation. The outlier alleviation unit 300*b*-16*a* included in compiler 300*b*-10 of neural network model optimization unit 1500 according to one example of the present disclosure may perform the outlier alleviation option.

4) Activation of the parameter refinement option applies a technique that can be performed in conjunction with the quantization option. In order to reduce the error that may occur according to quantization, and to reduce the memory bandwidth caused by quantization while maintaining the accuracy of the neural network model, optimization can be performed on the parameters required for the quantization process. According to the parameter refinement option, updated values can be calculated for each of the scale value and offset value for quantization of the floating-point parameters of the neural network model. The parameter refinement unit 300*b*-16*b* included in compiler 300*b*-10 of neural network model optimization unit 1500 according to one example of the present disclosure may perform the parameter refinement option.

5) Activation of the layer-wise training option applies a technique that allows the neural network model to learn weight parameters layer by layer to minimize quantization loss. For each of the plurality of layers included in the neural network model that has performed the quantization simulation, the weight parameters of each layer of the neural network model that has performed the quantization can be learned and optimized such that the loss is reduced based on the output value of the neural network model that has not performed the quantization. In one example, according to the layer-wise training option, instead of a rounding operation included in the function that quantizes the neural network model, the neural network model may be trained to perform a flooring or ceiling operation for each element of the weight parameter such that the difference between the output value of the neural network model without quantization and the output value of the neural network model with quantization is minimal, and then perform the flooring or ceiling operation. In one example, according to the layer-wise training option, the scale value that quantizes the neural network model can be improved by training each element of the weight parameter such that the difference between the output value of the neural network model without quantization and the output value of the neural network model with quantization is minimal. The layer-wise training unit 300b-16c included in compiler 300b-10 of neural network model optimization unit 1500 according to one example of the present disclosure may perform the layer-wise training option.

6) Activation of the model compression option applies techniques for compressing the weight parameters, feature map parameters, and the like of an NN model. The model compression technique can be implemented by utilizing known compression techniques in the art. This can reduce the parameter size of the machine code of an NN model with the model compression option. The model compression option may be provided to a NPU including a decompression decoder.

7) Activation of the knowledge distillation option applies a technique for transferring knowledge gained from a complex model (also known as a teacher model) to a smaller, simpler model (also known as a student model). In a knowledge distillation algorithm, the teacher model typically has larger parameter sizes and higher accuracy than the student model. For example, in the retraining option described later, the accuracy of the student model can be improved with a knowledge distillation option in which an NN model trained with floating-point 32-bit parameters may be set as the teacher model and an NN model with various improvement options may be set as the student training model. The student model may be a model with at least one of the following options selected: pruning option, quantization option, model compression option, and retraining option.

8) Activation of the retraining option applies a technique that can compensate for degraded inference accuracy when applying various improvement options. For example, when applying a quantization option, a pruning option, or a model compression option, the accuracy of an NN model inferred by the plurality of NPUs 2200a may decrease. In such cases, an option may be provided to retrain the pruned, quantized, and/or model-compressed neural network model online to recover the accuracy of the inference. The optimization unit 300b-16 included in compiler 300b-10 of neural network model optimization unit 1500 according to one example of the present disclosure may perform the retraining option.

Specifically, the retraining option may include 8-1) a transfer learning option, 8-2) a pruning-aware retraining option, 8-3) a quantization-aware retraining option, 8-4) a quantization aware self-distillation option, and the like.

8-1) Activation of the transfer learning option allows an NN model to learn by transferring knowledge from one task to another related task. Transfer learning algorithms are effective when there is not enough data to begin with, or when training a neural network model from scratch that requires a lot of computational resources.

8-2) Activation of the pruning-aware retraining (PAT) option identifies and removes less important weights from the trained neural network model and then fine-tunes the active weights. Pruning criteria can include weight value, activation values, and sensitivity analysis. The pruning-aware retraining option may reduce the size of the neural network model, increase inference speed, and compensate overfitting problem during retraining.

8-3) Activation of the quantization-aware retraining (QAT) option incorporates quantization into the retraining phase of the neural network model, where the model fine-tunes the weights to reflect quantization errors. The quantization-aware retraining algorithm can include the loss function, gradient calculation, and improvement algorithm modifications. The quantization-aware retraining option can compensate for quantization errors by quantizing the trained neural network model and then performing fine-tuning to retrain it in a way that minimizes the loss due to quantization.

8-4) Activation of the quantization aware self-distillation option is intended to perform QAT while avoiding underfitting problems during retraining, such that when minimizing the loss between the inference values resulting from running the model and the labeled values of the training data, the retraining can also take into account the loss between the inference values and the results of running a simulated quantization model on the same parameters. In one example, according to the quantization-aware self-distillation option, when the difference between the inference value of the pre-trained model using the parameter represented by the 32-bit floating point and the actual result value is the first loss, and the difference between the inference value of the quantization simulation model and the inference value of the pre-trained model for the same parameter is the second loss, the pre-trained model may update the parameters so that the first loss is reduced while retraining. The parameters may be updated such that the second loss is reduced while the quantization simulation model is retrained.

In order to alleviate the problem that when QAT is applied to a pre-trained model that has already been trained using data augmentation, the regularization may become excessive and leads to over-generalization, quantization-aware self-distillation can be performed. According to quantization-aware self-distillation, the difference between the inference value of the quantization simulation using the same parameters and the inference value of the pre-trained model can be reflected to minimize the accuracy drop caused by excessive regularization.

Without limitation, the optimization module 2110a can apply an artificial intelligence-based improvement to the NN model. An artificial intelligence-based improvement algorithm may be a method of generating a reduced size of the NN model by applying various algorithms from the compilation options. This may include exploring the structure of the NN model using an AI-based reinforcement learning method or a method that is not based on a reduction method such as a quantization algorithm, a pruning algorithm, a retraining algorithm, a model compression algorithm, and a model compression algorithm, but rather a method in which an artificial intelligence integrated in the optimization module 2110a performs a reduction process by itself to obtain an improved reduction result.

Figure 18A:
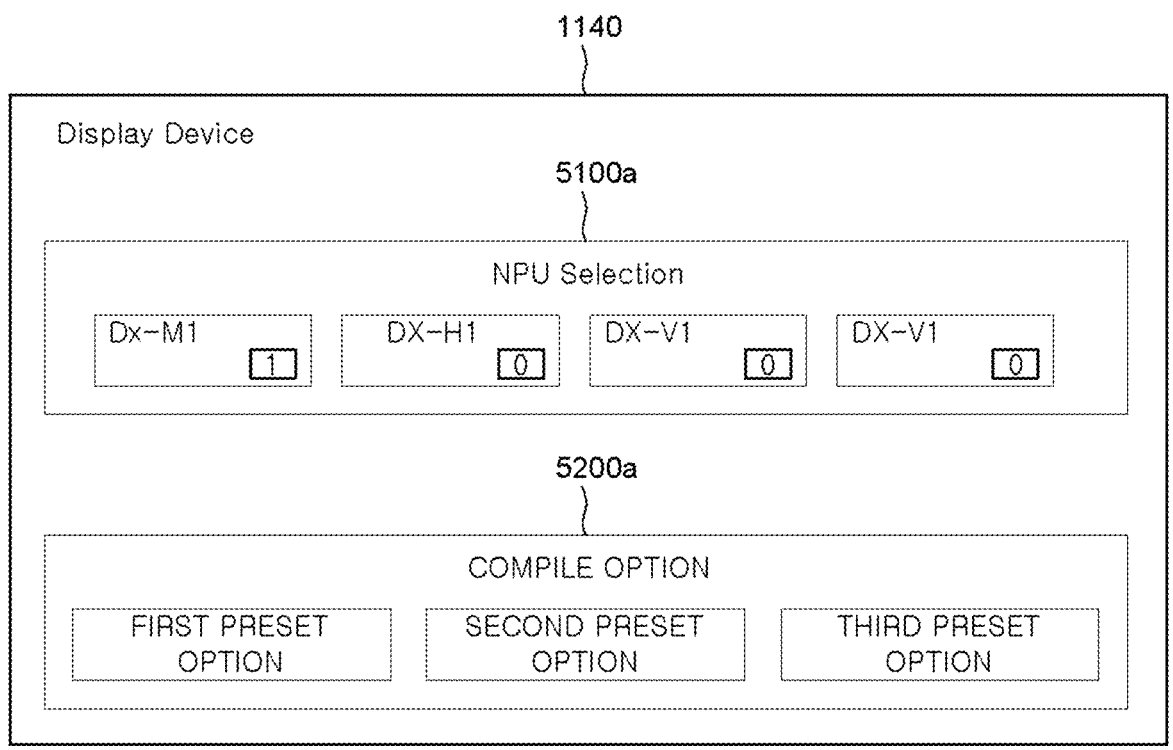
FIG. 18A is a user interface diagram for selecting one or more neural processors and selecting a compilation option, according to an example of the present disclosure.

FIG. 18A is a user interface diagram for selecting one or more neural processors and selecting a compilation option, according to another example of the present disclosure.

The user interface may be presented on display device 1140a of the user device 1000a after the user accesses the server 3000a using the user device 1000a.

The user interface diagram displays two sections, a NPU selection section 5100a and a compile option section 5200a. The user may select one or more NPUs in the NPU selection section 5100a to run simulation on the NN model using one or more evaluation datasets. In the example, four types of NPUs are displayed for selection, DX-M1, DX-H1, DX-V1 and DX-V2. The user may identify the number of NPUs to be used in the online-simulation for evaluation the performance. In the example of FIG. 18A, one DX-M1 is selected for testing and evaluation. By providing non-zero numbers for multiple types of the NPUs in the NPU selection section 5100a, a combination of different types of NPUs may be used in the online-simulation and evaluation.

The compile option section 5200a displays preset options to facilitate the user's selection of the compile choices. In the example of FIG. 18A, the compile option section 5200a displays a first preset option, a second preset option, and a third preset option. In one embodiment, each of the preset options may be the most effective quantization preset option from a particular perspective. A user may select at least one preset option by considering the features of each preset option.

For example, the first preset option is an option that only performs a quantization algorithm to convert 32-bit floating-point data of a trained NN model to 8-bit integer data. In other examples, the converted bit data may be determined by the hardware configuration of the selected NPU. The first preset option may be referred to as post training quantization (PTQ) option or quantization option as since the quantization algorithm is executed after training of the NN model. The first preset option can utilize Equations 1 to 3. The first preset option has the advantage of performing quantization quickly, typically completing within a few minutes. Therefore, it is advantageous to quickly check the results of the power consumption, computational processing speed, and the like of the NN model provided by the user on the NPU selected by the user. A first preset option including a first quantization option may be provided to a user as an option called "DXNN Lite." The retraining of the NN model may be omitted in the first preset option.

The second preset option may perform a quantization algorithm that converts 32-bit floating-point data of the NN model to 8-bit integer data, and then performs an algorithm for layer wise retraining of the NN model. As in the first preset option, the converted bit data may depend on the hardware configuration of the selected NPU. Selecting the second preset option may cause performing of a layer-by-layer retraining algorithm using the NN model that performed the first preset option as an input model. Thus, the second preset option may be a combination of the quantization algorithm and an algorithm from one of the various retraining options provided by the optimization module 2110a. In the second preset option, data corresponding to a portion of layers in the NN model is quantized and its quantization loss function is calculated. Then, the data corresponding to another portion of the plurality of layers of the NN model is quantized, and its quantization loss function is calculated. Such operations are repeated to enhance the quantization by reducing the quantization loss of some layers. The second preset option has the advantage that retraining can be performed in a manner that reduces the difference between the floating-point data (e.g., floating-point 32) and the integer data (e.g., integer 8) in the feature map for each layer, and hence, retraining can be performed even if there is no training dataset. The second preset option has the advantage that quantization can be performed in a reasonable amount of time, and typically completes within a few hours. The accuracy of the user-provided NN model on the user-selected NPU of the plurality of NPUs 2200a tend to be better than the one obtained using the first preset option. The second preset option comprising a second quantization option may be provided to a user under the service name "DXNN pro." The second quantization option may involve a retraining step of the NN model because it performs a layer-by-layer retraining of the NN model.

The third preset option performs a quantization algorithm to convert 32-bit data representing a floating-point of the NN model to 8-bit data representing an integer, and then perform a quantization-aware training (QAT) algorithm. In other words, the third preset option may further perform a quantization-aware retraining algorithm using the NN model that performed the first preset option as an input model. Thus, the third preset option may be a combination of the quantization algorithm and an algorithm from one of the various retraining options provided by the optimization module 2110a. In the third preset option, the quantization-aware retraining algorithm performs fine-tuning by quantizing the trained NN model and then retraining it in a way that reduces the degradation of inference accuracy due to quantization. However, in order to retrain in a way that reduces the degradation of inference accuracy due to quantization, the user may provide the training dataset of the neural network model.

Furthermore, an evaluation dataset may be used to suppress overfitting during retraining. Specifically, the quantization-aware retraining algorithm inputs the machine code and the training dataset of the quantized NN model into a corresponding NPU to retrain it and compensate for the degradation of inference accuracy due to quantization errors.

The third preset option has the advantage of ensuring relatively higher inference accuracy than the first and second preset options, but typically takes a few days to complete and is suitable when the accuracy has a higher priority. The third preset option comprising a third quantization option may be provided to users under the service name "DXNN master." The third quantization option may involve a retraining step of the NN model because the retraining algorithm is performed based on the inference accuracy of the NN model. For the quantization-aware retraining algorithm of the third quantization option, a training dataset and/or an evaluation dataset of the NN model may be received from the user in the process of retraining in a direction that reduces the loss due to quantization. The training dataset is the used for quantization-aware retraining. The evaluation dataset is optional data that can be used to improve the overfitting problem during retraining.

Figure 18B:
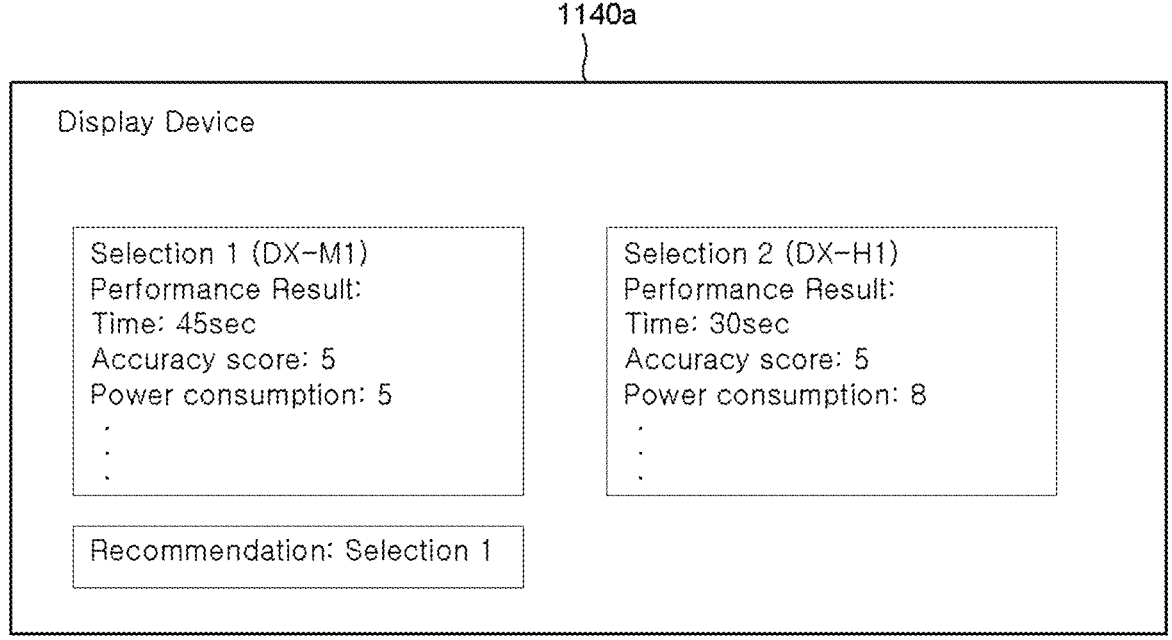
FIG. 18B is a user interface diagram for displaying a performance report and recommendation on the one or more neural processing units, according to another example of the present disclosure.

FIG. 18B is a user interface diagram for displaying a performance report and recommendation on selection of the one or more neural processing units, according to another example of the present disclosure.

In the example of FIG. 18B, the results of performing the simulation/evaluation using two different types of NPUs are displayed. The upper left box shows the result of using DX-M1 NPU whereas the upper fight box shows the result of using DX-H1 NPU. The bottom box shows the recommended selection of NPU based on the performance parameters of the two different NPUs.

FIGS. 19A through 19D are block diagrams illustrating configurations of various NPUs in NPU farm 2180a, according to another example of the present disclosure.

Figure 19A:
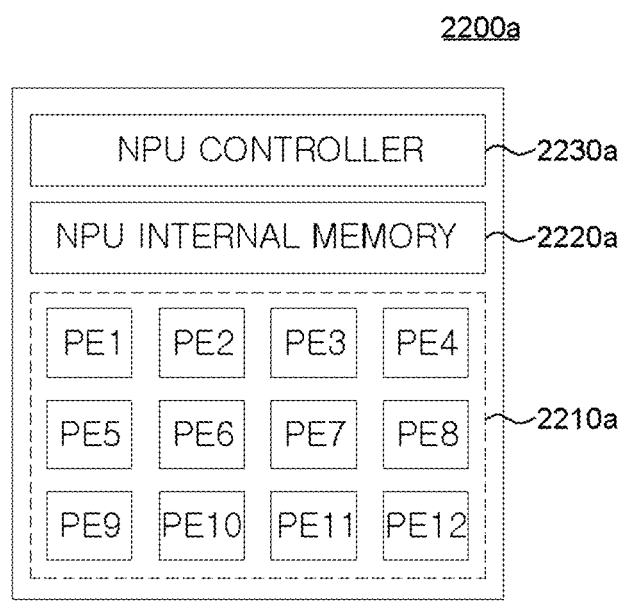
FIGS. 19A through 19D are block diagrams illustrating various configurations of neural processing units of a neural network model processing apparatus, according to another example of the present disclosure.
Figure 19B:
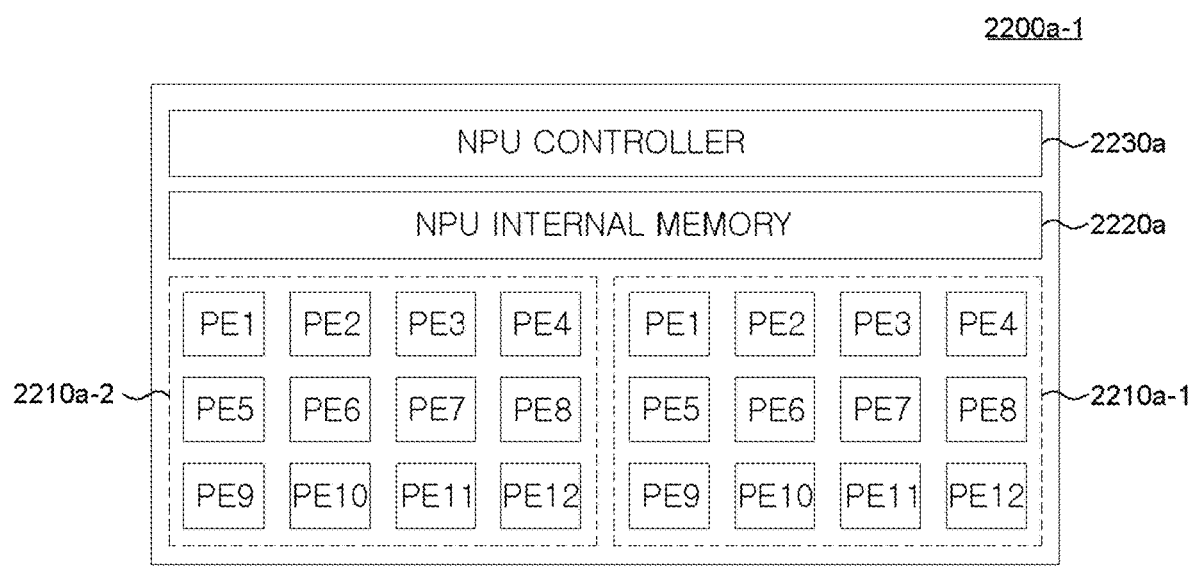
Figure 19C:
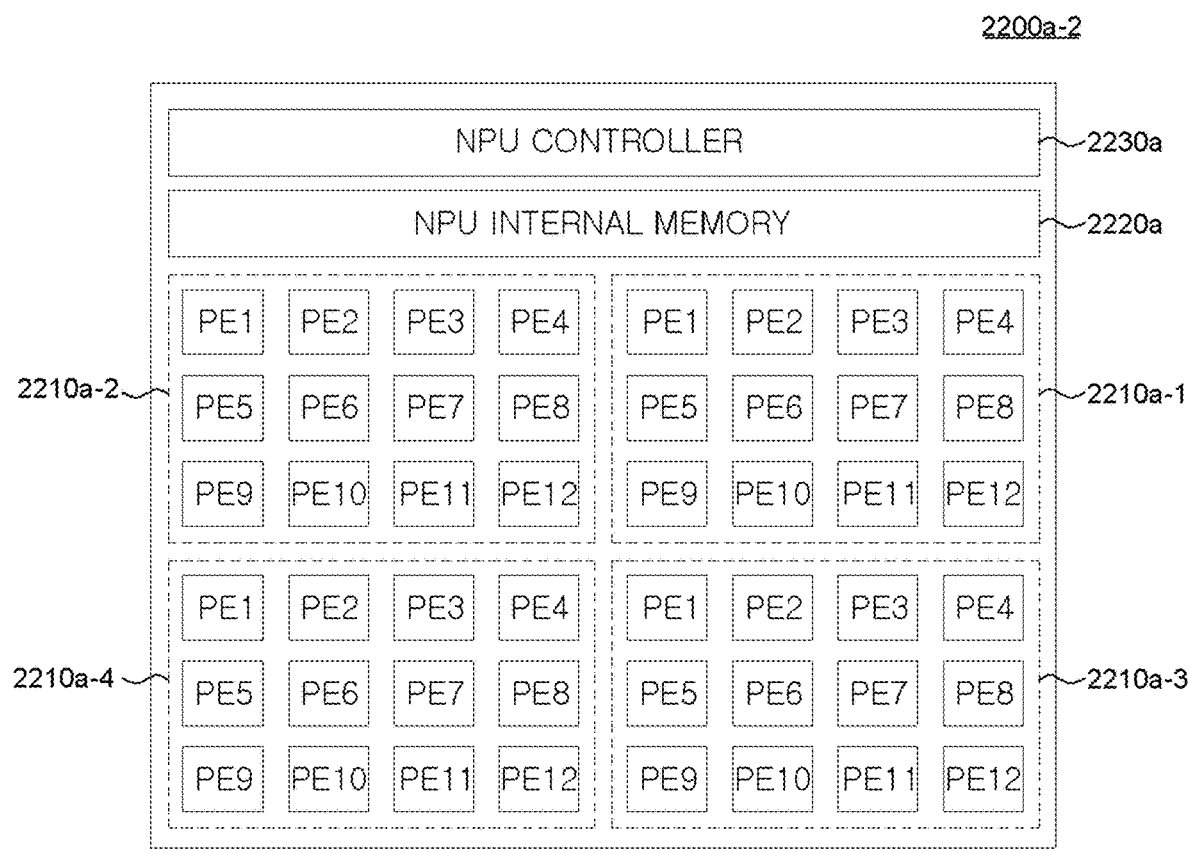
Figure 19D:
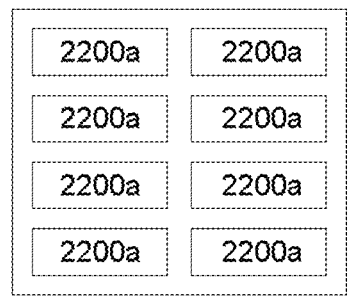

Specifically, FIG. 19A illustrates an internal configuration of a first NPU 2200a, FIG. 19B illustrates an internal configuration of a second NPU 2200a-1, FIG. 19C illustrates an internal configuration of a third NPU 2200a-2, and, FIG. 19D illustrates an internal configuration of a fourth NPU 2200a-3 including a plurality of the first NPUs.

The first NPU 2200a of FIG. 19A may include a processing element array 2210a (also referred to as "processor core array 2210a"), an NPU internal memory 2220a, and an NPU controller 2230a. The first NPU 2200a may include the processing element array 2210a, an NPU internal memory 2220a, and an NPU controller 2230a that controls the processing element array 2210a and the NPU internal memory 2220a.

The NPU internal memory 2220a may store, among other information, parameters for instantiating part of an NN model or an entire NN model on the processing element array 2210a, intermediate outputs generated by each of the processing elements, and at least a subset of data of the NN model. The NN model with various improvement options applied may be compiled into machine code or instructions for execution by various components of the first NPU 2200a in a coordinated manner.

The NPU controller 2230a controls operations of the processing element array 2210a for inference operations of the first NPU 2200a as well as read and write sequences of the NPU internal memory 2220a. The NPU controller 2230a may also configure the processing elements and the NPU internal memory according to programmed modes if these components support multiple modes. The NPU controller 2230a also allocates tasks processing elements in the processing element array 2210a, instructs the processing elements to read data from the NPU internal memory 2220a or write data to the NPU internal memory, and also coordinates receiving data from storage device 2400a or writing data to the storage device 2400a according to the machine code or instructions generated as the result of compilation. Thus, the NPU can sequentially process operations for each layer according to the structure of the NN model. The NPU controller 2230a may obtain a memory address where the feature map and weights of the NN model are stored or determine a memory address to be stored.

Processing element array 2210a may include plurality of processing elements (or cores) PE1 to PE12 arranged in the form of an array. Each processing element may include multiply and accumulate (MAC) circuits and/or an arithmetic logic unit (ALU) circuits. However, other circuits may be included in addition or in lieu of MAC circuits and ALU circuits in the processing element. For example, a processing element may have a plurality of circuits implemented as multiplier circuits and/or adder tree circuits operating in parallel, replacing the MAC circuits within a single processing element. In such cases, the processing element array 2210a may be referred to as at least one processing element comprising a plurality of circuits.

The processing element array 2210a may include a plurality of processing elements PE1 to PE12. The plurality of processing elements PE1 to PE12 shown in FIG. 19A are for the purpose of illustration, and the number of the plurality of processing elements PE1 to PE12 is not limited to the example in FIG. 19A. The number of the plurality of processing elements PE1 to PE12 may determine the size or number of processing elements array 2210a. The processing element array 2210a may be in the form of an N×M matrix, where N and M are integers greater than zero.

The arrangement and the number of the processing element array 2210a can be designed to take into account the characteristics of the NN model. In particular, the number of processing elements may be determined by considering the data size of the NN model to be operated, the required inference speed, the required power consumption, and the like. The data size of the NN model may correspond to the number of layers of the NN model and the weight parameter size of each layer. As the number of processing elements in the processing element array 2210a increases, the parallel computational capability of the operating NN model also increases, but the manufacturing cost and physical size may increase as well. For example, as shown in FIG. 19B, the second NPU 2200a-1 may include two processing element arrays 2210a-1 and 2210a-2. Two processing element arrays 2210a-1 and 2210a-2 may be grouped and each array may include a plurality of processing elements PE1 to PE12.

In another example, as shown in FIG. 19C, the third NPU 2200a-2 may include four processing element arrays 2210a-1, 2210a-2, 2210a-3, and 2210a-4. Four processing element arrays 2210a-1, 2210a-2, 2210a-3, and 2210a-4 may be grouped and each array may include a plurality of processing elements PE1 to PE12.

In another example, as shown in FIG. 19D, the fourth NPU 2200a-3 may include eight smaller first NPUs 2200a as shown in FIG. 19A. Each of the eight first NPUs 2200a is assigned to process part of the operations of the NN model to further improve the speed of the NN model. Further, some of the first NPUs 2200a may be inactivated during operations to save the power consumption of the fourth NPU 2200a-3. For these purposes, the fourth NPU 2200a-3 may further include a higher level NPU controller (not shown) in addition to NPU controllers 223 in each of the first NPUs 2200a to allocate the operations of the each of eight neural processing units and coordinate their operations.

Characteristics and processing models of the first to fourth neural processing units are described above.

Figure 20:
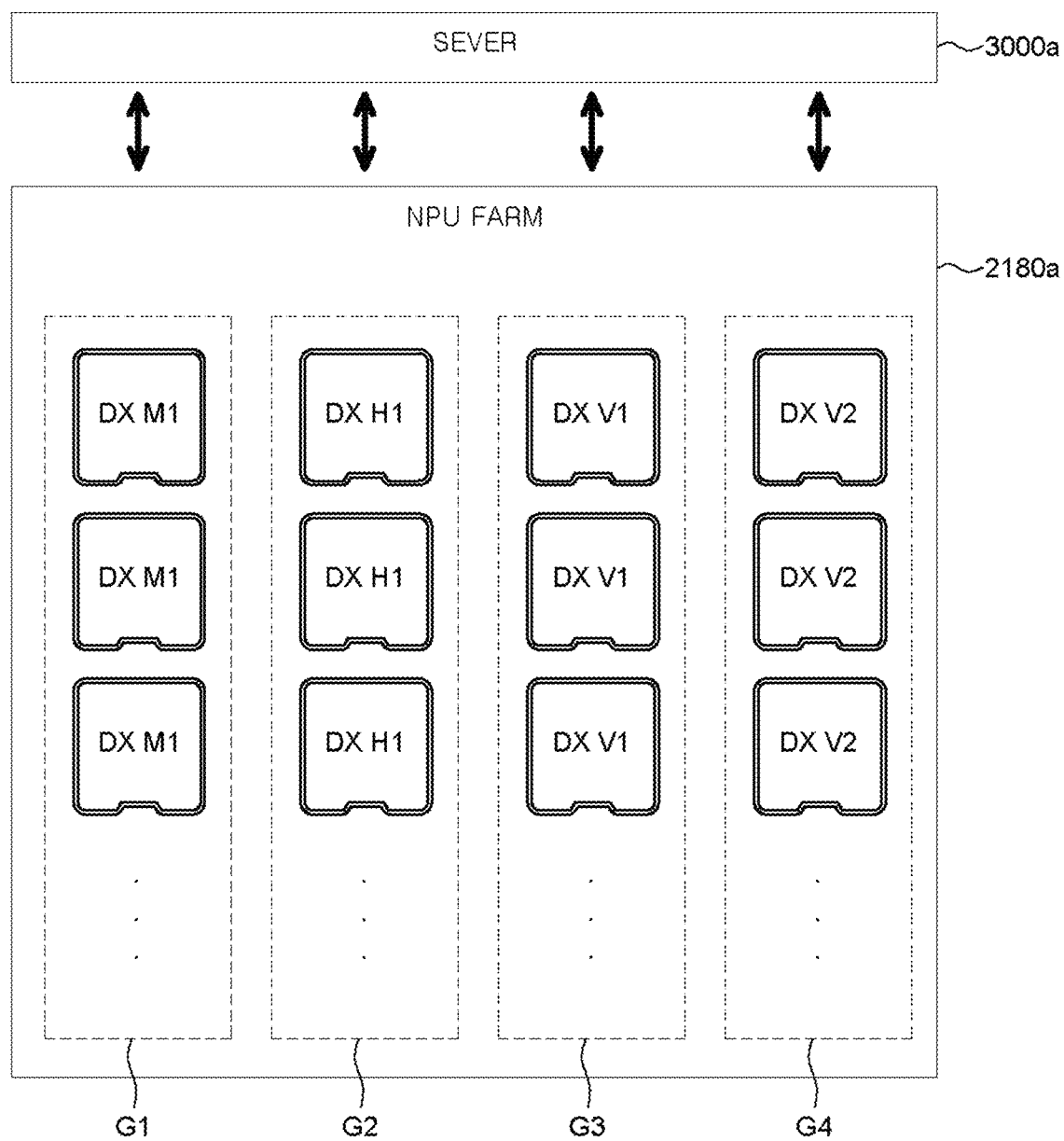
FIG. 20 is a block diagram illustrating a plurality of neural processing units, according to another example of the present disclosure.

FIG. 20 is a block diagram illustrating the configuration of a plurality of NPUs in the NPU farm 2180a, according to another example of the present disclosure.

The plurality of NPUs 2200a may include different types of NPUs. At least one NPU of the same type may also be included in the NPU farm 2180a. For example, a plurality of "DX-M1" NPUs may be arranged to form a first group G1, a plurality of "DX-H1" NPUs may be arranged to form a second group G2, a plurality of "DX-V1" NPUs may be arranged to form a third group G3, and a plurality of "DX-V2" NPUs may be arranged to form a fourth group G4. The NPU farm 2180a may be a cloud-based NPU system configured to respond in real time to performance evaluation requests from a plurality of users received via online communications. The plurality of NPUs 2200a included in the first to fourth groups G1 to G4 may all be used for performance evaluation, or a subset of these NPUs 2200a may be used for performance evaluation, depending on the user's choice.

Security-sensitive user data may be stored in the server 3000a, in the storage device 2400a of the NN model processing device 2000a or both in the server 3000a and in the storage device 2400a of the NN model processing device 2000a.

The at least one NPU 2200*a* used for computation may communicate with the server 3000*a* to receive the at least one particular NN model for performance evaluation of the NPU and the at least one particular evaluation dataset that is fed to the NN model. In other words, the NPU 2200*a* may process the user data for performance evaluation.

Figure 21:
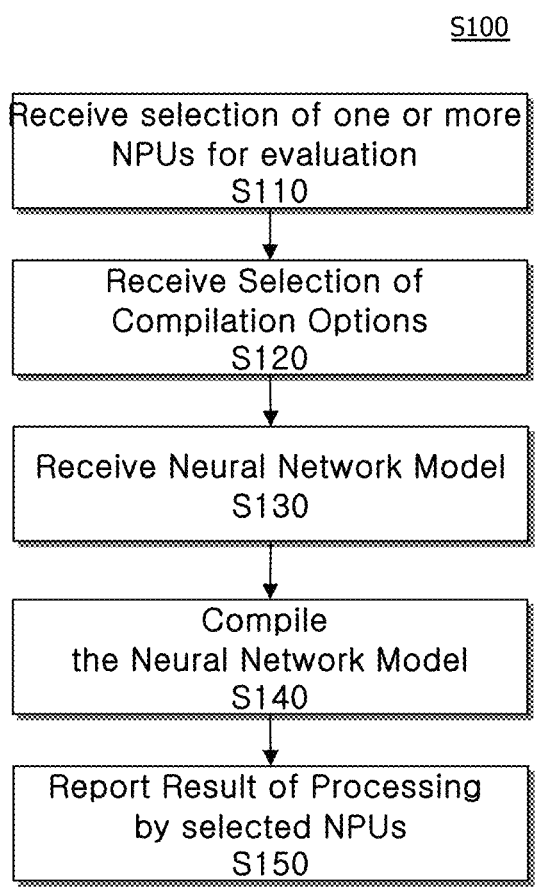
FIG. 21 is a flowchart illustrating a method of evaluating performance of, according to another example of the present disclosure.

FIG. 21 is a flowchart illustrating a method of evaluating performance of a neural network model instantiated on one or more NPUs, according to another example of the present disclosure.

Referring to FIG. 21, an NN model performance evaluation method S100 may include step S110 of receiving selection of one or more NPUs for evaluation, step S120 of receiving selection of compilation options, step S130 of receiving an NN model at the server 3000*a*, step S140 of compiling the NN model for instantiating on the one or more selected NPUs according to the compilation options, and step S150 of reporting result of the processing by the one or more selected NPUs.

In the NPU type selection step S110, a user may select a type of NPU for performance evaluation. The type of NPU may vary depending on the product line-up of NPUs sold by a particular company. In the example of FIG. 20, a plurality of "DX-M1" NPUs may be arranged to form a first group G1, a plurality of "DX-H1" NPUs may be arranged to form a second group G2, a plurality of "DX-V1" NPUs may be arranged to form a third group G3, and a plurality of "DX-V2" NPUs may be arranged to form a fourth group G4. In this case, the user selects one or more NPUs for evaluation from "DX-M1" NPUs, "DX-H1" NPUs, "DX-V1" NPUs, and "DX-V2" NPUs. The user may select only a single type of NPU or NPUs for evaluation, or select a combination of different types of NPUs for evaluation.

Then, in the compilation option selection step S120, at least one of a plurality of compilation options for the NN model to be processed is selected with respect to the selected at least one NPU. More specifically, in the compilation option selection step S120, a compilation option may be set based on hardware information of the NPU 2200*a*. Furthermore, in the compilation option selection step, a plurality of compilation options can be set based on the user's selection. In one or more embodiments, a description of the advantages and disadvantages of each compilation option can be displayed on the user device 1000*a*. Thus, the user may customize the various compilation options to suit the user's needs. In other words, the performance evaluation system 10000 may provide compilation options that are user-customized, rather than preset options, to meet the specific needs of the user. As described above, the compilation option may be at least one of a pruning algorithm, a quantization algorithm, a parameter refinement algorithm, an outlier alleviation algorithm, a model compression algorithm, a knowledge distillation algorithm, a retraining algorithm, and an AI based model improvement algorithm. Alternatively, the compile option may be configured to select one of the predefined preset options.

Then, in the NN model receiving step S130, at least one particular NN model for evaluating the performance of the selected NPU is received at the server 3000*a* from the user device 1000*a*. This may also be referred to as user data upload step.

Then, in the NN model compilation step S140, the received NN model is compiled according to the selected compilation options for instantiating on the one or more selected NPUs. Machine code or instructions are generated as the result of compilation, and are fed to the one or more NPUs to run the simulation.

In step S150 of reporting result, it is first determined whether the compiled NN model is capable of being processed by the plurality of neural processing units 2200*a*. If the compiled NN model cannot be processed by the plurality of neural processing units 2200*a*, the NN model processing result reporting step S150 may report a layer of the plurality of layers of the NN model that cannot be processed by the plurality of neural processing units 2200*a*. Then, the layer that cannot be processed by the plurality of neural processing units 2200*a* may be processed by the graphics processing unit 230. If the compiled NN model can be processed by the plurality of neural processing units 2200*a*, the NN model processing result reporting step S150 may report the processing performance of the plurality of neural processing units 2200*a*.

The parameters of processing performance may be a temperature profile of the neural processing unit, power consumption (Watt), trillion operations per second per Watt (TOPS/W), frame per second (FPS), inference per second (IPS), accuracy, and the like.

If the user does not provide an evaluation data set, the NN model performance evaluation system 10000 may analyze the size of the input data of the NN model to generate corresponding dummy data, and may utilize the generated dummy data to perform performance evaluation. For example, the size of the dummy data may be (224×224×3), (288×288×3), (380×380×3), (515×512×3), (640×640×3), or the like, but is not limited to these sizes. In other words, even if a dataset for evaluating inference performance is not provided from a user, it may be possible to generate performance evaluation results such as power consumption, TOPS/W, FPS, IPS, and the like of a neural processing unit. However, in such cases, inference accuracy evaluation results may not be provided since the dummy data may not be accompanied by accurate inference answers.

According to another example of the present disclosure, a user can quickly determine whether a user's NN model is operable on a particular NPU before purchasing the particular NPU.

According to another example of the present disclosure, a user can quickly determine, prior to purchasing a particular NPU, how a user's NN model will perform when instantiated and executed on a particular NPU.

According to an example of the present disclosure, if each NPU is connected via a server for each type of NPU, the user can evaluate the user's NN model online and receive a result for each NPU available for purchase. Thus, the performance evaluation system 10000 can provide the user with information on the performance and price of the neural processing unit required to implement the AI service developed by the user, which can help the user make a quick purchase decision.

Figure 22:
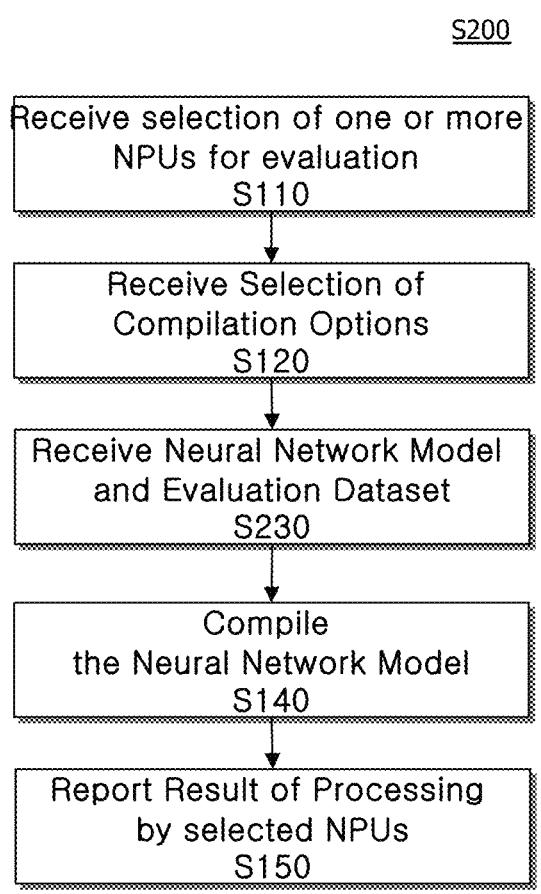
FIG. 22 is a flowchart illustrating a method of evaluating performance of a neural network model instantiated on one or more neural processing units, according to another example of the present disclosure.

FIG. 22 is a flowchart illustrating evaluating performance of an NN model instantiated on one or more NPUs, according to another example of the present disclosure.

Referring to FIG. 22, an NN model performance evaluation method S200 may include step S110 of receiving selection of one or more NPUs for evaluation, step S120 of receiving selection of compilation options, step S230 of receiving an NN model and an evaluation dataset at the server 3000*a*, step S140 of compiling the NN model for instantiating on the one or more selected NPUs according to the compilation options, and step S150 of reporting result of the processing the evaluation dataset using the one or more selected NPUs.

In the NPU type selection step S110, a user may select a type of NPU for performance evaluation. The type of NPU may vary depending on the product line-up of NPUs sold by a particular company. In the example of FIG. 20, a plurality of "DX-M1" NPUs may be arranged to form a first group G1, a plurality of "DX-H1" NPUs may be arranged to form a second group G2, a plurality of "DX-V1" NPUs may be arranged to form a third group G3, and a plurality of "DX-V2" NPUs may be arranged to form a fourth group G4. In this case, the user selects one or more NPUs for evaluation from "DX-M1" NPUs, "DX-H1" NPUs, "DX-V1" NPUs, and "DX-V2" NPUs. The user may select only a single type of NPU or NPUs for evaluation, or select a combination of different types of NPUs for evaluation.

Then, in the compilation option selection step S120, at least one of a plurality of compilation options for the NN model to be processed is selected with respect to the selected at least one NPU. More specifically, in the compilation option selection step S120, a compilation option may be set based on hardware information of the NPU 2200a. Furthermore, in the compilation option selection step, a plurality of compilation options can be set based on the user's selection. In one or more embodiments, a description of the advantages and disadvantages of each compilation option can be displayed on the user device 1000a. Thus, the user may customize the various compilation options to suit the user's needs. In other words, the performance evaluation system 10000 may provide compilation options that are user-customized, rather than preset options, to meet the specific needs of the user. As described above, the compilation option may be at least one of a pruning algorithm, a quantization algorithm, a parameter refinement algorithm, an outlier alleviation algorithm, a model compression algorithm, a knowledge distillation algorithm, a retraining algorithm, and an AI based model improvement algorithm. Alternatively, the compile option may be configured to select one of the predefined preset options.

Then, in step S230, at least one particular NN model for evaluating the performance of the selected NPU and at least one particular evaluation dataset are received at server 3000a from the user device 1000a. This may also be referred to as user data upload step. The particular evaluation dataset described refers to an evaluation dataset that is fed to the at least on particular NN model instantiated by the NN model processing device 2000a for performance evaluation of the NN model processing device 2000a.

Then, in the NN model compilation step S140, the received NN model is compiled according to the selected compilation options for instantiating on the one or more selected NPUs. Machine code or instructions are generated as the result of compilation, and are fed to the one or more NPUs to run the simulation.

In the NN model processing result reporting step S150, the performance evaluation result of the neural processing unit that processed the compiled NN model can be reported. The performance evaluation result report may be stored in the user's account or sent to the user's email address. However, the performance evaluation result can be provided to users in a variety of other ways. A performance evaluation result is also treated as user data and may be subject to the security policies that apply to the user data.

In the NN model processing result reporting step S150, it is first determined whether the compiled NN model may be processed by the plurality of neural processing units 2200a. If the compiled NN model cannot be processed by the plurality of neural processing units 2200a, the NN model processing result reporting step S150 may report a layer of the plurality of layers of the NN model that cannot be processed by the plurality of neural processing units 2200a.

Then, the layer that cannot be processed by the plurality of neural processing units 2200a may be processed by the graphics processing unit 230. If the compiled NN model can be processed by the plurality of neural processing units 2200a, the NN model processing result reporting step S150 may report the processing performance of the plurality of neural processing units 2200a.

The parameters of processing performance may be a temperature profile of the neural processing unit, power consumption (Watt), trillion operations per second per Watt (TOPS/W), frame per second (FPS), inference per second (IPS), accuracy, and the like.

According to another example of the present disclosure, a user can quickly determine, prior to purchasing a particular NPU, how a user's NN model will perform when instantiated and executed on a particular NPU.

According to an example of the present disclosure, if each NPU is connected via a server for each type of NPU, the user can evaluate the user's NN model online and receive a result for each NPU available for purchase. Thus, the performance evaluation system 10000 can provide the user with information on the performance and price of the neural processing unit required to implement the AI service developed by the user, which can help the user make a quick purchase decision.

Figure 23:
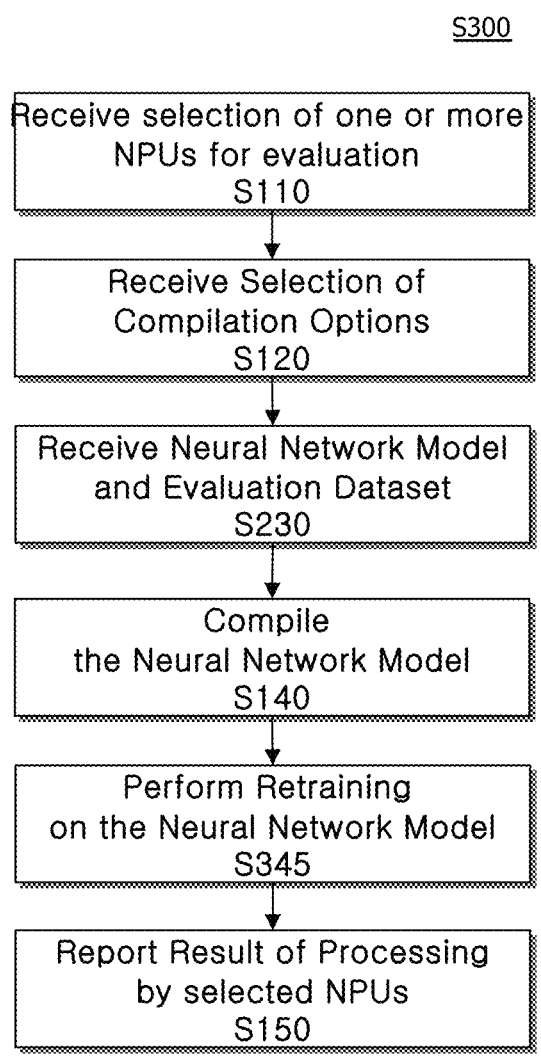
FIG. 23 is a flowchart illustrating a method of updating a neural network model for improved performance, according to another example of the present disclosure.

Referring to FIG. 23, a method for evaluating the performance of an NN model according to another example of the present disclosure with a retraining step will be described.

FIG. 23 is a flowchart illustrating evaluating performance of an NN model instantiated on one or more NPUs, according to another example of the present disclosure. Referring to FIG. 23, an NN model performance evaluation method S300 may include step S110 of receiving selection of one or more NPUs for evaluation, step S120 of receiving selection of compilation options, step S230 of receiving an NN model and an evaluation dataset at the server 3000a, step S140 of compiling the NN model for instantiating on the one or more selected NPUs according to the compilation options, step S345 of performing retraining on the NN model, and step S150 of reporting result of the processing the evaluation dataset using the one or more selected NPUs.

In the NPU type selection step S110, a user may select a type of NPU for performance evaluation. The type of NPU may vary depending on the product line-up of NPUs sold by a particular company. In the example of FIG. 20, a plurality of "DX-M1" NPUs may be arranged to form a first group G1, a plurality of "DX-H1" NPUs may be arranged to form a second group G2, a plurality of "DX-V1" NPUs may be arranged to form a third group G3, and a plurality of "DX-V2" NPUs may be arranged to form a fourth group G4. In this case, the user selects one or more NPUs for evaluation from "DX-M1" NPUs, "DX-H1" NPUs, "DX-V1" NPUs, and "DX-V2" NPUs. The user may select only a single type of NPU or NPUs for evaluation, or select a combination of different types of NPUs for evaluation.

Then, in the compilation option selection step S120, at least one of a plurality of compilation options for the NN model to be processed is selected with respect to the selected at least one NPU. More specifically, in the compilation option selection step S120, a compilation option may be set based on hardware information of the NPU 2200a. Furthermore, in the compilation option selection step, a plurality of compilation options can be set based on the user's selection. In one or more embodiments, a description of the advantages and disadvantages of each compilation option can be displayed on the user device 1000a. Thus, the user may customize the various compilation options to suit the user's needs. In other words, the performance evaluation system 10000 may provide compilation options that are user-customized, rather than preset options, to meet the specific needs of the user. As described above, the compilation option may be at least one of a pruning algorithm, a quantization algorithm, a parameter refinement algorithm, an outlier alleviation algorithm, a model compression algorithm, a knowledge distillation algorithm, a retraining algorithm, and an AI based model improvement algorithm. Alternatively, the compile option may be configured to select one of the predefined preset options.

Then, in step S230, at least one particular NN model for evaluating the performance of the selected NPU and at least one particular evaluation dataset is received at server 3000*a* from the user device 1000*a*. This may also be referred to as user data upload step. The particular evaluation dataset described refers to an evaluation dataset that is fed to the at least on particular NN model instantiated by the NN model processing device 2000*a* for performance evaluation of the NN model processing device 2000*a*.

Then, in the NN model compilation and processing step S140, the input NN model is compiled according to the selected compilation option, and the compiled machine code and the evaluation dataset are input to the selected neural processing unit within the NPU farm for processing.

If a retraining option is selected in the compilation option, retraining of the NN model may be performed in retraining step S345. During the retraining, the performance evaluation system 10000 may assign the graphics processing unit 230 to perform retraining on the NN model processing unit 200. For example, in the retraining step S345 of the NN model, the graphical processing unit 230 may receive an NN model applied with the pruning algorithm and/or the quantization algorithm and a training dataset as input to perform retraining. The retraining may be performed on an epoch-by-epoch basis, and several to hundreds of epochs may be performed on the graphics processing unit 230. The retraining option may include a quantization-aware retraining option, a pruning aware retraining option, and a transfer learning option.

In the NN model processing result reporting step S150, the performance evaluation result of the neural processing unit that processed the compiled NN model can be reported. The performance evaluation result report may be stored in the user's account or sent to the user's email address. However, the performance evaluation result can be provided to users in a variety of ways, including but not limited to what is illustrated in FIG. 18B. A performance evaluation result is also treated as user data and may be subject to the security policies that apply to the user data.

In the NN model processing result reporting step S150, it is first determined whether the compiled NN model is capable of being processed by the plurality of neural processing units 2200*a*. If the compiled NN model cannot be processed by the plurality of neural processing units 2200*a*, the NN model processing result reporting step S150 may report a layer of the plurality of layers of the NN model that cannot be processed by the plurality of neural processing units 2200*a*. Then, the layer that cannot be processed by the plurality of neural processing units 2200*a* may be processed by the graphics processing unit 230. If the compiled NN model can be processed by the plurality of neural processing units 2200*a*, the NN model processing result reporting step S150 may report the processing performance of the plurality of neural processing units 2200*a*.

The parameters of processing performance may be a temperature profile of the neural processing unit, power consumption (Watt), trillion operations per second per Watt (TOPS/W), frame per second (FPS), inference per second (IPS), accuracy, and the like.

According to another example of the present disclosure, a user can quickly determine whether a user's NN model is operable on a particular NPU before purchasing the particular NPU.

According to another example of the present disclosure, a user can quickly determine, prior to purchasing a particular NPU, how a user's NN model will perform when running on a particular NPU.

According to another example of the present disclosure, if each NPU is connected via a server for each type of NPU, the user can evaluate the user's NN model online and receive a result for each NPU available for purchase.

According to another example of the present disclosure, an NN model retraining algorithm improved for a particular neural processing unit can be performed online via the performance evaluation system 10000. In this case, user data can be separated and protected from the operator of the performance evaluation system 10000 by the security policies described above.

Thus, the performance evaluation system 10000 can provide the user with information on the performance and price of the neural processing unit required to implement the AI service developed by the user, which can help the user make a quick purchase decision.

Embodiments relate to converting one or more functions or one or more function call instructions of a first neural network (NN) model into one or more graph modules. A relationship between one or more inputs and one or more outputs of the at least one graph module may be analyzed. A second neural network (NN) model in the form of a directed acyclic graph (DAG) using the at least one graph module corresponding to the at least one function or the at least one function call instruction of the first NN model may be generated by mapping the one or more inputs and the one or more outputs of the at least one graph module to each other based on the relationship. At least one marker may be added to the at least one graph module in the second NN model. Calibration data may be generated for each of the at least one graph module by collecting input values or output values of each of the at least one graph module using the at least one marker. A scale value of each of the at least one graph module applicable to the second NN model may be generated based on the calibration data. In addition, an offset value of each of the at least one graph module applicable to the second NN model may be generated based on the calibration data.

In one or more embodiments, each of the at least one graph module included in the DAG of the second NN model may be connected to a corresponding graph module based on the relationship.

In one or more embodiments, adding the at least one marker may include: adding each marker to one or more of the at least one graph module in the second NN model such that the one or more of the at least one graph module are connected to the respective marker.

In one or more embodiments, the calibration data may be generated by inputting a calibration dataset into the second NN model.

In one or more embodiments, the calibration data may include a maximum value and a minimum value.

In one or more embodiments, the scale value is determined as a function of a difference between a maximum value of the calibration data and a minimum value of the calibration data.

In one or more embodiments, the offset value is determined as function of the scale value and the minimum value of the calibration data.

In one or more embodiments, the scale value and the offset value may be obtained by an equation below, $$\text{scale} = \frac{\max - \min}{2^{bitwidth} - 1}, \text{offset} = \frac{-\min}{\text{scale}}$$

where max denotes a maximum value among the input values and output values collected for the calibration data, min denotes a minimum value among the input values and output values collected for the calibration data, and bitwidth denotes a target quantization bitwidth.

In one or more embodiments, a convolution operation in the first NN model may be expressed as:

$$\text{feature\_out}_{fp} = \text{feature\_in}_{fp} \otimes \text{weight}_{fp}$$

where feature_out$_{fp}$ represents an output feature map parameter in the form of floating-point, feature_in$_{fp}$ represents an input feature map parameter in the form of floating-point and weight$_{fp}$ represents a weight parameter in the form of floating-point.

In one or more embodiments, a convolution operation in the second NN model may be expressed as:

$$\text{feature\_out}_{fp} = \left(\left\lfloor \frac{\text{feature\_in}_{fp} - o_f}{s_f} \right\rfloor \times s_f + o_f\right) \otimes \left\lfloor \frac{\text{weight}_{fp}}{s_w} \right\rfloor \times s_w$$

where feature_in$_{fp}$ represents an input feature map parameter in the form of floating-point, weight$_{fp}$ represents a weight parameter in the form of floating-point, o$_f$ represents the offset value for an input feature map, s$_f$ represents the scale value for the input feature map, s$_w$ represents the scale value for a weight, and $\lfloor \ \rfloor$ represents round and clip operations.

In one or more embodiments, a convolution operation in the second NN model may be implemented using the at least one graph module only.

In one or more embodiments, the at least one function or the at least one function call instruction converted to the at least one graph module may include: at least one of add function, subtract function, multiply function, divide function, slice function, concatenation function, tensor view function, reshape function, transpose function, softmax function, permute function, chunk function, split function, clamp function, flatten function, tensor mean function, and sum function.

In one or more embodiments, weight parameters and input feature map parameters of the first NN model and the second NN model may be in the form of floating-points having a length of one of 16-bits to 32-bits.

In one or more embodiments, the first NN model and the second NN model may be in PyTorch™ format.

In one or more embodiments, based on the scale value, a third neural network (NN) model including a quantized weight parameter in the form of integer may be generated based on the second NN model.

In one or more embodiments, the weight parameters of the third NN model may be determined by performing round and clip operations on unquantized weight parameters of the second NN model adjusted by the scale value.

In one or more embodiments, based on the scale value and the offset value, a third NN model including a quantized weight parameter in the form of integer may be generated based on the second NN model.

In one or more embodiments, a third NN model may be generated based on the second NN model by removing the at least one marker of the second NN model.

In one or more embodiments, a third NN model including a weight parameter and an input feature map parameter in the form of integer having a length of one of 2-bits to 16-bits may be generated, based on the second NN model, In one or more embodiments, a convolution operation in a third NN model may be expressed as:

$$\text{feature\_out}_{int} = \text{feature\_in}_{int} \otimes \text{weight}_{int}$$

where feature_out$_{int}$ denotes an output feature map parameter in the form of integer, feature_in$_{int}$ denotes an input feature map parameter in the form of integer, and weight$_{int}$ denotes a weight parameter in the form of integer.

In one or more embodiments, a third NN model in an open neural network exchange (ONNX) format may be generated based on the second NN model.

In one or more embodiments, the constant parameters of the third NN model that can be pre-calculated may be stored as pre-calculated constant parameters.

Embodiments relate to a non-transitory computer-readable storage medium storing instructions, when executed by one or more processors, causing the one or more processors to perform a method. At least one function or at least one function call instruction of a first neural network (NN) model may be converted into at least one graph module. A relationship between one or more inputs and one or more outputs of the at least one graph module may be analyzed. A second neural network (NN) model may be generated in the form of a directed acyclic graph (DAG) using the at least one graph module corresponding to the at least one function or the at least one function call instruction of the first NN model, by mapping the one or more inputs and the one or more outputs of the at least one graph module to each other based on the relationship. At least one marker may be added to the at least one graph module in the second NN model. Calibration data may be generated for each of the at least one graph module by collecting input values or output values of each of the at least one graph module using the at least one marker. A scale value and an offset value of each of the at least one graph module applicable to the second NN model may be determined based on the calibration data.

Embodiments relate to a neural processor. The neural processor may include: a processing element circuit configured to receive a first input parameter quantized to a first bitwidth and a first weight parameter quantized to a second bitwidth, and to process a convolution or matrix multiplication to output a first output parameter quantized to a third bitwidth, and a special function unit circuit configured to input the first output parameter, convert the first output parameter to a second output parameter, in the form of floating-point number, by performing at least one of an activation function operation and a batch-normalization function operation to the second output parameter, and output a third output parameter quantized to the first bitwidth.

Embodiments relate to converting one or more functions or one or more function call instructions of a first neural network (NN) model into one or more graph modules. A relationship between one or more inputs and one or more outputs of the plurality of graph modules may be analyzed. A second neural network (NN) model may be generated in the form of a directed acyclic graph (DAG) using the plurality of graph modules corresponding to the first NN model, by mapping the one or more inputs and the one or more outputs of the plurality of graph modules to each other based on the relationship. A plurality of markers may be added to the plurality of graph modules in the second NN model. Calibration data may be generated by collecting input values and output values of each of the plurality of graph modules using the plurality of markers. A scale value and an offset value applicable to the second NN model may be determined based on the calibration data. An updated value may be determined for each graph module of the second NN model for the scale value or the offset value by performing a quantization simulation for one or more candidates among updated candidates of the scale value or the offset value.

In one or more embodiments, the updated value for the scale value or the offset value from a first graph module to a last graph module of the plurality of graph modules included in the second NN model may be determined based on a relationship between graph modules.

In one or more embodiments, the updated value for the offset value for the plurality of graph modules included in the second NN model may be determined, and then the updated value for the scale value for the second NN model reflecting the updated value for the offset value for each of the plurality of graph modules may be determined.

In one or more embodiments, a cosine similarity of a first computation result value of each graph module of the second NN model and a second computation result value of performing the quantization simulation using each candidate included in the updated candidates may be calculated, and the candidate with a highest cosine similarity value included in the updated candidates as the updated value may be selected.

In one or more embodiments, the cosine similarity may be calculated after performing dequantization on a result of the quantization simulation using each of the updated candidates.

In one or more embodiments, the updated candidates for the scale value may be selected according to a predetermined number within a certain range comprising the scale value. The updated candidates for the offset value may be selected from a predetermined number within a certain range comprising the offset value.

In one or more embodiments, the updated candidates for the scale value include the scale value and the updated candidates for the offset value may include the offset value.

In one or more embodiments, the scale value may be generated for an input parameter, an output parameter, and a weight parameter of the plurality of graph modules, respectively. The offset value may be generated for the input parameter and the output parameter of the plurality of graph modules, respectively.

In one or more embodiments, based on updated values of the scale value and the offset value, a third neural network (NN) model comprising a quantized weight parameter in the form of integer may be generated based on the second NN model.

Embodiments relates to a method. The method may comprise: adding a plurality of markers to a plurality of graph modules included in a neural network (NN) model in the form of a directed acyclic graph (DAG). Input values and output values of each of the plurality of graph modules may be collected using the plurality of markers so as to generate calibration data. Based on the calibration data, a scale value and an offset value applicable to the NN model may be determined. An updated value for the scale value or the offset value may be determined by performing a quantization simulation of one or more candidates among updated candidates for the scale value or the offset value for each graph module of the NN model.

In one or more embodiments, the updated value for the scale value or the offset value from a first graph module to a last graph module of the plurality of graph modules may be generated based on a connective relationship between graph modules included in the NN model.

In one or more embodiments, the updated value for the offset value for the plurality of graph modules included in the NN model may be generated, and then the updated value for the scale value for the NN model reflecting the updated value for the offset value for each of the plurality of graph modules may be determined.

In one or more embodiments, a cosine similarity of a first computation result value of each graph module of the NN model and a second computation result value of performing the quantization simulation using each candidate included in the updated candidates may be calculated, and the candidate with a highest cosine similarity value included in the updated candidates as the updated value may be selected.

In one or more embodiments, the cosine similarity may be calculated after performing dequantization on a result of the quantization simulation using each of the updated candidates.

In one or more embodiments, the updated candidates for the scale value may be selected according to a predetermined number within a certain range comprising the scale value.

In one or more embodiments, the updated candidates for the offset value may be selected from a predetermined number within a certain range comprising the offset value.

In one or more embodiments, the scale value may be generated for an input parameter, an output parameter, and a weight parameter of the plurality of graph modules, respectively.

In one or more embodiments, the offset value may be generated for the input parameter and the output parameter of the plurality of graph modules, respectively.

Embodiments relates to a non-transitory computer-readable storage medium storing instructions. The non-transitory computer-readable storage medium storing instructions, the instructions, when executed by one or more processors, causing the one or more processors to perform steps may comprise: adding a plurality of markers to a plurality of graph modules included in a neural network (NN) model in the form of a directed acyclic graph (DAG). Input values and output values of each of the plurality of graph modules may be collected using the plurality of markers so as to generate calibration data. Based on the calibration data, a scale value and an offset value applicable to the NN model may be determined. An updated value for the scale value or the offset value may be determined by performing a quantization simulation of one or more candidates among updated candidates for the scale value or the offset value for each graph module of the NN model.

Embodiments relate to converting one or more functions or one or more function call instructions of a first neural network (NN) model into one or more graph modules. The method may comprise: converting one or more functions or function call instructions of a first neural network (NN) model into one or more graph modules, one or more inputs and outputs of the one or more graph modules being traceable. A relationship between the one or more inputs and the one or more outputs of the one or more graph modules may be analyzed. A second neural network (NN) model including the one or more graph modules as one or more nodes of a directed acyclic graph (DAG) by coupling the one or more inputs and outputs of the graph modules according to the relationship may be generated. One or more markers may be added for collecting values from at least part of the one or more inputs and outputs of the one or more graph modules in the second NN model. A first calibration data may be generated by analyzing the collected values. Based on the first calibration data, an adjustment value may be determined to mitigate outliers for at least one of the graph modules. An input parameter and a weight parameter for the at least one of the graph modules of the second NN model may be updated. An updated input parameter and an updated weight parameter based on the adjustment value so as to improve performance of the second NN model.

In one or more embodiments, the at least one of the graph modules may perform a multiply and accumulate (MAC) operation using the updated input parameter and the updated weight parameter as operands.

In one or more embodiments, a result of the MAC operation by the at least one of the graph modules using the input parameter and the weight parameter as operands may be the same as the MAC operation result using the updated input parameter and the updated weight parameter as operands.

In one or more embodiments, the adjustment value may be determined using a maximum of absolute values for each channel of the input parameter and a maximum of absolute values for each channel of the weight parameter.

In one or more embodiments, the adjustment value may be a set comprising a plurality of constant values for the input parameter and the weight parameter. A number of elements in the set of the adjustment value may correspond to a number of channels of the input parameter and the weight parameter.

In one or more embodiments, the adjustment value may be obtained by a mathematical formula:

$$adPi = \sqrt{\frac{|Amax_i|}{|Wmax_i|}},$$

wherein adPi is an adjustment value for channel i, Amaxi represents a maximum value among absolute values of all elements of the channel i of the input parameter, and Wmaxi represents a maximum value among absolute values of all elements of the channel i of the weight parameter.

In one or more embodiments, the updated input parameter may be multiplication of the input parameter by a reciprocal of the adjustment value, and the updated weight parameter may be multiplication of the weight parameter by the adjustment value.

In one or more embodiments, a second calibration data may be generated by collecting input values and output values of the at least one of the graph modules according to a dataset for calibration using corresponding ones of the one or more markers, and a scale value and an offset value applicable to the second NN model may be determined based on the second calibration data.

Embodiments relate to adding at least one marker to at least one input or output of graph modules included in a neural network (NN) model as nodes of a directed acyclic graph (DAG). Input values or output values may be collected by the at least one marker to generate calibration data. Based on the calibration data, an adjustment value may be determined to mitigate outliers for the graph modules. An input parameter and a weight parameter of at least one of the graph modules may be updated so as to generate an updated input parameter and an updated weight parameter based on the adjustment value.

Embodiments relate to a non-transitory computer-readable storage medium storing instructions. The non-transitory computer-readable storage medium storing instructions, the instructions, when executed by one or more processors, causing the one or more processors to perform steps may comprise: adding at least one marker to at least one input or output of graph modules included in a neural network (NN) model as nodes of a directed acyclic graph (DAG); collecting input values or output values by the at least one marker to generate calibration data; determining, based on the calibration data, an adjustment value to mitigate outliers for the graph modules; and updating an input parameter and a weight parameter of at least one of the graph modules into an updated input parameter and an updated weight parameter based on the adjustment value.

Embodiments relate to adding a plurality of markers to each of a plurality of graph modules in a first neural network (NN) model in the form of a directed acyclic graph (DAG). Calibration data may be generated by collecting input values and output values of each of the plurality of graph modules by using the plurality of markers. Based on the calibration data, a scale value and an offset value applicable to the first NN model may be determined. Based on the scale value and the offset value, a second NN model including at least one parameter including at least one weight parameter in an integer format through quantization may be generated. The at least one parameter included in the second NN model may be updated by performing a quantization-aware retraining on the second NN model.

In one or more embodiments, in response to updating the at least one parameter included in the second NN model by performing the quantization-aware retraining on the second NN model may comprise: updating the at least one parameter of each of the plurality of graph modules included in the second NN model by using a gradient descent technique so that a loss resulting from changing parameters of the first NN model due to the quantization is minimized for each of the plurality of graph modules. The loss may represent a difference between an actual result value $Y_{truth}$ and an output value $Y_{out}$ of each of the plurality of graph modules.

In one or more embodiments, in response to performing the quantization-aware retraining on the second NN model may comprise: updating the at least one parameter by subtracting, from the at least one parameter, the loss resulting from changing the parameters of the first NN model due to the quantization.

In one or more embodiments, in response to performing the quantization-aware retraining on the second NN model may comprise: determining, based on at least one user option or retraining completion time, a degree of the updating the at least one parameter.

In one or more embodiments, the quantization-aware retraining of the second NN model may be terminated when the loss reaches a predetermined threshold or exceeds a predetermined execution time.

In one or more embodiments, the at least one parameter included in the second NN model may comprise one or more weight parameters for each of the plurality of graph modules included in the second NN model.

In one or more embodiments, in response to updating the at least one parameter included in the second NN model by performing the quantization-aware retraining on the second NN model may comprise: adding a loss change calculation function to a forward computation of each of the plurality of graph modules included in the second NN model, corresponding to a quantization module added to each of the plurality of graph modules. Output values of each of the plurality of graph modules may be verified during a backward computation for changes in each of the at least one parameter.

In one or more embodiments, the loss change calculation function has results of the forward computation unaffected by a loss change calculation and preserves original equations removed by round and clip operations included in the quantization module during the backward computation.

In one or more embodiments, the loss change calculation function may be represented by a first detach function for an input feature map parameter and a second detach function for a weight parameter:

$$\text{detach}\left(\left\lfloor\frac{x-o}{s_x}\right\rceil - \frac{x-o}{s_x}\right) \text{ and }$$

$$\text{detach}\left(\left\lfloor\frac{w}{s_w}\right\rceil - \frac{w}{s_w}\right),$$

where x denotes the input feature map parameter of each of the plurality of graph modules, $s_x$ denotes the scale value for the input feature map parameter, o denotes the offset value for the input feature map parameter, w denotes the weight parameter of each of the plurality of graph modules, and $s_w$ denotes a scale value for the weight parameter.

In one or more embodiments, in response to updating the at least one parameter included in the second NN model by performing the quantization-aware retraining on the second NN model may comprise: replacing $$y = \left(\left\lfloor\frac{x-o}{s_x}\right\rceil * s_x + o\right) * \left(\left\lfloor\frac{w}{s_w}\right\rceil * s_w\right)$$

of each of the plurality of graph modules to which the quantization module is added with $$y = \left(\left(\text{detach}\left(\left\lfloor\frac{x-o}{s_x}\right\rceil - \frac{x-o}{s_x}\right) + \frac{x-o}{s_x}\right) * s_x + o\right) *$$

$$\left(\left(\text{detach}\left(\left\lfloor\frac{w}{s_w}\right\rceil - \frac{w}{s_w}\right) + \frac{w}{s_w}\right) * s_w\right)$$

using the loss change calculation function.

In one or more embodiments, before the determining the scale value and the offset value applicable to the first NN model based on the calibration data, an adjustment value for outlier adjustment for each of the plurality of graph modules based on the calibration data may be calculated. Input feature map parameters and weight parameters for each of the plurality of graph modules of the first NN model based on the adjustment value may be updated.

In one or more embodiments, in response to updating the input feature map parameters and the weight parameters may comprise multiplying the input feature map parameters of each of the plurality of graph modules by a reciprocal of the adjustment value and multiplying the weight parameters by the adjustment value.

In one or more embodiments, in response to determining, based on the calibration data, the scale value and the offset value applicable to the first NN model may comprise: performing a quantization simulation for one or more candidates included in an candidate group for the scale value or the offset value for each of the plurality of graph modules of the first NN model to determine an updated scale value or an updated offset value.

In one or more embodiments, in response to determining the updated scale value or the updated offset value may comprise: calculating a cosine similarity between computation result values of each of the plurality of graph modules of the first NN model and computation result values obtained by performing the quantization simulations using each candidate included in the candidate group. A candidate with a highest cosine similarity value may be as the updated scale value or the updated offset value from the candidate group.

Embodiments relate to a non-transitory computer-readable storage medium storing instructions. The non-transitory computer-readable storage medium storing instructions, the instructions, when executed by one or more processors, causing the one or more processors to perform steps may comprise: adding a plurality of markers to each of a plurality of graph modules included in a first neural network (NN) model in the form of a directed acyclic graph (DAG); collecting input values and output values of each of the plurality of graph modules by using the plurality of markers to generate calibration data; determining, based on the calibration data, a scale value and an offset value applicable to the first NN model; performing quantization on the first NN model using the scale value and the offset value to generate a second NN mode that is quantized; and updating at least one parameter included in the second NN model by performing a quantization-aware retraining on the second NN model.

Embodiments relate to adding a plurality of markers to each of a plurality of graph modules in a first neural network (NN) model in the form of a directed acyclic graph (DAG). The calibration data may be generated by collecting input values and output values of each of the plurality of graph modules by using the plurality of markers. Based on the calibration data, a scale value and an offset value applicable to the first NN model may be determined. Based on the scale value and the offset value, a second NN model including at least one parameter including at least one weight parameter in the integer format may be generated through quantization. The first output values of the first NN model with respect to a first retraining data may be obtained. Based on the first output values of the first NN model, the at least one weight parameter included in the second NN model may be updated by performing a quantization-aware retraining on the second NN model.

In one or more embodiments, in response to updating the at least one weight parameter included in the second NN model may comprise: updating the at least one weight parameter of each of the plurality of graph modules included in the second NN model by using a gradient descent technique so that a loss resulting from changing parameters of the first NN model in the quantization is minimized for each of the plurality of graph modules. The loss may represent a difference between a first output value of a first graph module of the first NN model and a second output value of a second graph module of the second NN model. The first graph module of the first NN model may correspond to the second graph module of the second NN model.

In one or more embodiments, in response to updating the at least one weight parameter included in the second NN model by performing the quantization-aware retraining on the second NN model may comprise: adding a loss change calculation function to a forward calculation of each of a plurality of graph modules included in the second NN model, corresponding to a quantization module added to each of the plurality of graph modules included in the second NN model. Output values of each of the plurality of graph modules included in the second NN model may be verified during a backward computation for changes in each of the at least one weight parameter.

Embodiments relate to a method. The method may comprise: generating, based on a first neural network (NN) model including at least one floating-point parameter, a second NN model including at least one integer parameter by performing quantization. Based on label values of retraining data, retraining may be performed on the first NN model and quantization-aware retraining may be performed on the second NN model by using the retraining data, based on output values of the first NN model for the retraining data.

In one or more embodiments, when a difference between an output value of each of a plurality of graph modules of the first NN model and an output value of each of the plurality of graph modules of the second NN model that is corresponding to the each of the plurality of graph modules of the first NN model is minimal, at least one weight parameter of the each of the plurality of graph modules of the second NN model to at least one weight parameter as is in a current state may be updated.

In one or more embodiments, a first weight parameter and a first input feature map parameter of the first NN model may be in the floating-point format with a length of 16 bits to 32 bits and a second weight parameter and a second input feature map parameter of the second NN model may be in the integer (INT) format with a length of 2 bits to 8 bits.

Embodiments relate to a non-transitory computer-readable storage medium storing instructions. The non-transitory computer-readable storage medium storing instructions, the instructions, when executed by one or more processors, causing the one or more processors to perform steps comprising: adding a plurality of markers to each of a plurality of graph modules included in a first neural network (NN) model in the form of a directed acyclic graph (DAG); collecting input values and output values of each of the plurality of graph modules by using the plurality of markers to generate calibration data; determining, based on the calibration data, a scale value and an offset value applicable to the first NN model; generating, based on the scale value and the offset value of the first NN model, a second NN model including at least one parameter including at least one weight parameter in an integer format through quantization; obtaining first output values of the first NN model with respect to a first retraining data; and updating, based on the first output values of the first NN model, the at least one weight parameter included in the second NN model by performing a quantization-aware retraining on the second NN model.

The Embodiments relate to converting one or more functions or one or more function call instructions of a first neural network (NN) model into one or more graph modules. The relationships between one or more inputs and one or more outputs of the one or more of graph modules are analyzed. A second NN model in the form of a directed acyclic graph (DAG) are generated using the one or more graph modules corresponding to the first NN model, by coupling the one or more inputs of the one or more graph modules and the one or more outputs of the one or more graph modules according to the relationships. One or more markers are added for collecting values from at least part of inputs and outputs of to the one or more graph modules in the second NN model. Calibration data is generated by analyzing the collecting values. Based on the calibration data, a scale value and an offset value of the second NN model are generated. Based on the scale value and the offset value, a third NN model is generated from the second NN model. The third NN model includes weight parameters. At least a subset of the weight parameters in the third NN model is quantized relative to weight parameters of the second NN model. Training is performed on each of layers of the third NN model to update the weight parameters of the third NN model so that a difference between an output value of each of the layers of the third NN model with the updated weight parameters and an output value of a corresponding layer of the second NN model is reduced.

In one or more embodiments, the scale value is determined as a function of a difference between a maximum value of the calibration data and a minimum value of the calibration data, and the offset value is determined as function of the scale value and the minimum value of the calibration data.

In one or more embodiments, the weight parameters of the third NN model are determined by performing round and clip operations on unquantized weight parameters of the second NN model adjusted by the scale value.

In one or more embodiments, in response to performing the training on each of the layers, whether to perform a floor operation or a ceiling operation instead of a rounding operation on one or more of the weight parameters to quantize the at least the subset of the weight parameters is determined.

In one or more embodiments, performing the training on each of the layers of the third NN model, further includes: converging the one or more of the weight parameters of the third NN model to 0 or 1 such that the difference between the output value of the each of the layer of the third NN model and the output value of the corresponding layer of the second NN model is reduced.

In one or more embodiments, performing the training on each of the layers of the third NN model, further includes: updating the one or more of the weight parameters using a loss function with respect to the difference between the output value of each of the layers of the third NN model and the output value of the corresponding layer of the second NN model, and wherein the loss function includes an induction that causes the one or more of the weight parameters to converge to 0 or 1 upon completion of the training.

In one or more embodiments, the loss function further includes a regularization function that reduces a rounding error caused by the rounding operation.

In one or more embodiments, performing the training on each of the layers of the third NN model, further includes: updating the scale value for one or more of the weight parameters.

In one or more embodiments, performing the training on each of the layers of the third NN model, further includes: updating, a learned parameter for updating the scale value to reduce the difference between the output value of each of the layers of the third NN model and the output value of the corresponding layer of the second NN model, wherein the learned parameter includes initial learned parameter, learned parameters of the same shape as the weight parameters, and channel-wise learned parameters for a fully-connected layer.

In one or more embodiments, in response to completion of the updating of the scale value, the weight parameters of the third NN model is updated based on the initial learned parameters, learned parameters of the same shape as the weight parameters and the channel-wise learned parameters.

In one or more embodiments, performing the training on each of the layers of the third NN model, further includes: updating, a learned parameter for updating the scale value to reduce the difference between the output value of each of the layers of the third NN model and the output value of the corresponding layer of the second NN model. The learned parameters include initial learned parameters, learned parameters that convert to a shape of the weight parameters, and learned parameters for each of two-dimensions for a two-dimensional convolutional layer, In one or more embodiments, in response to completion of the updating of the scale value, the weight parameters of the third NN model is updated based on the initial learned parameters, the learned parameters that convert to a shape of the weight parameters, and the learned parameters.

In one or more embodiments, the one or more functions or the one or more function call instructions converted to the one or more graph modules include: at least one of add function, subtract function, multiply function, divide function, slice function, concatenation function, tensor view function, reshape function, transpose function, softmax function, permute function, chunk function, split function, clamp function, flatten function, tensor mean function, and sum function.

In one or more embodiments, a convolution operation in the second NN model is implemented using only the one or more graph modules.

In one or more embodiments, the first NN model and the second NN model are in PyTorch™ format.

In one or more embodiments, one or both of the weight parameters and input feature map parameters of the first and second NN models are in a floating-point format with a length of 16 bits to 32 bits.

In one or more embodiments, one or both of the weight parameters and an input feature map parameters of the third NN model are in an integer (INT) format with a length of 2 bits to 8 bits.

In one or more embodiments, a scale value for one or more of the weight parameters is respectively updated.

The Embodiments relate to converting one or more functions or function call instructions of a first neural network (NN) model into one or more graph modules. A relationship between one or more inputs and one or more outputs of the one or more graph modules may be analyzed. A second NN model including the one or more graph modules as one or more nodes of a directed acyclic graph (DAG) may be generated by coupling the one or more inputs and outputs of the graph modules based on the relationship. One or more markers corresponding to a weight parameter of one or more layers of the second NN model may be added. The one or more markers may be updated according to a pruning algorithm that removes at least a portion of the weight parameter.

In one or more embodiments, the pruning algorithm may be performed repeatedly so as to gradually increase a pruning ratio while a loss of a loss function of the second NN model is within a threshold range.

In one or more embodiments, the pruning algorithm may be configured to prune a certain percentage of one or more elements of the weight parameter close to zero.

In one or more embodiments, the pruning algorithm may be configured to prune one or more element of the weight parameter corresponding to a predefined pattern.

In one or more embodiments, the pruning algorithm may include a predefined pattern including at least one of a channel-wise pattern and a row-wise pattern.

In one or more embodiments, when the one or more markers corresponding to the weight parameter is set for a channel or for a row, adjust a size of the weight parameter to be smaller according to a channel mask or a row mask.

In one or more embodiments, the pruning algorithm may be configured to calculate an importance of the weight parameter so as to determine whether to eliminate one or more element of the weight parameter based on the calculated importance.

In one or more embodiments, an importance of the weight parameter with respect to the pruning algorithm may be calculated as a magnitude of a derivative of the weight parameter with respect to a loss of the second NN model.

The Embodiments relate to adding one or more markers to of the one or more graph modules of the second NN model. Calibration data may be generated by collecting input values and output values of each of the one or more graph modules by using the one or more markers. Based on the calibration data, a scale value and an offset value applicable to the second NN model may be determined. Based on the scale value and the offset value, a third NN model including a quantized weight parameter in an integer format may be generated based on the second NN model.

In one or more embodiments, the scale value and the offset value may be obtained by an equation below, $$\text{scale} = \frac{\max - \min}{2^{bitwidth} - 1}, \text{offset} = \frac{-\min}{\text{scale}},$$

where max denotes a maximum value among the input values and output values collected for the calibration data, min denotes a minimum value among the input values and output values collected for the calibration data, and bitwidth denotes a target quantization bitwidth.

In one or more embodiments, in the generating the third NN model based on the second NN model, the weight parameter of the third NN model may be obtained by an equation below, $$\text{weight}_{int} = \left[ \frac{\text{weight}_{fp}}{s_w} \right]$$

where $\text{weight}_{int}$ denotes a quantized weight, $\text{weight}_{fp}$ denotes a weight in the form of floating-point to be quantized, $s_w$ denotes the scale value for a weight in the form of floating-point to be quantized, and represents round and clip operations.

In one or more embodiments, the one or more functions or the one or more function call instructions converted to the one or more graph modules may include: at least one of add function, subtract function, multiply function, divide function, slice function, concatenation function, tensor view function, reshape function, transpose function, softmax function, permute function, chunk function, split function, clamp function, flatten function, tensor mean function, and sum function.

In one or more embodiments, a convolution operation in the second NN model may be implemented using the one or more graph modules only.

Embodiments relate to a non-transitory computer-readable storage medium. The non-transitory computer-readable storage medium storing instructions, the instructions, when executed by one or more processors, causing the one or more processors to perform steps may comprise: converting one or more functions or function call instructions of a first neural network (NN) model into one or more graph modules; analyzing a relationship between one or more inputs and one or more outputs of the one or more graph modules; generating a second NN model including the one or more graph modules as one or more nodes of a directed acyclic graph (DAG) by coupling the one or more inputs and outputs of the graph modules based on the relationship; adding one or more markers corresponding to a weight parameter of one or more layers of the second NN model; and updating the one or more markers according to a pruning algorithm that removes at least a portion of the weight parameter.

In one or more embodiments, the non-transitory computer-readable storage medium may comprise: repeating the pruning algorithm so as to gradually increase a pruning ratio while a loss of a loss function of the second NN model is within a threshold range.

In one or more embodiments, the pruning algorithm may be configured to prune a certain percentage of one or more elements of the weight parameter close to zero.

In one or more embodiments, the pruning algorithm may be configured to calculate an importance of the weight parameter so as to determine whether to eliminate one or more element of the weight parameter based on the calculated importance In one or more embodiments, the importance of the weight parameter with respect to the pruning algorithm may be calculated as a magnitude of a derivative of the weight parameter with respect to a loss of the second NN model.

In one or more embodiments, when the one or more markers corresponding to the weight parameter may be set for a channel or a row, adjust a size of the weight parameter to be smaller according to a channel mask or a row mask.

The Embodiments relate to receiving a first neural network (NN) model including one or more functions. A second NN model in a form of directed acyclic graph (DAG) including one or more graph modules is generated by converting the one or more functions. One or more scale values may be calculated by obtaining maximum and minimum values of parameters input to the one or more graph modules. The parameters may be updated based on the one or more scale values. A third NN model, in a form of machine code executable on a particular neural processing unit, including the updated parameters may be generated.

In one or more embodiments, the third NN model may be generated based on hardware information of the particular neural processing unit.

In one or more embodiments, the updating the parameters may be performed in response to one or more selected compilation options.

In one or more embodiments, updating the parameters may be performed by selecting one or more compilation options including a quantization option, an outlier alleviation option, a parameter refinement option, a layer-wise training option, a quantization aware retraining (QAT) option, a quantization aware self-distillation (QASD) option, and a pruning option.

In one or more embodiments, updating the parameters may be performed by using one or more of a quantization algorithm, an outlier alleviation algorithm, a parameter refinement algorithm, a layer-wise training algorithm, a quantization aware retraining (QAT) algorithm, a quantization-aware self-distillation (QASD) algorithm, and a pruning algorithm.

In one or more embodiments, the third NN model may be compiled such that a multiply-and-accumulation operation included in the third NN model is to be processed by a processing element of the particular neural processing unit.

In one or more embodiments, third NN model may include a multiply-and-accumulation operation, and the multiply-and-accumulation operation may include at least one of a convolution operation, a general matrix multiply operation, and a matrix multiplication operation.

In one or more embodiments, the third NN model may be compiled such that a weight parameter input to a processing element of the particular neural processing unit is in the form of an integer.

In one or more embodiments, the third NN model may be compiled such that an input parameter input to a processing element of the particular neural processing unit is in the form of an integer.

In one or more embodiments, the third NN model may be compiled such that an activation function operation included in the third NN model is to be processed by an activation function circuit of the particular neural processing unit.

In one or more embodiments, the third NN model may be compiled such that an output parameter from a processing element of the particular neural processing unit is in the form of an integer, and the output parameter is to be dequantized by a dequantization circuit of the particular neural processing unit.

In one or more embodiments, the third NN model may be compiled such that an output parameter from an activation function circuit of the particular neural processing unit is in the form of a floating-point number, and the output parameter is to be quantized by a quantization circuit of the particular neural processing unit.

In one or more embodiments, the updated parameters of the third NN model may comprise one or more weight parameters.

In one or more embodiments, the third NN model may comprise the one or more scale values for dequantization operation to be processed by a dequantization circuit of the particular neural processing unit.

The Embodiments relate to a neural processing unit. The neural processing unit is configured to execute inference-only machine code, including weight parameters of a neural network model and scale values corresponding to the weight parameters. The neural processing unit may include a first circuit for on-chip memory configured to store data of at least a portion of the machine code, a second circuit for one or more processing elements configured to generate output parameters by processing the weight parameters with input parameters, a third circuit for an activation function unit configured to generate activation parameters by applying an activation function to the output parameters, and a fourth circuit for a controller configured to control the first to the third circuits according to the machine code.

In one or more embodiments, the weight parameters included in the machine code may be updated by one or more of a quantization algorithm, an outlier alleviation algorithm, a parameter refinement algorithm, a layer-wise training algorithm, a quantization-aware retraining (QAT) algorithm, a quantization-aware self-distillation (QASD) algorithm, and a pruning algorithm.

In one or more embodiments, the neural processing unit may comprise a dequantization circuit configured to dequantize the output parameters from the second circuit according to the machine code.

In one or more embodiments, the neural processing unit may comprise a quantization circuit configured to quantize the activation parameters from the third circuit according to the machine code.

In one or more embodiments, the second circuit may be configured to process integer parameters and the third circuit may be configured to process floating-point parameters.

Embodiments relate to a non-transitory computer-readable storage medium storing instructions. The instructions, when executed by one or more processors, causing the one or more processors to perform steps comprising: receiving a first neural network (NN) model including one or more functions; generating a second NN model in a form of directed acyclic graph (DAG) including one or more graph modules by converting the one or more functions; calculating one or more scale values by obtaining maximum and minimum values of parameters input to the one or more graph modules; updating the parameters based on the one or more scale values; and generating a third NN model, in a form of machine code executable on a particular neural processing unit, including the updated parameters.

The examples of the present disclosure shown herein and in the drawings are provided merely to facilitate explanation of the technical details of the present disclosure and to aid in the understanding of the present disclosure, and are not intended to limit the scope of the disclosure. The technical features of each example of the present disclosure can be combined with the technical features of other examples. It will be apparent to those of ordinary skill in the art to which the present disclosure pertains that other variations and modifications can be made without departing from the scope of the disclosure.

[National R&D Project Supporting This Invention] [Project Identification Number] Not assigned
[Task Number] 00399936
[Name of Ministry] Ministry of Science and ICT
[Name of Task Management (Specialized) Institution] Institute of Information & Communications Technology Planning & Evaluation
[Research Project Title] Development of Unified Software Flatform of Semiconductor Technology Applicable for Artificial Intelligence
[Research Task Name] Development of Quality Performance Evaluation Test (BMT) Platform Technology for Edge AI Semiconductors
[Name of the organization performing the task] DeepX Co., Ltd.
[Research Period] 2024 Apr. 1~2024 Dec. 31

What is claimed is:

1. A method comprising:
receiving a first neural network (NN) model including one or more functions;
generating a second NN model in a form of directed acyclic graph (DAG) by converting the one or more functions in the first NN model to corresponding one or more graph modules;
providing a calibration dataset to the second NN model;
embedding one or more markers at one or more inputs and outputs of at least a subset of the graph modules in the second NN model;
collecting values of parameters at the one or more inputs and outputs of the at least the subset of the one or more graph modules responsive to providing the calibration dataset to the second NN model;
determining one or more scale values based on a difference between maximum and minimum values of the collected values of the parameters at the one or more graph modules, each of the one or more scale values representing a resolution for quantization of each of the parameters;
updating the parameters based on the one or more scale values; and
compiling the second NN model into machine code to be executed on a neural processing unit of an edge device using the updated parameters based on hardware information of the neural processing unit.

2. The method of claim 1, wherein the updating the parameters is performed in accordance with one or more selected compilation options.

3. The method of claim 1, wherein updating of the parameters is performed by selecting one or more compilation options including a quantization option, an outlier alleviation option, a parameter refinement option, a layer-wise training option, a quantization aware self-distillation (QASD) option, and a pruning option.

4. The method of claim 1, wherein updating of the parameters is performed by using one or more of a quantization algorithm, an outlier alleviation algorithm, a parameter refinement algorithm, a layer-wise training algorithm, a quantization-aware self-distillation (QASD) algorithm, and a pruning algorithm.

5. The method of claim 1, wherein the second NN model is compiled to execute multiply-and-accumulation operations by processing elements in the neural processing unit.

6. The method of claim 1, wherein the machine code includes a multiply-and-accumulation operation, and the multiply-and-accumulation operation includes at least one of a convolution operation, a general matrix multiply operation, and a matrix multiplication operation.

7. The method of claim 1, wherein the second NN model is compiled to represent weight parameters provided to a processing element of the neural processing unit as integers.

8. The method of claim 1, wherein the second NN model is compiled to represent an input parameter received at a processing element of the neural processing unit as an integer.

9. The method of claim 1, wherein the second NN model is compiled to execute an activation function operation by an activation function circuit of the neural processing unit.

10. The method of claim 1, wherein the second NN model is compiled to represent an output parameter from a processing element of the neural processing unit as an integer, and the output parameter is to be dequantized by a dequantization circuit of the neural processing unit.

11. The method of claim 1, wherein the second NN model is compiled to represent an output parameter from an activation function circuit of the neural processing unit as a floating-point number, and the output parameter is to be quantized by a quantization circuit of the neural processing unit.

12. The method of claim 1, wherein the updated parameters comprise weight parameters.

13. The method of claim 1, wherein the machine code comprises the one or more scale values for dequantization operation to be processed by a dequantization circuit of the neural processing unit.

14. A neural processing unit of an edge device configured to execute machine code, comprising:

an on-chip memory configured to store data of at least a portion of the machine code, the machine code comprising updated weight parameters of an updated neural network model and scale values representing a resolution of quantization of the weight parameters, wherein the scale values are determined by:
  generating, from a first neural network (NN) model including one or more functions, a second NN model in a form of a directed acyclic graph (DAG) with the one or more functions in the first NN model replaced with one or more graph modules;
  providing a calibration dataset to the second NN model;
  embedding one or more markers at one or more inputs and outputs of at least a subset of the graph modules in the second NN model;
  collecting values of weight parameters at the one or more inputs and outputs of the at least the subset of the one or more graph modules responsive to providing the calibration dataset to the second NN model;
  determining one or more scale values based on a difference between maximum and minimum values of the collected values of the parameters at the one or more graph modules, and
  updating the weight parameters based on the one or more scale values;
one or more processing element circuits configured to generate output parameters by processing input parameters using the updated weight parameters;
an activation function circuit configured to generate activation parameters by applying an activation function to the output parameters; and
a controller circuit configured to control the on-chip memory, one or more processing elements circuit, and the activation function circuit according to the machine code,
wherein the second NN model is compiled into the machine code to be executed on the neural processing unit using the updated weight parameters based on hardware information of the neural processing unit.

15. The neural processing unit of claim 14, wherein the weight parameters included in the machine code is updated by one or more of a quantization algorithm, an outlier alleviation algorithm, a parameter refinement algorithm, a layer-wise training algorithm, a quantization-aware self-distillation (QASD) algorithm, and a pruning algorithm.

16. The neural processing unit of claim 14, further comprising a dequantization circuit configured to dequantize the output parameters from the one or more processing elements according to the machine code.

17. The neural processing unit of claim 14, further comprising a quantization circuit configured to quantize the activation parameters from the activation function circuit according to the machine code.

18. The neural processing unit of claim 14, wherein the one or more processing element circuits are configured to process integer parameters and the activation function circuit is configured to process floating-point parameters.

19. A non-transitory computer-readable storage medium storing instructions, the instructions, when executed by one or more processors, causing the one or more processors to:
  receive a first neural network (NN) model including one or more functions;
  generate a second NN model in a form of directed acyclic graph (DAG) by converting the one or more functions in the first NN model to corresponding one or more graph modules;
  provide a calibration dataset to the second NN model;
  embed one or more markers at one or more inputs and outputs of at least a subset of the graph modules in the second NN model;
  collect values of parameters at the one or more inputs and outputs of the at least the subset of the one or more graph modules responsive to providing the calibration dataset to the second NN model;
  determine one or more scale values based on a difference between maximum and minimum values of the collected values of the parameters at the one or more graph modules, each of the one or more scale values representing a resolution for quantization of each of the parameters;
  update the parameters based on the one or more scale values; and
  compile the second NN model into machine code to be executed on a neural processing unit of an edge device using the updated parameters based on hardware information of the neural processing unit.

* * * * *